US012533376B2

(12) United States Patent
Shimada et al.

(10) Patent No.: US 12,533,376 B2
(45) Date of Patent: Jan. 27, 2026

(54) PROPHYLACTIC OR THERAPEUTIC AGENT FOR DISEASE INDUCED BY OXIDATIVE STRESS

(71) Applicant: OSAKA UNIVERSITY, Suita (JP)

(72) Inventors: Shoichi Shimada, Suita (JP); Yoshihisa Koyama, Suita (JP); Makoto Kondo, Suita (JP); Noriyoshi Usui, Suita (JP); Kazuya Ohata, Suita (JP); Hidenori Inohara, Suita (JP); Hikaru Kobayashi, Suita (JP); Yuki Kobayashi, Suita (JP)

(73) Assignee: OSAKA UNIVERSITY, Osaka (JP)

( * ) Notice: Subject to any disclaimer, the term of this patent is extended or adjusted under 35 U.S.C. 154(b) by 0 days.

(21) Appl. No.: 17/113,886

(22) Filed: Dec. 7, 2020

(65) Prior Publication Data

US 2021/0145865 A1   May 20, 2021

Related U.S. Application Data

(63) Continuation-in-part of application No. PCT/JP2019/022558, filed on Jun. 6, 2019.

(30) Foreign Application Priority Data

| Jun. 7, 2018 | (JP) | 2018-109533 |
| Jul. 2, 2018 | (JP) | 2018-125861 |
| Nov. 13, 2018 | (JP) | 2018-212706 |
| Nov. 13, 2018 | (JP) | 2018-212715 |
| Jan. 24, 2019 | (JP) | 2019-010031 |
| Jan. 24, 2019 | (JP) | 2019-010032 |
| Jan. 24, 2019 | (JP) | 2019-010033 |
| Jan. 24, 2019 | (JP) | 2019-010034 |
| Jan. 24, 2019 | (JP) | 2019-010035 |
| Jan. 24, 2019 | (JP) | 2019-010036 |
| Jan. 24, 2019 | (JP) | 2019-010037 |

(51) Int. Cl.
| A61K 33/00 | (2006.01) |
| A61P 1/16 | (2006.01) |
| A61P 3/10 | (2006.01) |
| A61P 9/10 | (2006.01) |
| A61P 17/00 | (2006.01) |
| A61P 19/02 | (2006.01) |
| A61P 25/16 | (2006.01) |
| A61P 25/24 | (2006.01) |
| A61P 25/28 | (2006.01) |
| A61P 27/16 | (2006.01) |
| A61P 29/00 | (2006.01) |

(52) U.S. Cl.
CPC .............. *A61K 33/00* (2013.01); *A61P 1/16* (2018.01); *A61P 3/10* (2018.01); *A61P 9/10* (2018.01); *A61P 17/00* (2018.01); *A61P 19/02* (2018.01); *A61P 25/16* (2018.01); *A61P 25/24* (2018.01); *A61P 25/28* (2018.01); *A61P 27/16* (2018.01); *A61P 29/00* (2018.01)

(58) Field of Classification Search
CPC ........ A61K 33/00; A61K 9/14; A61K 31/695; A61K 9/0053; A61P 1/16; A61P 3/10; A61P 9/10; A61P 17/00; A61P 19/02; A61P 25/16; A61P 25/24; A61P 25/28; A61P 27/16; A61P 29/00; A61P 1/04; A61P 39/06; A23L 33/10
See application file for complete search history.

(56) References Cited

U.S. PATENT DOCUMENTS

| 6,174,864 B1 | 1/2001 | Yoshikawa et al. |
| 7,427,416 B2 * | 9/2008 | Gillis .................... A61K 31/28 |
| | | 514/967 |
| 2016/0200571 A1 | 7/2016 | Kobayashi et al. |
| 2018/0221273 A1 | 8/2018 | Russell |
| 2019/0038664 A1 | 2/2019 | Kobayashi et al. |
| 2019/0216082 A1 | 7/2019 | Kobayashi et al. |
| 2019/0231660 A1 | 8/2019 | Kobayashi et al. |
| 2020/0179439 A1 | 6/2020 | Kobayashi et al. |

FOREIGN PATENT DOCUMENTS

| CN | 1245430 | 2/2000 |
| CN | 106975100 | 7/2017 |
| CN | 106975100 A | 7/2017 |
| CN | 108939151 | 12/2018 |

(Continued)

OTHER PUBLICATIONS https://www.merriam-webster.com/dictionary/colloid retrieved on Jun. 10, 2022.*
Xiao Chen, et al., "Inhalation of Hydrogen of Different Concentrations Ameliorates Spinal Cord Injury in Mice by Protecting Spinal Cord Neurons from Apoptosis, Oxidative Injury and Mitochondrial Structure Damages", Cellular Physiology and Biochemistry, vol. 47, published online May 16, 2018, pp. 176-190 (15 pages).
Ahmad Ghanizadeh, "Physical exercise and intermittent administration of lactulose may improve autism symptoms through hydrogen production", Medical Gas Research, vol. 2, No. 19, published Jul. 30, 2012, 3 pages.

(Continued)

*Primary Examiner* — Jessica Worsham
(74) *Attorney, Agent, or Firm* — FisherBroyles, LLP; Joseph Hyosuk Kim

(57) ABSTRACT

An object is to provide a pharmaceutical or the like that can prevent or treat an oxidative stress-induced disease. Provided is a preventive or therapeutic agent for an oxidative stress-induced disease, pharmaceutical composition, medical device, hygienic product, food, or beverage containing silicon small particles. When the silicon small particles are orally administered or placed on a skin or a mucous membrane, the oxidative stress-induced disease can be prevented or treated. The oxidative stress-induced disease is an inflammatory disease, depression, or the like, and an excellent preventive and therapeutic effect thereon is obtained.

23 Claims, 23 Drawing Sheets

(56) References Cited

FOREIGN PATENT DOCUMENTS

| JP | 10-168095 | 6/1998 | | |
|---|---|---|---|---|
| JP | 2009114084 | 5/2009 | | |
| JP | 2013063943 | 4/2013 | | |
| JP | 2014533295 | 12/2014 | | |
| JP | 2015531363 | 11/2015 | | |
| JP | 2016-155118 | 9/2016 | | |
| JP | 2017-100919 | 6/2017 | | |
| JP | 2017-104848 | 6/2017 | | |
| JP | 2017104848 A | * 6/2017 | ............ | A01N 25/12 |
| WO | 2007021034 | 2/2007 | | |
| WO | 2008047880 | 4/2008 | | |
| WO | WO-2016145233 A1 | * 9/2016 | ........... | A61K 31/573 |
| WO | WO-2016161391 A2 | * 10/2016 | ......... | A61K 39/0011 |
| WO | 2017/130709 | 8/2017 | | |
| WO | 2018/037752 | 3/2018 | | |
| WO | 2018/037818 | 3/2018 | | |
| WO | 2018/037819 | 3/2018 | | |
| WO | 2019021769 | 1/2019 | | |

OTHER PUBLICATIONS

Yeunhwa Gu, et al., "Drinking Hydrogen Water Ameliorated Cognitive Impairment in Senescence-Accelerated Mice", J. Clin. Biochem. Nutr., vol. 46, No. 3, May 2010, pp. 269-276 (8 pages).
Kentaro Imamura, et al., "Reaction of Si nanopowder with water investigated by FT-IR and XPS", AIP Advances 7, published online Aug. 21, 2017, pp. 085310-1-085310-10 (11 pages).
Toru Ishibashi, et al., "Consumption of water containing a high concentration of molecular hydrogen reduces oxidative stress and disease activity in patients with rheumatoid arthritis: an open-label pilot study", Medical Gas Research, vol. 2, No. 27, 2012, 8 pages.
Mikako Ito, et al., "Drinking hydrogen water and intermittent hydrogen gas exposure, but not lactulose or continuous hydrogen gas exposure, prevent 6-hydorxydopamine-induced Parkinson's disease in rats", Medical Gas Research, vol. 2, No. 15, 2012, 7 pages.
Mikihito Kajiya, et al., "Hydrogen mediates suppression of colon inflammation induced by dextran sodium sulfate", Biochemical and Biophysical Research Communications. vol. 386, available online May 30, 2009, pp. 11-15 (5 pages).
Sizuo Kajiyama, et al., "Supplementation of hydrogen-rich water improves lipid and glucose metabolism in patients with type 2 diabetes or impaired glucose tolerance", Nutrition Research, vol. 28, accepted Jan. 17, 2008, pp. 137-143 (7 pages).
Yuki Kobayashi, et al., "Hydrogen generation by reaction of Si nanopowder with neutral water", J Nanopart Res, vol. 19, No. 176, published online May 16, 2017, 9 pages.
Yuki Kobayashi, et al., "Renoprotective and neuroprotective effects of enteric hydrogen generation from Si-based agent", Scientific Reports, vol. 10, No. 1:5859, doi: 10.1038/s41598-020-62755-9., 2020, 12 pages.
Yoshihisa Koyama, et al., "Development of new therapeutic agents for ulcerative colitis", The 124$^{th}$ Annual Meeting of the Japanese Association of Anatomists / National Academic Meeting, P-082, Mar. 27-Mar. 29, 2019, 4 pages (with English Translation).
Shinsuke Matsuda, et al., "Concentration of hydrogen molecules and splitting water using silicon nanoparticle", Extended Abstracts of the 62nd JSAP Spring Meeting, 2015, 11a-A27-6, 3 pages (with English Translation).
Naomi Nakashima-Kamimura, et al., "Molecular hydrogen alleviates nephrotoxicity induced by an anti-cancer drug cisplatin without compromising anti-tumor activity in mice", Cancer Chemother Pharmacol., vol. 64, No. 4, published online Jan. 16, 2009, pp. 753-761 (9 pages).
Jun Sato, et al., "Effect of Mesalazine in Rat Models of Inflammatory Bowel Disease", Jpn Pharmacol Ther, vol. 36, No. 4, 2008, pp. 293-301, p. 299, right column, paragraph 2, p. 300, right column, "conclusion" (9 pages with English Abstract).

Haiyan Yan, et al., "Ascorbic acid ameliorates oxidative stress and inflammation in dextran sulfate sodium-induced ulcerative colitis in mice", Int J Clin Exp Med, vol. 8, No. 11, published Nov. 30, 2015, pp. 20245-20253 (9 pages).
Yi Zhang, et al., "Effects of hydrogen-rich water on depressive-like behavior in mice", Scientific Reports, vol. 6, No. 23742, DOI: 10.1038/srep23742, published Mar. 30, 2016, 7 pages.
Christopher T Turner, et al., "Delivery of Flightless I Neutralizing Antibody from Porous Silicon Nanoparticles Improves Wound Healing in Diabetic Mice", Adv. Healthcare Mater., 2017, 6, 1600707.
Flavia Fontana, et al., "Bioengineered Porous Silicon Nanoparticles@Macrophages Cell Membrane as Composite Platforms for Rheumatoid Arthritis", Adv. Funct. Mater. , 2018 , 28 , 1801355. doi: 10.1002/adfm.201801355.
Francisca Araújo, et al., "The impact of nanoparticles on the mucosal translocation and transport of GLP-1 across the intestinal epithelium", Biomaterials, 2014, vol. 35, Issue 33, pp. 9199-9207.
Javaid Alam, et al., "Synthetic and natural antioxidants attenuate cisplatin-induced vomiting", BMC Pharmacology & Toxicology, 2017, vol. 18, Article No. 4.
Jinghu He, et al., "Protective effects of hydrogen-rich saline on ulcerative colitis rat model", Journal of Surgical Research, 2013, 185(1), pp. 174-181.
Jitka Fricova, et al., "The effect of laparotomy on hydroxyl radicals, singlet oxygen and antioxidants measured by EPR method in the tails of rats", Neuroendocrinol Lett, 2009, 30(3), pp. 373-376.
João P Martins, et al., "Microfluidic Nanoassembly of Bioengineered Chitosan-Modified FcRn-Targeted Porous Silicon Nanoparticles @ Hypromellose Acetate Succinate for Oral Delivery of Antidiabetic Peptides", ACS Applied Materials & Interfaces, 2018, vol. 10, No. 51, pp. 44354-44367.
Kei Mizuno, et al., "Hydrogen-rich water for improvements of mood, anxiety, and autonomic nerve function in daily life", Med Gas Res. 2017;7(4):247-255.
Kinji Ohno, et al., "Molecular hydrogen as an emerging therapeutic medical gas for neurodegenerative and other diseases", Oxidative Medicine and Cellular Longevity vol. 2012, Article ID 353152, 11 pages.
Miroslaw Jarosz, et al., "Antyoksydanty w leczeniu przewleklego zapalenia trzustki", Gastroenterologia Polska, 2010, vol. 17, No. 1, pp. 41-46.
Neha Shrestha, et al., "Chitosan-modified porous silicon microparticles for enhanced permeability of insulin across intestinal cell monolayers", Biomaterials, 2014, vol. 35, Issue 25, pp. 7172-7179.
Qingjun Guo, et al., "Hydrogen-Rich Water Ameliorates Autistic-Like Behavioral Abnormalities in Valproic Acid-Treated Adolescent Mice Offspring", Front. Behav. Neurosci., 2018, 12:170.
S S Sharma, et al., "Effect of antioxidants on cisplatin induced delay in gastric emptying in rats", Environmental Toxicology and Pharmacology, 1997, vol. 3, No. 1, pp. 41-46.
Sanetaka Sirahara, et al., "Electrolyzed-reduced water scavenges active oxygen species and protects DNA from oxidative damage", Biochem Biophys Res Commun. 234, 269-274 (1997).
Sara Daneshjou, et al., "Porous silicon nanoparticle as a stabilizing support for chondroitinase", International Journal of Biological Macromolecules, 2017, 94, pp. 852-858.
Seung-Kyu Park, et al., "Electrolyzed-reduced water inhibits acute ethanol-induced hangovers in Sprague-Dawley rats", Biomed Research 30 (5) 263-269, 2009.
Steven J. P. McInnes, et al., "Surface engineering of porous silicon to optimise therapeutic antibody loading and release" J. Mater. Chem. B , 2015 , 3 , pp. 4123-4133.
Xiao Chen, et at., "Lactulose Mediates Suppression of Dextran Sodium Sulfate-Induced Colon Inflammation by Increasing Hydrogen Production", Digestive Diseases and Sciences, 2013, 58(6), pp. 1560-1568.
Y K Gupta, et al., "Antiemetic activity of antioxidants against cisplatin-induced emesis in dogs", Environmental Toxicology and Pharmacology, 1996, vol. 1, pp. 179-184.

* cited by examiner

** : P<0.01 ; * : P<0.05

(n = 8, *p =0.0008)

(n = 8, *p =0.0262)

FIG. 32(a)
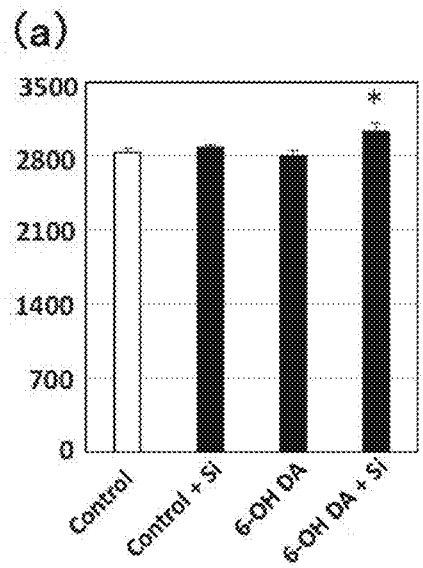
FIG. 32(b)
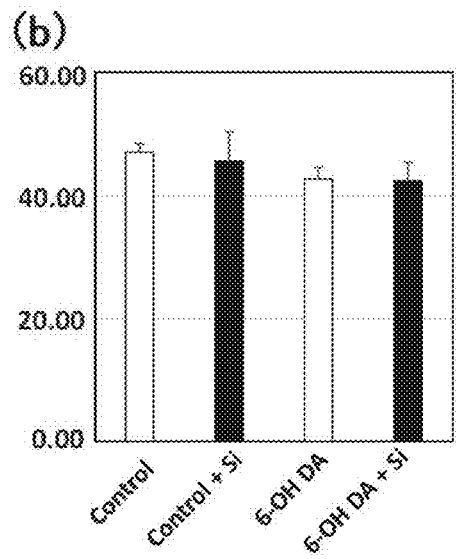
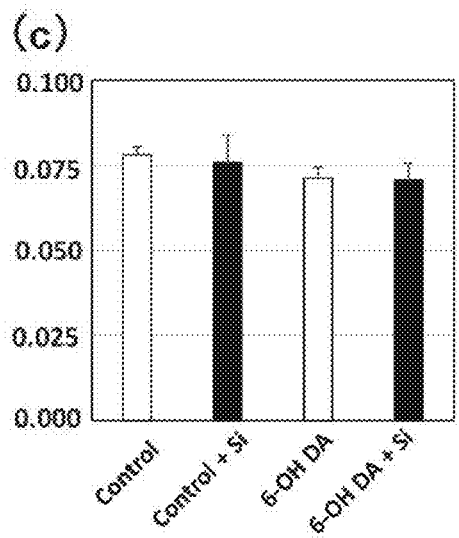
FIG. 32(c)
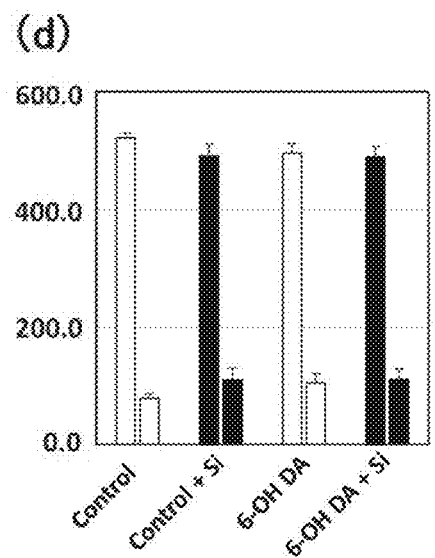
FIG. 32(d)

\* p<0.01, \*\* p<0.05, ǂ p<0.06 (t-TEST)

FIG. 46(a)
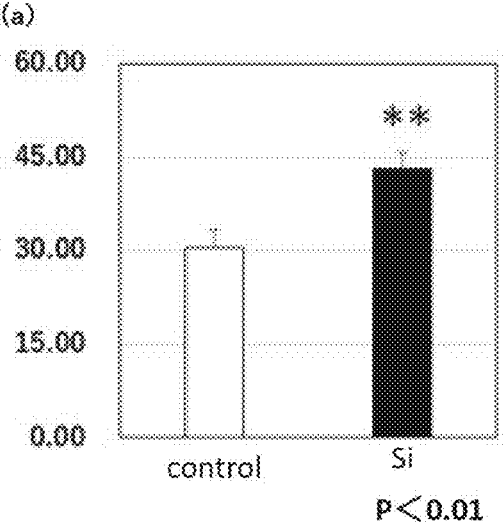
FIG. 46(b)
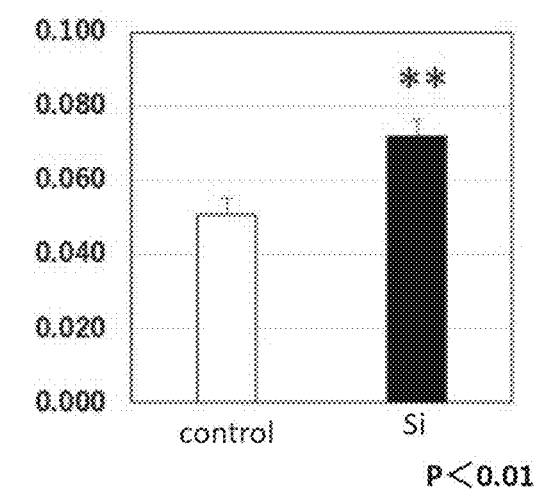
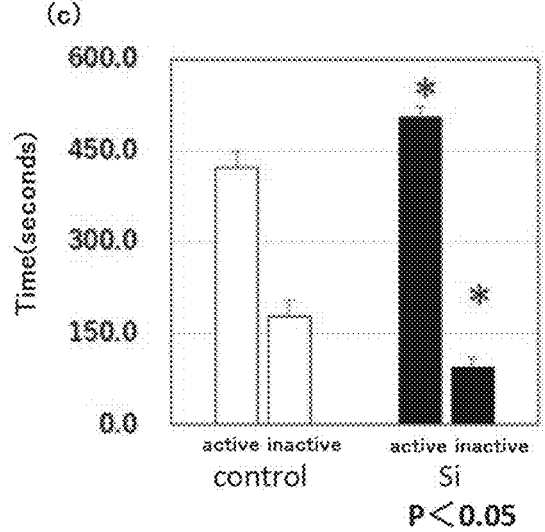
FIG. 46(c)

PROPHYLACTIC OR THERAPEUTIC AGENT FOR DISEASE INDUCED BY OXIDATIVE STRESS

This application is a Continuation-in-Part of International Application No. PCT/JP2019/022558 filed Jun. 6, 2019 which designated the U.S. and claims priority to JP Patent Application Nos. 2018-109533 filed Jun. 7, 2018, 2018-125861 filed Jul. 2, 2018, 2018-212706 filed Nov. 13, 2018, 2018-212715 filed Nov. 13, 2018, 2019-010031 filed Jan. 24, 2019, 2019-010032 filed Jan. 24, 2019, 2019-010033 filed Jan. 24, 2019, 2019-010034 filed Jan. 24, 2019, 2019-010035 filed Jan. 24, 2019, 2019-010036 filed Jan. 24, 2019, and 2019-010037 filed Jan. 24, 2019, the entire contents of each of which are hereby incorporated by reference.

TECHNICAL FIELD

The present invention relates to prevention or treatment of an oxidative stress-induced disease.

BACKGROUND ART

It is known that reactive oxygen species are required for life support, but oxidize cells that make up a living body to damage the cells. The reactive oxygen species include a superoxide anion radical, a hydroxyl radical, hydrogen peroxide, and singlet oxygen. It is known that the hydroxyl radical is a radical having extremely high oxidizing power, and when generated in a living body, oxidizes a nearby substance, such as DNA, a lipid, or a protein, to damage an organ. The hydroxyl radical is said to cause, through such action, various diseases, such as cancer and lifestyle diseases, and aging. There is a report that, in the large intestine, oxidation by the hydroxy radical serves as a factor in inducing damage, resulting in enhanced inflammation (Non Patent Literature 1).

Hydrogen is known as a substance that eliminates hydroxyl radicals produced in the body. It is water that is produced by hydrogen reacting with hydroxyl radicals, and hydrogen does not produce a substance harmful to a living body. Accordingly, there are many reports on hydrogen water containing hydrogen, which eliminates hydroxyl radicals in the body.

However, a saturated hydrogen concentration at room temperature is 1.6 ppm, and an amount of hydrogen contained in 1 liter of hydrogen water even in a saturated state is a mere 18 milliliters (ml) in terms of gas. In addition, hydrogen has a small molecule size, and hence hydrogen in hydrogen water passes through a container to be diffused into air. Accordingly, it is difficult to maintain an amount of dissolved hydrogen in hydrogen water. In addition, even when hydrogen water having a high concentration is ingested, much of the hydrogen in the hydrogen water gasifies in the upper gastrointestinal tract, such as the stomach, causing pneumophagia (so-called "burp") in some cases. Therefore, by the method of ingesting hydrogen water, it is not easy to take, into the body, hydrogen in an amount enough for causing a reaction with hydroxyl radicals in the body. Further, even when hydrogen is absorbed and transferred to organs, its concentration returns to that before the ingestion of hydrogen water in about 1 hour. In addition, it is difficult to inhale gaseous hydrogen in daily life.

Silicon (Si) is used in a wide range of fields, such as semiconductor materials. The inventors of the present application have made various investigations on reactivity between silicon small particles and water.

The inventors of the present application have found that the silicon small particles can generate hydrogen through contact with water. The reaction is represented by the following formula.

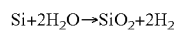

$$Si + 2H_2O \rightarrow SiO_2 + 2H_2$$

In addition, the inventors have found that this reaction hardly proceeds through contact with water at a pH of less than 5, the reaction proceeds through contact with water at a pH of 7 or more, and the reaction proceeds faster at a pH of 8 or more. In addition, the inventors have found that, when the silicon small particles are subjected to surface treatment, the reaction suitably proceeds. Further, the inventors have found that the silicon small particles continue generating hydrogen in a sustained manner over 20 hours or more while in contact with water, and under some conditions, 1 g of the silicon small particles generate 400 ml or more of hydrogen (Patent Literatures 1 to 6 and Non Patent Literature 2). 400 ml of hydrogen corresponds to hydrogen contained in 22 liters of saturated hydrogen water.

An inflammatory disease is a disease involving an inflammatory symptom. Inflammations include systemic inflammation and local inflammation. An example of the systemic inflammation is sepsis, and examples of the local inflammation include inflammatory bowel disease and arthritis.

Causes of inflammatory bowel disease (IBD) typified by ulcerative colitis and Crohn's disease, which are designated intractable diseases in Japan, have yet to be identified. Accordingly, inflammatory bowel disease has no established definitive therapy, and hence is difficult to completely cure. Inflammatory bowel disease is currently treated by symptomatic therapy, and major symptomatic therapies are pharmacotherapies given below.

Anti-inflammatory agents: 5-aminosalicylic acid, corticosteroid

Anticytokine therapy: anti-TNFα antibody

Immunosuppressants: azathioprine, 6-mercaptopurine (MP)

When symptoms are not ameliorated by the pharmacotherapies, cytapheresis, such as leukocytapheresis (LCAP) or granulocytapheresis (GCAP), or surgical treatment (ulcerative colitis: artificial anus construction or the like, Crohn's disease: small-area resection, strictureplasty, or the like) is performed.

Meanwhile, an incidence rate of inflammatory bowel disease continues to increase, and hence there is a demand for a novel preventive method or a novel therapeutic method.

Arthritis involves joint swelling and pain as cardinal symptoms, is accompanied by suppuration, aching, or the like, and sometimes exhibits motor impairment. Arthritis is broadly classified into bacterial arthritis, such as tuberculous arthritis and syphilitic arthritis, and arthritis caused by rheumatism or trauma. The number of patients suffering from arthritis is increasing year by year owing to population aging and an increase in obesity, and an economic burden is also projected to be huge in several years. Therefore, it is urgent to develop a more effective therapeutic drug or preventive drug. Current treatment methods include conservative treatment methods and operative treatment methods. The former include exercise therapy that rehabilitation is given mainly, thermotherapy for alleviating pain, orthotic therapy involving using an assist device, such as a cane, and pharmacotherapy (anti-inflammatory analgesics: NSAIDs, antirheumatic drugs: DMARDs, steroids, JAK inhibitors, hyaluronic acid formulations, and the like). The latter include arthroscopic surgery, high tibial osteotomy, and artificial knee joint replacement.

Anticancer agent treatment is a useful cancer treatment method for, for example, suppressing cancer growth or shrinking a tumor, but may cause nausea/vomiting, diarrhea, anemia, or the like. In particular, nausea/vomiting markedly lowers the quality of life of a patient, and hence control thereof is extremely important. A vomiting reflex is caused via serotonin and substance P by an anticancer agent stimulating the small intestine and the vomiting center in a dorsal part of the medulla oblongata. The frequency of vomiting varies depending on the kind of the anticancer agent, and cisplatin or the like is classified as a high emetic risk (>90% frequency of emesis). As a therapeutic drug, there are given antiemetic drugs, such as a serotonin type 3 receptor antagonist (e.g., ondansetron or palonosetron), a dopamine D2 receptor antagonist (e.g., domperidone), a steroid (e.g., dexamethasone), and an NK1 receptor antagonist (e.g., aprepitant or fosaprepitant).

Symptoms of depression include a depressed mood, asleep disorder, a loss of interest/joy, an appetite disorder, a lowering in ability to think/ability to con cent rate/ability to make decisions, a sense of worthlessness, a sense of remorse, a sense of fatigue, listlessness, and the like, and in recent years, the number of patients has tended to increase. Depression is treated by pharmacotherapy centered on a selective serotonin reuptake inhibitor (SSRI), but a remission rate is only 50% or less. Accordingly, there is a demand for development of a novel treatment method.

Parkinson's disease is caused by a reduction in dopamine neurons in the substantia nigra of the midbrain and is characterized by progressive motor dysfunction (muscular rigidity, bradykinesia, postural instability) and uncontrollable trembling (tremor). Parkinson's disease is designated as a designated intractable disease in Japan. Parkinson's disease is currently treated mainly by symptomatic therapy and has no definitive therapy. Pharmacotherapy is performed using, for example, a L-DOPA formulation, a dopamine agonist, an anticholinergic drug, amantadine hydrochloride, a levodopa combination drug, or an adrenoceptor stimulant. When symptoms are not ameliorated by pharmacotherapy, surgical treatment is performed by stereotactic surgery, such as lesioning or deep brain stimulation.

An autism spectrum disorder (ASD) is a developmental disorder characterized by social communication disorder, limited or repetitive behavior/interest, hypersensitivity, or hyposensitivity, and a prevalence rate in Japanese is estimated to be from about 1% to 3%. According to diagnostic criteria of DSM-5, which was introduced by the American Psychiatric Association in 2013, autism spectrum disorder includes autism (autistic disorder), Asperger syndrome, childhood disintegrative disorder, and pervasive developmental disorder not otherwise specified. The autism spectrum disorder has no radical treatment method, and only has symptomatic therapy. In pharmacotherapy, the following are mainly used: 1) a psychostimulant; 2) an antipsychotic; 3) an atypical antipsychotic; 4) an antidepressant; 5) an anxiolytic; 6) an antiepileptic drug; 7) an antihistamine; 8) a cardiovascular drug; and 9) others (e.g., a cholinesterase inhibitor). Currently, education and guidance of an upbringing method to family are employed as an effective treatment method after diagnosis.

Memory impairment is an impairment in which a personally experienced event or a past memory is forgotten and is one of the cardinal symptoms of dementia. From mild cognitive impairment to dementia, memory impairment is mainly treated by symptomatic therapy, and has no definitive therapy. For pharmacotherapy, which serves as the symptomatic therapy, there have been developed, for example, donepezil hydrochloride, galantamine hydrobromide, and rivastigmine, but a sufficient effect has not been obtained.

When spinal cord injury occurs, symptoms such as motor/sensory paralysis of four limbs and bladder/rectal dysfunction are exhibited. Cervical spine injury accounts for 70% of spinal cord injury cases. Many patients are elderly, and a cause is a fall or a tumble in many cases. About 5,000 people sustain spinal cord injury every year, and the total number of patients is from 100,000 to 200,000 or more because of its intractability. In current medicine, it is impossible to restore the injured spinal cord itself, and functional amelioration is not sufficiently achieved by treatment. Methylprednisolone sodium succinate, which is a steroid, is the only approved therapeutic drug, but causes side effects on the respiratory system and the digestive system at high rates, and hence its use is avoided under the present circumstances. Rehabilitation or the like is effective for recovery of function, but amelioration of a prognosis is significantly influenced by inflammation in an acute phase. Therefore, it is urgent to develop a therapeutic drug for inflammation in the acute phase.

Difficulty in hearing (hearing loss) affects one out of ten Japanese, and its causes are varied, including noise, cerebral infarction, viral infection, aging, a side effect of medication, and the like. Hearing loss, which markedly degrades quality of life (QOL), requires urgent amelioration. However, hearing loss is currently treated by symptomatic therapy, and is difficult to completely cure. A major symptomatic therapy mainly involves suppressing inflammation or abnormal immunity with a steroid drug. The steroid drug is usually administered as an oral medicine or an infusion, but when no effect is obtained, is injected into the tympanic cavity in some cases. In order to ameliorate dizziness and tinnitus symptoms accompanying hearing loss, there are also sometimes used blood flow improvers, such as betahistine mesilate, difenidol hydrochloride, adenosine triphosphate disodium hydrate, nicergoline, ifenprodil tartrate, ibudilast, and a nicotinamide/papaverine hydrochloride combination drug. Other than pharmacotherapy, there is given use of a hearing aid or a cochlear implant.

Diabetes is a disease in which hyperglycemia continues chronically owing to a reduction in action, or a lack, of insulin. Diabetes is broadly classified into two types depending on the presence or absence of insulin dependence. Risk factors for an onset of diabetes include aging, family history, obesity, insufficient exercise, impaired glucose tolerance, and the like. Diabetes may be accompanied by serious complications, such as retinopathy, nephropathy, and neuropathy, without any subjective symptom, and hence is an extremely dangerous disease. Therefore, early treatment and onset prevention are extremely important. In treatment of diabetes, blood sugar control is important, and diet therapy and exercise therapy are performed first. When no effect is obtained by continuing those therapies for from 2 months to 3 months, pharmacotherapy is performed using an oral hypoglycemic agent (e.g., based on insulin resistance amelioration (biguanide drug or thiazolidine drug); based on insulin secretion promotion (SU drug, glinide drug, or DPP-4 inhibitor); or based on carbohydrate absorption/discharge control ($\alpha$-G1 inhibitor or SLGT2 inhibitor)).

A hangover, which is caused by ingestion of alcohol, exhibits various symptoms, such as headache, a sleep disorder, nausea, vomiting, cognitive and sensory impairment, a depressive mood, and autonomic symptoms. An onset of the hangover involves factors such as oxidative stress, a mild alcohol withdrawal symptom, an acidic shift of body fluid, an enhanced inflammatory response, gastrointestinal disturbance, changes in hormone secretion (diuresis, dehydration, and hypoglycemia), and acetaldehyde. However, details have yet to be elucidated, and there is no definite effective treatment method. Symptomatic therapies include administration of a glucose solution as an infusion and oral administration of a digestive medicine. In addition, there are many candidates of food for quickening recovery from the hangover, but only γ-linolenic acid-containing foodstuffs (e.g., quail eggs and blue-backed fish) are scientifically evidenced.

CITATION LIST

Patent Literature

[PTL 1] JP 2016-155118 A
[PTL 2] JP 2017-104848 A
[PTL 3] WO 2017/130709 A1
[PTL 4] WO 2018/037752 A1
[PTL 5] WO 2018/037818 A1
[PTL 6] WO 2018/037819 A1

Non Patent Literature

[NPL 1] Yan H, et al. Int J Clin Exp Med. 2015 Nov. 15; 8(11): 20245-53
[NPL 2] Shinsuke Matsuda et al., Concentration of hydrogen molecules and splitting water using silicon nanoparticle, Extended Abstracts of The 62nd JSAP Spring Meeting, 2015, 11a-A27-6

SUMMARY OF INVENTION

Technical Problem

An object of the present invention is to provide, for example, a pharmaceutical, medical device, hygienic product, food, or beverage for prevention or treatment of an oxidative stress-induced disease.

Solution to Problem

The inventors of the present invention have found that silicon small particles can prevent and/or treat an oxidative stress-induced disease. Thus, the inventors have completed the present invention.

1. A preventive or therapeutic agent for an oxidative stress-induced disease or condition, excluding a kidney disease, including silicon small particles.
2. The preventive or therapeutic agent according to the above-mentioned item 1, wherein the oxidative stress-induced disease or condition is an inflammatory disease.
3. The preventive or therapeutic agent according to the above-mentioned item 2, wherein the inflammatory disease is an inflammatory disease of a gastrointestinal tract.
4. The preventive or therapeutic agent according to the above-mentioned item 3, wherein the inflammatory disease of a gastrointestinal tract is inflammatory bowel disease.
5. The preventive or therapeutic agent according to the above-mentioned item 2, wherein the inflammatory disease is arthritis.
6. The preventive or therapeutic agent according to the above-mentioned item 5, wherein the arthritis is chronic rheumatoid arthritis.
7. The preventive or therapeutic agent according to the above-mentioned item 2, wherein the inflammatory disease is hepatitis.
8. The preventive or therapeutic agent according to the above-mentioned item 7, wherein the hepatitis is acute hepatitis.
9. The preventive or therapeutic agent according to the above-mentioned item 2, wherein the inflammatory disease is dermatitis.
10. The preventive or therapeutic agent according to the above-mentioned item 9, wherein the dermatitis is contact dermatitis.
11. The preventive or therapeutic agent according to the above-mentioned item 1, wherein the oxidative stress-induced disease or condition is visceral discomfort.
12. The preventive or therapeutic agent according to the above-mentioned item 11, wherein the visceral discomfort is at least one selected from the group consisting of visceral pain, vomiting, nausea, borborygmus, and diarrhea.
13. The preventive or therapeutic agent according to the above-mentioned item 11, wherein the visceral discomfort is visceral pain accompanying inflammatory bowel disease.
14. The preventive or therapeutic agent according to the above-mentioned item 11, wherein the visceral discomfort is visceral discomfort accompanying anticancer agent administration.
15. The preventive or therapeutic agent according to the above-mentioned item 14, wherein the visceral discomfort accompanying anticancer agent administration is nausea or vomiting accompanying anticancer agent administration.
16. The preventive or therapeutic agent according to the above-mentioned item 1, wherein the oxidative stress-induced disease or condition is depression or a depressive state.
17. The preventive or therapeutic agent according to the above-mentioned item 1, wherein the oxidative stress-induced disease or condition is Parkinson's disease.
18. The preventive or therapeutic agent according to the above-mentioned item 1, wherein the oxidative stress-induced disease or condition is autism spectrum disorder.
19. The preventive or therapeutic agent according to the above-mentioned item 18, wherein the autism spectrum disorder is social communication disorder.
20. The preventive or therapeutic agent according to the above-mentioned item 1, wherein the oxidative stress-induced disease or condition is memory impairment.
21. The preventive or therapeutic agent according to the above-mentioned item 1, wherein the oxidative stress-induced disease or condition is spinal cord injury.
22. The preventive or therapeutic agent according to the above-mentioned item 21, wherein the spinal cord injury is motor dysfunction accompanying spinal cord injury.
23. The preventive or therapeutic agent according to the above-mentioned item 1, wherein the oxidative stress-induced disease or condition is hearing loss.
24. The preventive or therapeutic agent according to the above-mentioned item 23, wherein the hearing loss is noise-induced hearing loss.
25. The preventive or therapeutic agent according to the above-mentioned item 1, wherein the oxidative stress-induced disease or condition is damage due to cerebral ischemia or reperfusion injury after cerebral ischemia.
26. The preventive or therapeutic agent according to the above-mentioned item 1, wherein the oxidative stress-induced disease or condition is diabetes.

27. The preventive or therapeutic agent according to the above-mentioned item 26, wherein the diabetes is type 2 diabetes.

28. The preventive or therapeutic agent according to the above-mentioned item 1, wherein the oxidative stress-induced disease or condition is a hangover.

29. The preventive or therapeutic agent according to any one of the above-mentioned items 1 to 28, wherein the silicon small particles are small particles each containing silicon capable of generating hydrogen through contact with water.

30. The preventive or therapeutic agent according to any one of the above-mentioned items 1 to 29, wherein the silicon small particles are silicon fine particles and/or aggregates of the silicon fine particles.

31. The preventive or therapeutic agent according to the above-mentioned item 30, wherein the silicon fine particles are fine particles each formed of simple silicon, the fine particles each having a silicon oxide film formed on a surface thereof.

32. The preventive or therapeutic agent according to the above-mentioned item 30 or 31, wherein the silicon fine particles are fine particles obtained by grinding lumps or particles of simple silicon.

33. The preventive or therapeutic agent according to any one of the above-mentioned items 30 to 32, wherein the aggregates of the silicon fine particles each have a particle diameter of 10 nm or more and 500 μm or less.

34. The preventive or therapeutic agent according to any one of the above-mentioned items 30 to 33, wherein the silicon fine particles are silicon crystallites.

35. The preventive or therapeutic agent according to any one of the above-mentioned items 1 to 29, wherein the silicon small particles are porous silicon particles.

36. The preventive or therapeutic agent according to any one of the above-mentioned items 1 to 35, wherein the silicon small particles are silicon small particles subjected to hydrophilic treatment.

37. The preventive or therapeutic agent according to the above-mentioned item 36, wherein the hydrophilic treatment is hydrogen peroxide water treatment.

38. The preventive or therapeutic agent according to any one of the above-mentioned items 1 to 37, wherein the preventive or therapeutic agent is for use in oral administration.

39. A pharmaceutical composition for preventing or treating an oxidative stress-induced disease or condition, excluding a kidney disease, the pharmaceutical composition including silicon small particles.

40. A medical device, including the preventive or therapeutic agent of any one of the above-mentioned items 1 to 38.

41. A hygienic product, including the preventive or therapeutic agent of any one of the above-mentioned items 1 to 38.

42. A food or beverage, including the preventive or therapeutic agent of any one of the above-mentioned items 1 to 38.

43. A method of treating an oxidative stress-induced disease or condition, including administering a pharmaceutical agent containing silicon small particles.

Advantageous Effects of Invention

The preventive or therapeutic agent of the present invention can prevent and/or treat the oxidative stress-induced disease or condition. Its preventive effect and therapeutic effect are extremely excellent.

The silicon small particles contained in the preventive or therapeutic agent of the present invention are small particles each capable of generating hydrogen. OEM ions catalytically act on a hydrogen generation reaction, and hence hydrogen is efficiently generated in a sustained manner for 20 hours or more under an alkaline condition. Meanwhile, in general, the retention time of food in the intestines of a human is 20 hours or more.

When orally administered, the preventive or therapeutic agent of the present invention can keep generating hydrogen in the intestines over a long period of time, to thereby keep supplying hydrogen to the body. In addition, it is conceived that, when placed on a skin or on a mucous membrane for a long period of time, the preventive or therapeutic agent of the present invention can keep supplying hydrogen to the body over a long period of time. It is conceived that, by keeping supplying hydrogen as just described, antioxidant power in the body is improved, and the improved antioxidant power is maintained.

The preventive or therapeutic agent of the present invention exhibits a remarkably excellent effect as compared to hydrogen water. Hydrogen water or gaseous hydrogen has been unable to keep supplying hydrogen to the body continuously over a long period of time, but the preventive or therapeutic agent of the present invention can keep supplying hydrogen to the body continuously over a long period of time. Further, the preventive or therapeutic agent of the present invention has a remarkable effect, and hence may conceivably have an action that hydrogen water does not have.

Prevention and treatment with the preventive or therapeutic agent of the present invention can be a causal therapy for the oxidative stress-induced disease. The causal therapy is excellent in effect and is also excellent in safety. In addition, the preventive or therapeutic agent of the present invention is excellent in safety also because the product produced by its reaction with hydroxyl radicals is water. The number of patients with oxidative stress-induced diseases has been increasing in recent years, and many of the diseases have no definitive therapy. Accordingly, the finding of the causal therapy for the oxidative stress-induced disease is greatly conducive to future medicine and health promotion.

In addition, unlike hydrogen water, the preventive or therapeutic agent of the present invention does not allow hydrogen to be diffused be fore its administration. This property contributes to maintaining the quality of products, and contributes to the convenience of manufacturers, sellers, and users.

BRIEF DESCRIPTION OF DRAWINGS

FIG. 22 are photographs showing immunofluorescence staining results of the vomiting center in the dorsal part of the medulla oblongata of anticancer agent-dosed model mice. Red fluorescence signals indicate cells positive for c-Fos serving as a neuronal activity marker. The photographs in the drawings are inverted in color to facilitate visual recognition of signals in grayscale, and red signals are shown as black dots.

FIG. 32 show the results of spontaneous motor activity measurement (Supermex) and an open field test on Parkinson's disease model mice and normal mice. The graph of FIG. 32(a) shows spontaneous motor activity, the graph of FIG. 32(b) shows travel distance in the open field test, the graph of FIG. 32(c) shows moving speed in the open field test, and the graph of FIG. 32(d) shows active time/inactive time in the open field test (for each group, the active time and the inactive time are shown on the left and on the right, respectively), in which the vertical axis represents time (seconds). In each graph, Control represents a normal diet group of normal mice, Control+Si represents a silicon small particle-containing diet group of normal mice, 6-OHDA represents a normal diet group of Parkinson's disease model mice, and 6-OHDA+Si represents a silicon small particle-containing diet group of Parkinson's disease model mice. Among the groups, no differences were found in spontaneous motor activity and locomotion under a novel environment. Thus, it is shown that there are no differences in spontaneous motor activity and locomotion under a novel environment among the mice of each group subjected to the apomorphine-induced rotation test and the rotarod test.

model mice that have been given normal diet, ■: model mice that have been given silicon small particle-containing diet

FIG. 46(a), FIG. 46(b) and FIG. 46(c) show the results of an open field test of the hangover mouse model. FIG. 46(a) is a graph showing travel distance. FIG. 46(b) is a graph showing moving speed. FIG. 46(c) is a graph showing active time and inactive time. Symbol "■" represents a silicon small particle administration group, and Symbol "□" represents a control group.

DESCRIPTION OF EMBODIMENTS

Figure 1:
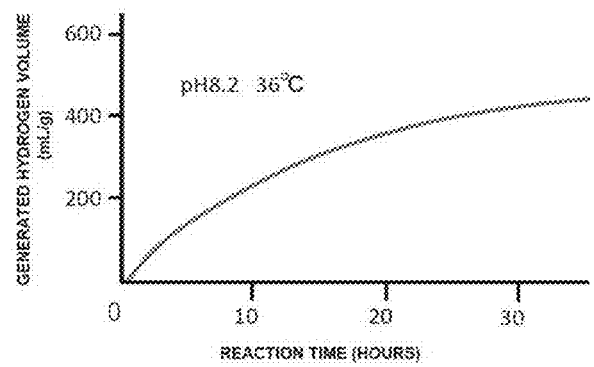
FIG. 1 is a graph showing the volume (cumulative volume), per g of silicon small particles, of hydrogen generated by bringing silicon small particles obtained in Example 2 into contact with water at 36° C. and a pH of 8.2.

Silicon small particles contained in a preventive or therapeutic agent of the present invention are small particles each containing silicon, and only need to be small particles each containing silicon and capable of generating hydrogen through contact with water.

The "small particles each containing silicon capable of generating hydrogen through contact with water" (silicon small particles each having a capability of generating hydrogen) mean silicon small particles that generate hydrogen in a sustained manner when brought into contact with water at 36° C. and a pH of 8.2, and that can generate 10 ml or more of hydrogen per gram of the silicon small particles in 24 hours. The volume of hydrogen to be generated is preferably 20 ml or more, 40 ml or more, 80 ml or more, 150 ml or more, 200 ml or more, or 300 ml or more.

The silicon small particles contained in the preventive or therapeutic agent of the present invention are preferably silicon fine particles, aggregates of the silicon fine particles, and/or porous silicon particles.

An active ingredient of the preventive or therapeutic agent of the present invention is preferably at least one kind of particles selected from the group consisting of silicon fine particles, aggregates of the silicon fine particles, and porous silicon particles. That is, a preferred active ingredient may be the silicon fine particles alone, may be aggregates of the silicon fine particles alone, or may be the porous silicon particles alone. In addition, two or more kinds of silicon small particles may be contained as the active ingredient. The preventive agent or therapeutic agent of the present invention preferably contains silicon fine particles and/or aggregates of the silicon fine particles. It is more preferred that aggregates of the silicon fine particles serve as a main ingredient.

The silicon small particles in the present invention are preferably small particles each formed of simple silicon, and when the simple silicon is exposed to the atmosphere, its surface is oxidized to produce a silicon oxide film. Accordingly, the silicon small particles in the present invention are preferably small particles each having a silicon oxide film formed on the surface thereof. The silicon small particles in the present invention are preferably at least one kind of particles selected from the group consisting of: silicon fine particles each formed of simple silicon, the fine particles each having a silicon oxide film formed on the surface thereof; aggregates of the silicon fine particles; and porous particles each formed of simple silicon, the porous silicon particles each having a silicon oxide film formed on the surface thereof.

The content of silicon in each of the silicon small particles is preferably 10 wt % or more, more preferably 20 wt % or more, still more preferably 50 wt % or more, most preferably 70 wt % or more.

The simple silicon is high-purity silicon. Herein, the high-purity silicon refers to silicon having a purity of 99% or more, preferably 99.9% or more, more preferably 99.99% or more.

The shape of each of the silicon small particles is not limited. Examples thereof include an indefinite shape, a polygonal shape, a spherical shape, an oval shape, and a columnar shape.

The silicon small particles may be crystalline silicon small particles each having crystallinity. In addition, the silicon small particles may be amorphous silicon small particles having no crystallinity. When having crystallinity, the silicon small particles may be monocrystalline or polycrystalline. Of those, crystalline silicon small particles are preferred, and monocrystalline silicon small particles are more preferred.

The amorphous silicon small particles may be amorphous silicon small particles formed by a plasma CV method, a laser ablation method, or the like.

The silicon oxide film to be formed on the surface of each of the silicon small particles in the present invention may be a silicon oxide film formed through natural oxidation by exposure to the atmosphere. In addition, the silicon oxide film may be a silicon oxide film artificially formed by a known method, such as chemical oxidation with an oxidizing agent, such as nitric acid.

The thickness of the silicon oxide film only needs to be a thickness that stabilizes the small particles each formed of simple silicon and enables efficient hydrogen generation. The thickness is, for example, from 0.3 nm to 3 nm, from 0.5 nm to 2.5 nm, from 0.7 nm to 2 nm, from 0.8 nm to 1.8 nm, or from 1.0 nm to 1.7 nm. The silicon oxide film is a film containing an oxide, such as $Si_2O$, $SiO$, $Si_2O_3$, or $SiO_2$, formed by the bonding of silicon at the surface of each of the small particles each formed of simple silicon to oxygen. $Si_2O$, $SiO$, $Si_2O_3$, or the like promotes a hydrogen generation reaction.

The silicon fine particles may be crystalline silicon fine particles each having crystallinity. In addition, the silicon fine particles may be amorphous silicon fine particles having no crystallinity. When having crystallinity, the silicon fine particles may be monocrystalline or polycrystalline. The silicon fine particles are preferably crystalline silicon fine particles, more preferably monocrystalline silicon fine particles (hereinafter also referred to as "silicon crystallites").

The silicon fine particles may be fine particles having mixed therein at least two selected from the group consisting of monocrystalline silicon fine particles, polycrystalline silicon fine particles, and amorphous silicon fine particles.

The silicon fine particles in the present invention may be silicon fine particles each having a silicon oxide film naturally or artificially formed after the production of the silicon fine particles. The silicon fine particles are more preferably fine particles each of which is a silicon crystallite having a silicon oxide film formed on the surface thereof.

The silicon fine particles in the present invention may be particles obtained by grinding lumps of simple silicon (high-purity silicon) or particles obtained by grinding particles of simple silicon. When the silicon fine particles are produced by grinding lumps or particles of simple silicon, the surface of each of the silicon fine particles is naturally oxidized, with the result that a silicon oxide film is formed thereon.

The particle diameter of each of the silicon fine particles in the present invention (crystallite diameter when the fine particles are silicon crystallites) is preferably 0.5 nm or more and 100 μm or less, more preferably 1 nm or more and 50 μm or less, still more preferably 1.5 nm or more and 10 μm or less, still more preferably 2 nm or more and 5 μm or less, still more preferably 2.5 nm or more and 1 μm or less, 5 nm or more and 500 nm or less, 7.5 nm or more and 200 nm or less, or 10 nm or more and 100 nm or less. When the particle diameter is 500 nm or less, a suitable hydrogen generation rate and generated hydrogen volume are obtained. When the particle diameter is 200 nm or less, a more suitable hydrogen generation rate and generated hydrogen volume are obtained.

The aggregates of the silicon fine particles in the present invention are aggregates of the above-mentioned silicon fine particles. The aggregates may be naturally formed, or may be artificially formed. Aggregates in which silicon fine particles each having a silicon oxide film formed thereon are aggregated are preferred. It is conceived that naturally formed aggregates remain aggregated in the gastrointestinal tract. The aggregates each preferably have a structure in which internal voids are present and allow water molecules to infiltrate the aggregate to react with internal fine particles. The hydrogen generation rate of each of the naturally formed aggregates is not dependent on the size of the aggregate, and hence the aggregates each have a structure in which internal voids are present and allow water molecules to infiltrate the aggregate to react with internal fine particles.

The size of each of the aggregates of the silicon fine particles is not particularly limited. The particle diameter of each of the aggregates of the silicon fine particles is preferably 10 nm or more and 500 μm or less, more preferably 50 nm or more and 100 μm or less, still more preferably 100 nm or more and 50 μm or less. The aggregates can each be formed so as to retain the surface areas of the fine particles, and can have a surface area sufficient for achieving a high capability of generating hydrogen.

The particle diameter of each of the silicon fine particles forming the aggregates of the silicon fine particles in the present invention is preferably 0.5 nm or more and 100 μm or less, more preferably 1 nm or more and 50 μm or less, still more preferably 1.5 nm or more and 10 μm or less, still more preferably 2 nm or more and 5 μm or less, still more preferably 2.5 nm or more and 1 μm or less, 5 nm or more and 500 nm or less, 7.5 nm or more and 200 nm or less, or 10 nm or more and 100 nm or less. The silicon fine particles forming the silicon aggregates may be crystalline silicon fine particles, or may be amorphous silicon fine particles. The aggregates are preferably aggregates of silicon crystallites each having a crystallite diameter of 1 nm or more and 10 μm or less. Aggregates in which silicon crystallites each having a silicon oxide film formed on the surface thereof are aggregated are preferred.

The preventive or therapeutic agent of the present invention preferably contains: silicon crystallites each having a crystallite diameter of from 1 nm to 1 μm, more preferably a crystallite diameter of 1 nm or more and 100 nm or less, the crystallites each having a silicon oxide film formed on the surface thereof; and/or aggregates thereof. The preventive or therapeutic agent preferably contains, as a main ingredient, aggregates of silicon crystallites each having a silicon oxide film formed on the surface thereof.

The porous silicon particles may be porous bodies of silicon particles. In addition, the porous silicon particles may be porous bodies obtained by aggregating and processing silicon fine particles. The porous silicon particles are preferably porous particles each formed of simple silicon, the particles each having a silicon oxide film formed on the surface thereof.

The porous silicon particles may be porous silicon particles each having crystallinity. In addition, the porous silicon particles may be amorphous porous silicon particles having no crystallinity. When having crystallinity, the porous silicon particles may be monocrystalline or polycrystalline.

The size of each of the voids present in the porous silicon particles is not limited, but may be generally from 1 nm to 1 μm, and the porous silicon particles each have a surface area sufficient for achieving a high capability of generating hydrogen. The size of each of the porous silicon particles is not particularly limited. The size may be preferably from 200 nm to 400 μm.

The aggregates of the silicon fine particles and the porous silicon particles are particles each having a large particle diameter as a whole and having a large surface area, and hence are particles suitable for oral administration. Large particles do not pass through the cell membranes and intercellular spaces of the gastrointestinal tract, in particular, the intestinal tract, and hence the silicon small particles are not absorbed in the body. Such particles are excellent from the viewpoint of safety.

The silicon small particles in the present invention are preferably silicon small particles subjected to hydrophilic treatment. The silicon small particles subjected to hydrophilic treatment are improved in efficiency of contact between surface and water, promoting the hydrogen generation reaction, and hence can generate a large volume of hydrogen. A method for the hydrophilic treatment is not particularly limited, and it is appropriate to use a known hydrophilic treatment method. Examples thereof include hydrogen peroxide water treatment and nitric acid treatment. Of those, hydrogen peroxide water treatment is preferred. The hydrophilic treatment is preferably a treatment involving removing an SiH group of the silicon oxide film on a particle surface and adding a hydroxy group to the particle surface. The particle surface refers to the surface of each of the silicon fine particles, the surface of each of the porous silicon particles, and the surface of each of the silicon fine particles for forming the aggregates of the silicon fine particles.

As a specific method for the hydrogen peroxide water treatment, for example, the silicon small particles are immersed and stirred in hydrogen peroxide water. The concentration of hydrogen peroxide is preferably from 1% to 30%, more preferably from 1.5% to 20%, still more preferably from 2% to 15% or from 2.5% to 10%, most preferably 3%. A period of time for which the silicon small particles are immersed and stirred is preferably from 5 minutes to 90 minutes, more preferably from 10 minutes to 80 minutes, still more preferably from 20 minutes to 70 minutes, most preferably from 30 minutes to 60 minutes. The hydrophilicity of each of the silicon small particles can be improved by performing the hydrogen peroxide water treatment. However, when the treatment time is increased, the hydrogen generation reaction of each of the silicon small particles proceeds to influence the thickness of the oxide film on each of the silicon small particles. The temperature of the hydrogen peroxide water during the hydrogen peroxide water treatment is preferably from 20° C. to 60° C., more preferably from 25° C. to 50° C., still more preferably from 30° C. to 40° C., most preferably 35° C.

In the preventive or therapeutic agent of the present invention, the particle size distribution of the silicon fine particles, the particle size distribution of the fine particles each formed of simple silicon, or the size distribution of the crystallites is not particularly limited. The distribution may be polydisperse. The preventive or therapeutic agent may be a formulation containing silicon fine particles having particle sizes or crystallite sizes within a specific range. In addition, the size distribution of the aggregates of the silicon fine particles is not particularly limited.

A production method for the silicon small particles of the present invention is not particularly limited, but the silicon small particles may be produced by physically grinding silicon-containing particles to target particle diameters. A suitable example of a physical grinding method is a bead mill grinding method, a planetary ball mill grinding method, a shock wave grinding method, a high-pressure collision method, a jet mill grinding method, or a grinding method in which two or more kinds of those methods are combined. In addition, a known chemical method may also be adopted. From the viewpoint of production cost or the ease of production control, the grinding method is suitably a physical grinding method. When small particles formed of fine particles of simple silicon are exposed to the atmosphere, the surface is oxidized, with the result that a silicon oxide film is formed thereon. In addition, the silicon oxide film may be artificially formed, after the grinding, by a known method, such as chemical oxidation with an oxidizing agent, such as hydrogen peroxide water or nitric acid.

When produced by grinding the silicon-containing particles with a bead mill apparatus to target particle diameters, the target sizes or particle size distribution of particles may be obtained by appropriately changing the size and/or kind of each of beads.

The silicon-containing particles serving as a starting material are not limited as long as the silicon-containing particles are high-purity silicon particles. An example thereof is commercially available powder of high-purity silicon particles. The silicon-containing particles serving as a starting material may be monocrystalline or polycrystalline, or may be amorphous.

The present invention is directed to a preventive or therapeutic agent for an oxidative stress-induced disease. The preventive or therapeutic agent for an oxidative stress-induced disease encompasses a preventive agent for an oxidative stress-induced disease, a therapeutic agent for an oxidative stress-induced disease, and a preventive and therapeutic agent for an oxidative stress-induced disease.

The preventive or therapeutic agent of the present invention exhibits the following effect on one or more symptoms of the oxidative stress-induced disease: the prevention of the onset of the symptoms; the amelioration of the symptoms; the suppression of the exacerbation of the symptoms; the prevention of the recurrence of the symptoms; or the like.

The preventive or therapeutic agent for an oxidative stress-induced disease of the present invention may also be called a treating agent for an oxidative stress-induced disease. Herein, the preventive or therapeutic agent and the treating agent have the same meaning. Accordingly, the treating agent for an oxidative stress-induced disease of the present invention encompasses a preventive agent for an oxidative stress-induced disease, a therapeutic agent for an oxidative stress-induced disease, and a preventive and therapeutic agent for an oxidative stress-induced disease. In addition, the treating agent of the present invention exhibits the following effect on one or more symptoms of the oxidative stress-induced disease: the prevention of the onset of the symptoms; the amelioration of the symptoms; the suppression of the exacerbation of the symptoms; the prevention of the recurrence of the symptoms; or the like.

The present application also relates to an invention of a method of treating an oxidative stress-induced disease, including administering a pharmaceutical agent containing silicon small particles. The method of treating is a concept encompassing a preventive method and a therapeutic method. The present invention provides a method of preventing and/or remedying an oxidative stress-induced disease, including administering a pharmaceutical agent containing silicon small particles to a human or a non-human animal. For one or more symptoms of the oxidative stress-induced disease, the present invention provides a method of preventing the onset of the symptoms, a method of ameliorating the symptoms, a method of suppressing the exacerbation of the symptoms, and a method of preventing the recurrence of the symptoms.

The oxidative stress-induced disease is a disease and symptoms associated with reactive oxygen species generated in a living body, in particular, a hydroxyl radical having strong oxidizing power, and encompasses, for example, a disease and symptoms caused by the hydroxy radical, and a disease and symptoms in which the symptoms are aggravated by the generation of the hydroxy radical. However, the oxidative stress-induced disease in the present invention does not encompass a kidney disease. The kidney disease refers to chronic renal failure, renal fibrosis, acute kidney injury, renal ischemia-reperfusion injury, drug-induced kidney injury, chronic kidney disease, and the like.

The silicon small particles in the present invention each have a property of continuously generating hydrogen over a long period of time (20 hours or more) in vitro. In a formulation according to one embodiment of the present invention, the silicon small particles generate hydrogen when brought into contact with water at a pH of 7 or more and generate more hydrogen at a pH of 8 or more. Meanwhile, the silicon small particles each have a property of hardly generating hydrogen at a pH of 5 or less.

When the silicon small particles in the present invention are orally administered, the silicon small particles generate hydrogen in the intestines, though presumed to hardly generate hydrogen in the stomach, by virtue of such properties as described above. When the silicon small particles in the present invention were administered to normal mice, hydrogen generation was recognized in the cecum, part of the large intestine, and even when normal mice were given normal diet under the same conditions, hydrogen was below the detection limit. The retention time of food in the intestines is generally 20 hours or more in humans, and hence it is conceived that the preventive or therapeutic agent of the present invention, when orally administered, can keep generating hydrogen in the intestines over a long period of time, thereby supplying hydrogen to the body.

In addition, it is conceived that, when the silicon small particles are placed on a skin or a mucous membrane for a long period of time, hydrogen can be transdermally or transmucosally supplied to the body over a long period of time.

In addition, the silicon small particles were administered to rats and then the antioxidant power of plasma was evaluated (BAP test), and as a result, it was recognized that the antioxidant power was significantly increased in the silicon small particle administration group.

A conceivable action mechanism by which the oxidative stress-induced disease is prevented and/or treated is as follows. The silicon small particles in the present invention keep generating hydrogen over a long period of time, the generated hydrogen is transferred into blood and to organs, and the hydrogen selectively reacts with a hydroxyl radical. In addition, in light of the improvement of the antioxidant power in blood, it is conceived that an antioxidant substance produced in the blood reacts with a hydroxyl radical. Further, a remarkable effect is shown as compared to that of hydrogen water, and hence it is conceived that a different action that hydrogen water does not have is obtained. For example, the following mechanism is conceivable: a protein containing a metal element, such as cobalt, that has captured hydrogen in an initial-stage generation state generated in the intestines through the reaction between the silicon small particles and water, or a protein having its reducing power enhanced as a result of a hydrogen atom donating an electron is transferred to organs, and reacts with and eliminates a hydroxy radical.

The preventive or therapeutic agent of the present invention may be a preventive or therapeutic agent for an inflammatory disease. An example of the oxidative stress-induced disease is an inflammatory disease. The inflammatory disease is a disease involving an inflammatory symptom. In the inflammatory disease, the production amounts of inflammatory cytokines are increased to increase the concentrations of the inflammatory cytokines in blood. The preventive or therapeutic agent of the present invention can suppress the production of the inflammatory cytokines. Inflammations include systemic inflammation and local inflammation. Examples of the systemic inflammation include sepsis, systemic inflammatory response syndrome (SIRS), and endotoxemia. Examples of the local inflammation include an inflammatory disease of the gastrointestinal tract, arthritis, dermatitis, and hepatitis. The present invention can provide a causal therapy for the inflammatory disease.

The preventive or therapeutic agent of the present invention may be a preventive or therapeutic agent for a systemic inflammatory disease. In addition, the preventive or therapeutic agent of the present invention may be a preventive or therapeutic agent for sepsis.

The preventive or therapeutic agent of the present invention may be a preventive or therapeutic agent for an inflammatory disease of the gastrointestinal tract. The gastrointestinal tract is a tract leading from the mouth to the anus, through which food passes, and includes the esophagus, the stomach, the duodenum, the small intestine, the large intestine, and the like. The inflammatory diseases of the gastrointestinal tract include inflammatory diseases in respective sites. Examples thereof include inflammatory bowel disease, a gastric ulcer, and a duodenal ulcer. In addition, the inflammatory bowel disease encompasses ulcerative colitis, Crohn's disease, Behçet's disease, and the like.

The preventive or therapeutic agent of the present invention may be a preventive or therapeutic agent for inflammatory bowel disease. In addition, the preventive or therapeutic agent of the present invention may be a preventive or therapeutic agent for ulcerative colitis. The silicon small particles in the present invention show an excellent preventive and/or therapeutic effect on inflammatory bowel disease. The effect is remarkably excellent as compared to that of hydrogen water. Through the administration of the preventive or therapeutic agent of the present invention, the progression of symptoms of colitis, such as body weight loss and diarrhea are suppressed, and the aggravation of inflammatory bowel disease is suppressed. In addition, bleeding due to inflammation is suppressed, and the shortening of the large intestine caused by cell death due to inflammation is suppressed. In addition, crypt collapse and the disappearance of folds, which are characteristics of colitis, are suppressed. In addition, through the administration of the silicon small particles in the present invention, visceral discomfort and visceral pain (e.g., abdominal pain) accompanying inflammatory bowel disease are alleviated. This is because neuronal activation of the vagal dorsal motor nucleus and solitary nucleus of the medulla oblongata, which respond to visceral discomfort and visceral pain, and of the central amygdaloid nucleus is suppressed by the silicon small particles. The administration of the silicon small particles of the present invention can improve antioxidant power in blood. It was recognized that the oxidation of lipids in the blood of inflammatory bowel disease model mice administered the silicon small particles was suppressed.

The finding of a causal therapy for inflammatory bowel disease, for which only symptomatic therapy, cytapheresis, or surgical treatment has been available, is greatly conducive to future prevention and treatment.

The preventive or therapeutic agent of the present invention may be a preventive or therapeutic agent for arthritis. The silicon small particles in the present invention show an excellent preventive and/or therapeutic effect on arthritis. Herein, the arthritis encompasses arthritis caused by rheumatism, bacterial arthritis, and arthritis caused by trauma. Examples thereof include chronic rheumatoid arthritis, tuberculous arthritis, psoriatic arthritis, and spondylarthritis. The preventive or therapeutic agent of the present invention may be suitably a preventive or therapeutic agent for chronic rheumatoid arthritis. In addition, the preventive or therapeutic agent of the present invention may be a suppressor for the onset of arthritis. In addition, the preventive or therapeutic agent of the present invention may be an agent for alleviating joint swelling accompanying arthritis.

The number of arthritis patients has been increasing in recent years along with population aging and an increase in obesity, and hence the finding of a causal therapy for arthritis is greatly conducive to future medicine and health promotion.

The preventive or therapeutic agent of the present invention may be a preventive or therapeutic agent for dermatitis. The silicon small particles in the present invention show an excellent preventive and/or therapeutic effect on dermatitis. Herein, the dermatitis encompasses contact dermatitis, allergic contact dermatitis, contact urticaria, and the like. The preventive or therapeutic agent of the present invention may be suitably a preventive or therapeutic agent for contact dermatitis. The preventive or therapeutic agent of the present invention may be an agent for suppressing swelling and/or thickening of an inflamed site in dermatitis. In addition, the preventive or therapeutic agent of the present invention may be an agent for suppressing swelling and/or thickening of an inflamed site in contact dermatitis. The finding of a causal therapy for dermatitis is greatly conducive to future medicine and health promotion.

The preventive or therapeutic agent of the present invention may be a preventive or therapeutic agent for hepatitis. The silicon small particles in the present invention show an excellent preventive and/or therapeutic effect on hepatitis. Herein, the hepatitis encompasses acute hepatitis and chronic hepatitis. Herein, the hepatitis encompasses alcoholic hepatitis, viral hepatitis, drug-induced hepatitis, and the like. In addition, herein, the concept of acute hepatitis encompasses fulminant hepatitis involving marked liver injury. The preventive or therapeutic agent of the present invention may be a preventive or therapeutic agent for acute hepatitis. In addition, the preventive or therapeutic agent of the present invention may be a preventive or therapeutic agent for fulminant hepatitis. The finding of a causal therapy for hepatitis is greatly conducive to future medicine and health promotion.

The preventive or therapeutic agent of the present invention may be a preventive or therapeutic agent for visceral discomfort. The silicon small particles in the present invention show an excellent preventive and/or therapeutic effect on visceral discomfort. Herein, the visceral discomfort encompasses visceral pain, vomiting, nausea, diarrhea, borborygmus, and the like. The preventive or therapeutic agent of the present invention may be a preventive or therapeutic agent for at least one selected from the group consisting of visceral pain, vomiting, nausea, borborygmus, and diarrhea. The visceral pain includes abdominal pain (e.g., upper abdominal pain or lateral abdominal pain), back pain, shoulder pain, and the like.

The vagal dorsal motor nucleus and the solitary nucleus in the dorsal part of the medulla oblongata are involved in visceral discomfort, visceral pain, and gastrointestinal motility. The vagal dorsal motor nucleus and the solitary nucleus are brain regions involved in visceral sensation, such as visceral pain. The central amygdaloid nucleus is involved in pain, such as visceral pain. The vomiting center is involved in vomiting and nausea. The preventive or therapeutic agent of the present invention can suppress the activation of the vagal dorsal motor nucleus, the solitary nucleus, the central amygdaloid nucleus, and the vomiting center.

A disease in which abnormal activity in the gastrointestinal tract is caused involves visceral pain, vomiting, nausea, diarrhea, and borborygmus as cardinal symptoms. When those symptoms are ameliorated, the quality of life of a patient is greatly ameliorated.

The preventive or therapeutic agent of the present invention may be a preventive or therapeutic agent for visceral discomfort accompanying an inflammatory disease of the gastrointestinal tract. The inflammatory disease of the gastrointestinal tract involves visceral pain (e.g., abdominal pain) and diarrhea as cardinal symptoms. Therefore, a patient's distress is greatly ameliorated by administering the silicon particles in the present invention. More specifically, the preventive or therapeutic agent of the present invention may be a preventive or therapeutic agent for visceral discomfort accompanying inflammatory bowel disease. In addition, the preventive or therapeutic agent of the present invention may be a preventive or therapeutic agent for visceral pain accompanying inflammatory bowel disease. The preventive or therapeutic agent of the present invention may be a preventive or therapeutic agent for abdominal pain accompanying inflammatory bowel disease.

The preventive or therapeutic agent of the present invention may be a preventive or therapeutic agent for visceral discomfort accompanying anticancer agent administration. The visceral discomfort accompanying anticancer agent administration encompasses vomiting, nausea, diarrhea, visceral pain, and the like. The preventive or therapeutic agent of the present invention may be a preventive or therapeutic agent for nausea or vomiting accompanying anticancer agent administration. As an anticancer agent that is liable to cause vomiting and nausea as side effects, there are known a platinating agent, an alkylating agent, a camptothecin-based topoisomerase inhibitor, an anthracycline-based anticancer antibiotic, and the like. The preventive or therapeutic agent of the present invention may be suitably a preventive or therapeutic agent for nausea or vomiting accompanying platinating agent administration.

The present invention is excellent in effect of alleviating or preventing visceral discomfort and is also excellent in safety. When symptoms of visceral discomfort are alleviated or prevented, the quality of life of a patient is ameliorated. In addition, anticancer agent treatment can be continued. The present invention, with its finding of a causal therapy for visceral discomfort, is greatly conducive to future treatment of visceral discomfort and cancer treatment.

The preventive or therapeutic agent of the present invention may be a preventive or therapeutic agent for depression or a depressive state. The silicon small particles in the present invention show an excellent preventive and/or therapeutic effect on depression or the depressive state. Symptoms of depression include a depressed mood, a sleep disorder, a loss of interest/joy, an appetite disorder, a lowering in ability to think/ability to concentrate/ability to make decisions, a sense of worthlessness, a sense of remorse, a sense of fatigue, listlessness, and the like. The International Statistical Classification of Diseases and Related Health Problems (ICD) and the Diagnostic and Statistical Manual of Mental Disorders (DSM) have been utilized as diagnostic criteria for depression. The depression or the depressive state in the present invention also encompasses, for example, a depressive state with relatively mild symptoms that is not diagnosed as depression according to the diagnostic criteria, and a depressive state accompanying another disease (e.g., depressiveness accompanying an anxiety disorder or depressiveness accompanying cancer).

Depression and the depressive state are diseases that have been increasing in recent years, and are diseases having low remission rates and, even when remission is achieved, having high recurrence rates. Accordingly, the finding of a causal therapy for depression or the depressive state is greatly conducive to future medicine and health promotion.

The preventive or therapeutic agent of the present invention may be a preventive or therapeutic agent for Parkinson's disease. The silicon small particles in the present invention show an excellent preventive and/or therapeutic effect on Parkinson's disease. The preventive or therapeutic agent of the present invention may be an agent for ameliorating motor symptoms of Parkinson's disease. The number of Parkinson's disease patients has been increasing in recent years along with population aging. There is no definitive therapy for the disease, and hence the finding of a causal therapy for Parkinson's disease is greatly conducive to future medicine and health promotion.

The preventive or therapeutic agent of the present invention may be a preventive or therapeutic agent for an autism spectrum disorder. The silicon small particles in the present invention show an excellent preventive and/or therapeutic effect on the autism spectrum disorder. Symptoms of the autism spectrum disorder include social communication impairments (social interaction impairments, having trouble understanding other people's feelings or talking about their own feelings), restricted and repetitive patterns of behaviors, interests or activities (inflexible adherence to routines), hypersensitivity/hyposensitivity (sensitive/insensitive), and the like. Herein, the autism spectrum disorder encompasses autism (autistic disorder), Asperger syndrome, childhood disintegrative disorder, and pervasive developmental disorder not otherwise specified. The preventive or therapeutic agent of the present invention may be suitably a preventive or therapeutic agent for social communication impairments.

The number of patients with autism spectrum disorder has tended to markedly increase in recent years. However, there is no radical treatment method therefor. The finding of a causal therapy for the autism spectrum disorder is greatly conducive to future medicine and health promotion.

The preventive or therapeutic agent of the present invention may be a preventive or therapeutic agent for memory impairment. The silicon small particles in the present invention show an excellent preventive and/or therapeutic effect on memory impairment. Herein, the memory impairment encompasses dementia, mild cognitive impairment (MCI), cognitive impairment associated with an underlying disease (e.g., cognitive impairment associated with an inflammatory disease, such as collagenosis or an infectious disease), and the like. The preventive or therapeutic agent of the present invention may be a preventive or therapeutic agent for dementia or mild cognitive impairment.

The number of memory impairment patients has been increasing in recent years along with population aging. There is no definitive therapy for the disease, and hence the finding of a causal therapy for memory impairment is greatly conducive to future medicine and health promotion.

The preventive or therapeutic agent of the present invention may be a preventive or therapeutic agent for spinal cord injury. The silicon small particles in the present invention show an excellent preventive and/or therapeutic effect on spinal cord injury. Herein, the spinal cord injury encompasses, for example, complete injury and incomplete injury. Various symptoms after spinal cord injury include motor dysfunction, sensory dysfunction, bladder dysfunction, rectal dysfunction, respiratory dysfunction, numbness, and the like. The preventive or therapeutic agent of the present invention may be suitably a preventive or therapeutic agent for motor dysfunction accompanying spinal cord injury.

The number of spinal cord injury patients has been increasing in recent years along with population aging, and hence the finding of a causal therapy for various impairments (symptoms) after spinal cord injury is greatly conducive to future medicine and health promotion.

The preventive or therapeutic agent of the present invention may be a preventive or therapeutic agent for hearing loss. The silicon small particles in the present invention show an excellent preventive and/or therapeutic effect on hearing loss. Herein, the hearing loss refers to a condition of diminished hearing, and encompasses noise-induced hearing loss, hearing loss due to cerebral infarction, hearing loss due to infection, age-related hearing loss, hearing loss due to a side effect of a drug, and the like. The preventive or therapeutic agent of the present invention may be a preventive or therapeutic agent for noise-induced hearing loss.

The number of hearing loss patients has been increasing in recent years, and there is no definitive therapy for the disease. Accordingly, the finding of a causal therapy for hearing loss is greatly conducive to future medicine and health promotion.

The preventive or therapeutic agent of the present invention may be a preventive or therapeutic agent for damage due to cerebral ischemia or reperfusion injury after cerebral ischemia. The silicon small particles in the present invention show an excellent preventive and/or therapeutic effect on damage due to cerebral ischemia and/or reperfusion injury after cerebral ischemia. Herein, the damage due to cerebral ischemia or the reperfusion injury after cerebral ischemia refers to damage that the brain sustains when the brain is brought into an ischemic state by cerebral infarction or the like or damage that the brain and other organs sustain when blood reperfusion occurs. Ischemia or blood reperfusion damages neurons, leading to necrosis, resulting in motor dysfunction, sensory dysfunction, or cognitive dysfunction. In addition, blood reperfusion causes not only damage occurring locally but also damage spreading even to a distant organ in some cases. Along with aging, the number of patients suffering from dementia, motor dysfunction, and the like due to ischemia or post-ischemic reperfusion has been increasing, and hence the finding of a causal therapy for damage due to cerebral ischemia or reperfusion injury after cerebral ischemia is greatly conducive to future medicine and health promotion.

The preventive or therapeutic agent of the present invention may be a preventive or therapeutic agent for diabetes. The silicon small particles in the present invention show an excellent preventive and/or therapeutic effect on diabetes. Herein, the diabetes encompasses all types of diabetes, including type 1 diabetes, type 2 diabetes, and gestational diabetes. The preventive or therapeutic agent of the present invention may be suitably a preventive or therapeutic agent for type 2 diabetes.

The number of diabetes patients has been increasing in recent years along with population aging and an increase in obesity, and hence the finding of a causal therapy for diabetes is greatly conducive to future medicine and health promotion.

The preventive or therapeutic agent of the present invention may be a preventive or therapeutic agent for a hangover. The silicon small particles in the present invention show an excellent preventive and/or therapeutic effect on the hangover. The preventive or therapeutic agent of the present invention prevents the onset of at least one symptom of the hangover, suppresses the exacerbation of the symptom, allows early recover from the symptom, or ameliorates the symptom. Examples of the symptom of the hangover include headache, a sleep disorder, nausea, retching/vomiting, hand trembling, cognitive impairment, sensory impairment, depressive mood, and autonomic symptoms. The finding of a causal therapy for the hangover is greatly conducive to future medicine and health promotion.

Targets of prevention or treatment with the preventive or therapeutic agent of the present invention are a human and a non-human animal. Preferred examples of the non-human animal include a pet and livestock.

One kind or two or more kinds of the silicon small particles in the present invention may be administered as they are to a human or a non-human animal, but as required, may be administered after having been mixed with an acceptable additive or carrier and formulated into a form well known to a person skilled in the art. Examples of such additive or carrier include a pH adjuster (e.g., sodium hydrogen carbonate, sodium carbonate, potassium carbonate, or citric acid), an excipient (e.g., a sugar derivative, such as mannitol or sorbitol; a starch derivative, such as corn starch or potato starch; or a cellulose derivative, such as crystalline cellulose), a lubricant (e.g., a stearic acid metal salt, such as magnesium stearate; or talc), a binder (e.g., hydroxypropyl cellulose, hydroxypropyl methyl cellulose, or polyvinylpyrrolidone), a disintegrant (e.g., a cellulose derivative, such as carboxymethyl cellulose or carboxymethylcellulose calcium), and an antiseptic (e.g., a p-oxybenzoic acid ester, such as methylparaben or propylparaben; or an alcohol, such as chlorobutanol or benzyl alcohol). Those additives and carriers may be blended alone or as a mixture thereof into the silicon small particles. A preferred example of the additive is a pH adjuster with which a pH can be adjusted to 8 or more. A preferred example of the pH adjuster is sodium hydrogen carbonate.

The administration route of the preventive or therapeutic agent of the present invention is not particularly limited, but a preferred example of the administration route is oral, transdermal, or transmucosal (e.g., the mouth, rectum, or vagina).

As a formulation for oral administration, there are given a tablet, a capsule, a granule, a powder, a syrup (dry syrup), an oral jelly, and the like. As a formulation for transdermal administration or for transmucosal administration, there are given a patch, an ointment, and the like.

The tablet, the capsule, the granule, the powder, and the like may each be turned into an enteric formulation. For example, the tablet, the granule, or the powder is subjected to enteric coating. As an enteric coating agent, an enteric coating agent that is poorly soluble in the stomach may be used. The capsule may be made by filling an enteric capsule with the silicon small particles of the present invention. In addition, a hydrogen generation rate may be adjusted by adjusting the particle diameters and particle size distribution of the silicon small particles.

The preventive or therapeutic agent of the present invention may be formulated into any of the above-mentioned dosage forms and then administered to a human or a non-human animal.

The content of the silicon small particles in the preventive or therapeutic agent of the present invention is not particularly limited, but is, for example, from 0.1 wt % to 100 wt %, from 1 wt % to 99 wt %, or from 5% to 95%.

The dose and number of times of administration of the silicon small particles in the present invention may be appropriately changed depending on conditions such as the administration target, the age, body weight, and sex thereof, a purpose (e.g., for prevention or for treatment), the severity of a symptom, the dosage form, and the administration route. When the silicon small particles are administered to a human, a preferred dose thereof is, for example, as follows: about 0.1 mg to about 10 g, preferably about 1 mg to about 5 g, more preferably about 1 mg to about 2 g thereof are administered per day. In addition, the number of times of administration may be once or a plurality of times per day, or once every few days. For example, the number of times of administration may be from 1 to 3 times, 1 or 2 times, or once per day.

The preventive or therapeutic agent for an oxidative stress-induced disease (excluding a kidney disease), containing silicon small particles, of the present invention may be utilized for a pharmaceutical, a quasi-drug, a medical device, a hygienic product, a food, or a beverage.

The present application also relates to an invention of a pharmaceutical composition for preventing or treating an oxidative stress-induced disease (excluding a kidney disease), containing silicon small particles. The present application also relates to an invention of a pharmaceutical composition containing the preventive or therapeutic agent for an oxidative stress-induced disease (excluding a kidney disease) containing the silicon small particles. The pharmaceutical composition in the present invention also encompasses a composition having such a mild action as to qualify as a quasi-drug. Examples of embodiments of the pharmaceutical composition of the present invention may include the embodiments of the invention relating to a preventive or therapeutic agent described above.

The present application also relates to an invention of a medical device including the preventive or therapeutic agent for an oxidative stress-induced disease (excluding a kidney disease) containing the silicon small particles. The present application also relates to an invention of a medical device for preventing or treating an oxidative stress-induced disease (excluding a kidney disease), containing the silicon small particles. The medical device in the present invention refers to, for example, a tool or instrument intended for use in the treatment or prevention of a disease of a human or a non-human animal. An example of the medical device is a mask. When the mask of the present invention is worn, hydrogen can be directly supplied to the trachea or the lungs. In addition, another example of the medical device is an adhesive bandage.

The present application also relates to an invention of a hygienic product for preventing an oxidative stress-induced disease (excluding a kidney disease), containing silicon small particles. Examples of embodiments of the present invention may include the embodiments of the invention relating to a preventive or therapeutic agent described above. The hygienic product of the present invention may be a tool or product to be brought into contact with a skin or a mucous membrane of a human or a non-human animal and encompasses those classified as quasi-drugs as well. Examples thereof include a diaper and a sanitary product.

The present application also relates to an invention of a food or beverage including the preventive or therapeutic agent for an oxidative stress-induced disease (excluding a kidney disease) containing the silicon small particles. The present application also relates to an invention of a food or beverage for preventing or treating an oxidative stress-induced disease (excluding a kidney disease), containing the silicon small particles. Preferred examples of the food or beverage of the present invention include a health food, a food with function claims, and a food for specified health use. The form of the food or beverage is not limited. Examples thereof include: a form of a mixture obtained by mixing the silicon small particles into an existing food or beverage; and a formulated form. Examples thereof include a tablet, a capsule, a powder, a granule, and a jelly.

Now, the present invention is more specifically described by way of Examples. However, the present invention is by no means limited thereto.

EXAMPLES

Example 1

200 g of high-purity silicon powder (manufactured by Kojundo Chemical Laboratory Co., Ltd., particle size distribution: <φ5 μm (silicon particles each having a crystal grain diameter of more than 1 μm), purity: 99.9%) was dispersed in liters (4 L) of a 99.5 wt % ethanol solution, φ0.5 μm zirconia beads (volume: 750 ml) were added, and the mixture was finely divided by performing grinding (one-stage grinding) at a rotation speed of 2,500 rpm for 4 hours using a bead mill apparatus (manufactured by Aimex Co., Ltd., horizontal continuous ready mill (model: RHM-08)).

The ethanol solution containing the finely divided silicon particles was separated from the beads by a separation slit arranged in a grinding chamber of the bead mill apparatus, and was then heated to from 30° C. to 35° C. with a vacuum evaporator. The ethanol solution was evaporated to give the finely divided silicon particles (crystallites).

The finely divided silicon particles (crystallites) obtained by the method described above mainly had crystallite diameters of 1 nm or more and 100 nm or less, and most of the crystallites formed aggregates. In addition, the crystallites were each covered with a silicon oxide film, and the silicon oxide film had a thickness of about 1 nm. The silicon crystallites were subjected to measurement with an X-ray diffractometer (SmartLab manufactured by Rigaku Denki Co., Ltd.). The results were as follows: in a volume distribution, the mode diameter was 6.6 nm, the median diameter was 14.0 nm, and the average crystallite diameter was 20.3 nm. The obtained mixture of the silicon crystallites each having a silicon oxide film formed thereon and the aggregates thereof is silicon small particles serving as an active ingredient in one embodiment of the present invention.

Example 2

The silicon crystallites and aggregates thereof obtained in Example 1 were mixed with hydrogen peroxide water (3 wt %) in a glass container, and the contents were stirred at 35° C. for 30 minutes. The silicon crystallites and aggregates thereof treated with hydrogen peroxide water were subjected to solid-liquid separation treatment using a known centrifugal separator to remove the hydrogen peroxide water. After that, the resultant silicon crystallites and aggregates thereof were further mixed with an ethanol solution (99.5 wt %), and the mixture was thoroughly stirred. The silicon crystallites and aggregates thereof mixed with the ethanol solution were subjected to solid-liquid separation treatment using a known centrifugal separator to remove the highly volatile ethanol solution, followed by sufficient drying. The resultant mixture of the silicon crystallites each having a silicon oxide film formed thereon and aggregates thereof subjected to the hydrogen peroxide water treatment are silicon small particles serving as an active ingredient in one embodiment of the present invention. The hydrogen generation rate of the aggregates of the silicon crystallites obtained was not dependent on the sizes of the aggregates.

The generated hydrogen volume of the silicon small particles (silicon crystallites and aggregates thereof) obtained in Example 2 was measured. 10 mg of the silicon small particles were placed in a glass bottle having a volume of 100 ml (borosilicate glass, thickness: about 1 mm, Laboran Screw Tube Bottle manufactured by AS ONE Corporation). Water adjusted with sodium hydrogen carbonate to a pH of 8.2 was placed in the glass bottle, which was sealed under the temperature condition of a liquid temperature of 36° C., and a hydrogen concentration in the liquid in the glass bottle was measured. A portable dissolved hydrogen meter (manufactured by DKK-TOA Corporation, model: DH-35A) was used for the measurement of the hydrogen concentration. The generated hydrogen volume per g of the silicon small particles is shown in FIG. 1.

Example 3

Figure 2:
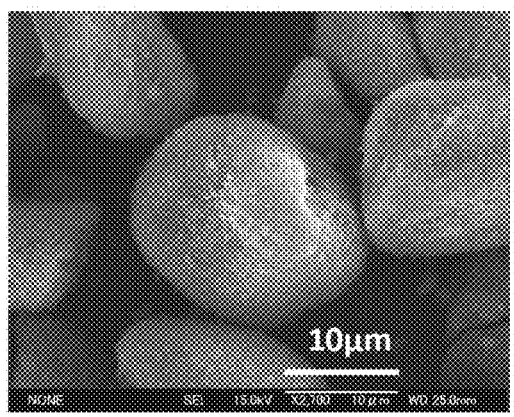
FIG. 2 is a photograph of aggregates of silicon crystallites taken with a scanning electron microscope (SEM).

The silicon crystallites and aggregates thereof obtained in Example 1 were treated with hydrogen peroxide water and mixed with an ethanol solution in the same manner as in Example 2. The silicon crystallites and aggregates thereof mixed with the ethanol solution were dried with Spray-Dryer (ADL311S-A, manufactured by Yamato Scientific Co., Ltd.). The obtained aggregates of the silicon crystallites are silicon small particles serving as an active ingredient in one embodiment of the present invention. A scanning electron microscope (SEM) photograph of the obtained aggregates of the silicon crystallites is shown in FIG. 2.

Example 4

One-stage grinding was performed in the same manner as in Example 1. The φ0.5 μm zirconia beads (volume: 750 ml) used for the one-stage grinding were automatically separated from the solution containing the silicon crystallites in the bead mill grinding chamber. To the resultant solution of the silicon crystallites, 0.3 μm zirconia beads (volume: 750 ml) were added, and the silicon crystallites were finely divided through further grinding at a rotation speed of 2,500 rpm for 4 hours (two-stage grinding).

The beads were separated from the solution containing the silicon crystallites as described above, and the resultant ethanol solution containing the silicon crystallites was heated to 40° C. using a vacuum evaporator in the same manner as in Example 1. Ethanol was evaporated to give two-stage ground silicon crystallites. The thus two-stage ground silicon crystallites each having a silicon oxide film formed thereon are also silicon small particles serving as an active ingredient in one embodiment of the present invention.

Example 5

The mixture of the silicon crystallites each having a silicon oxide film formed thereon and aggregates thereof subjected to the hydrogen peroxide water treatment obtained in Example 2 were filled into a commercially available capsule No. 3 to provide a capsule formulation. This capsule formulation contains, as its main ingredient, the aggregates of the silicon crystallites each having a silicon oxide film formed thereon subjected to the hydrogen peroxide water treatment, and further contains the silicon crystallites each having a silicon oxide film formed thereon subjected to the hydrogen peroxide water treatment.

Test Example

I. Preparation of Silicon Small Particle-Containing Diet

Normal feed (manufactured by Oriental Yeast Co., Ltd., model number: AIN93M) was mixed with the silicon small particles (silicon crystallites and aggregates thereof) produced in Example 2 so that the amount of the particles was 2.5 wt %. Further, an aqueous citric acid solution (pH 4) was added in an amount of about 0.5 wt % with respect to the total amount of the silicon small particles and the feed, and the mixture was kneaded using a known kneading apparatus to give silicon small particle-containing diet.

II. Pharmacological Actions of Silicon Small Particles

A. Improvement of Antioxidant Power

Figure 3:
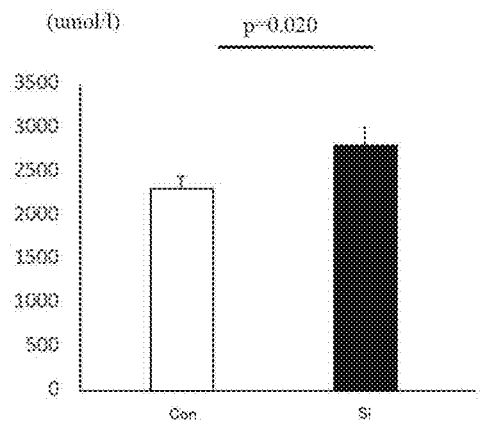
FIG. 3 is a graph showing the results of the antioxidant power (BAP test) of the plasma of normal SD rats administered the silicon small particles for 8 weeks. Con represents a control group, and Si represents a silicon small particle administration group.

SD rats (6-week-old) were obtained. A silicon small particle administration group was given the silicon small part icle-containing diet, and a control group was given normal feed (normal diet) (manufactured by Oriental Yeast Co., Ltd., model number: AIN93M). After 8 weeks of administration, blood was collected, and the antioxidant power of plasma was evaluated (BAP test) (free radical analyzer FREE Carrio Duo). The results are shown in FIG. 3. It was shown that the antioxidant power was significantly increased in the silicon small particle administration group.

B. Pharmacological Test with Systemic Inflammatory Disease Model Mice

Figure 4:
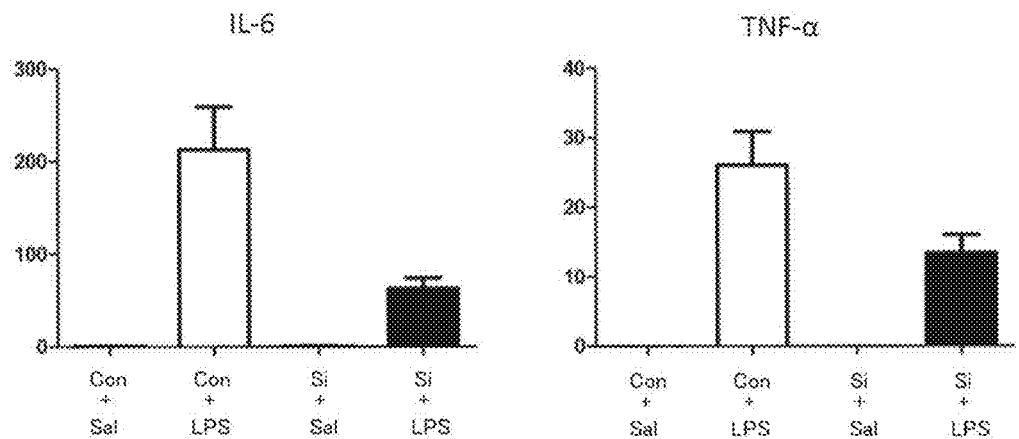
FIG. 4 includes graphs showing the results of administration of the silicon small particles to mice having inflammation induced by lipopolysaccharide (LPS). Con represents a control group, and Si represents a silicon small particle administration group. Sal represents a saline intraperitoneal administration group, and LPS represents an LPS intraperitoneal administration group. The vertical axes represent the concentration (pg/ml) of IL-6 and the concentration (pg/ml) of TNF-α.

An investigation was made on the influence of the silicon small particles on inflammatory cytokines produced by administering inflammatory response-inducing lipopolysaccharide to mice. ICR mice (male, 7-week-old, body weight 30 g to 35 g) were obtained from Japan SLC (Day 1). A silicon small particle administration group was given the silicon small particle-containing diet, and a control group was given normal feed (normal diet) (manufactured by Oriental Yeast Co., Ltd., model number: AIN93M) (Day 1 to Day 7). On the 6th day (Day 6), 1 mg/kg of saline or lipopolysaccharide (LPS) was intraperitoneally administered. After 24 hours from the administration, blood was collected and the concentrations of inflammatory cytokines (IL-6 and TNF-α) in serum was measured by ELISA (R&D Systems). The results are shown in FIG. 4. It was shown that the increases in production amounts of the inflammatory cytokines caused by the LPS administration were suppressed by the silicon small particles. The above-mentioned results revealed that the silicon small particles in the present invention suppressed the production of the inflammatory cytokines, thereby exhibiting a preventive effect and a therapeutic effect on a systemic inflammatory disease.

C. Pharmacological Tests with Inflammatory Bowel Disease Model Mice

C-1. Preparation of Inflammatory Bowel Disease Model Mice

C57B16/J mice (male, 7-week-old, body weight: 24 g to 25 g) were obtained from Japan SLC. A silicon small particle administration group was given the silicon small part icle-containing diet, and a control group was given normal feed (normal diet) (manufactured by Oriental Yeast Co., Ltd., model number: AIN93M). The day (Id) after the day (Od) of the initiation of each diet, ad libitum water drinking of 5% dextran sulfate sodium (hereinafter DSS) (MP Bio) was initiated in the silicon small particle administration group and the control group to prepare inflammatory bowel disease model mice. This model is a standard model of inflammatory bowel disease. The usefulness of the silicon small particles was evaluated in terms of antioxidant power, body weight loss, colitis score (Table 1), survival rate, biopsy material examination findings (length and state of the large intestine), histopathological analysis, neural activity involved in visceral discomfort and visceral pain, and comparison to hydrogen water.

C-2. Improvement of Antioxidant Power

Figure 5:
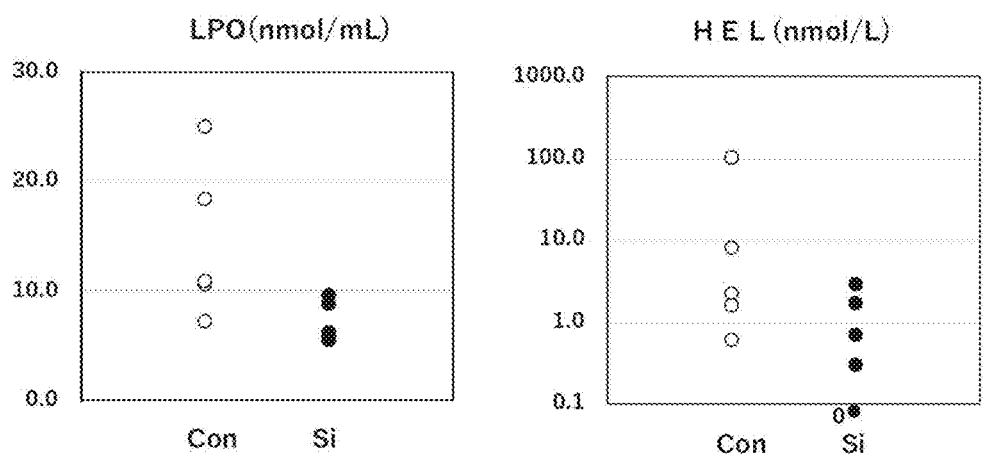
FIG. 5 includes graphs showing the respective concentrations of two kinds of lipid peroxides, i.e., lipid hydroperoxide (LPO) and hexanoyl-lysine (HEL) in blood after administration of the silicon small particles to inflammatory bowel disease model mice. Con represents a control group, and Si represents a silicon small particle administration group.

The blood of mice on the 3rd day (3 d) after DSS administration was collected (5 mice per group). The concentrations of two kinds of lipid peroxides, i.e., lipid hydroperoxide (LPO) and hexanoyl-lysine (HEL) in the collected blood were measured. For LPO measurement, an LPO measurement kit (Japan Institute for the Control of Aging) was used. For HEL measurement, a hexanoyl-lysine measurement kit (Japan Institute for the Control of Aging) was used. LPO is a collective term for lipid peroxides each having a hydroperoxide group (—OOH). Hexanoyl-lysine (HEL) is an oxidative stress biomarker that allows the initial stage of lipid peroxidation to be grasped. The measurement results are shown in FIG. 5. It was shown that the production of LPO and the production of HEL were suppressed by the silicon small particle administration, showing that the antioxidant power in the blood was improved by the silicon small particle administration.

C-3. Body Weight Loss, Colitis Score, and Survival Rate

In body weight loss, colitis score (Table 1), and survival rate tests, a silicon small particle administration group of 25 mice and a control group of 25 mice were used (8 mice per group in each evaluation).

TABLE 1

| | Colitis score | | | |
|---|---|---|---|---|
| | Body weight | Hardness of feces | | Bleeding at anus |
| 0 | 0% (with reference to a standard) | Well-formed feces | No adhesion to anus | No bleeding |
| 1 | 1% to 5% reduction | | | |
| 2 | 5% to 10% reduction | Sticky and unformed feces | No adhesion to anus | Bleeding recognized (slight) |
| 3 | 10% to 20% reduction | | | |
| 4 | 20% or more reduction | Liquid feces | Adhesion to anus found | Bleeding found |

Figure 6:
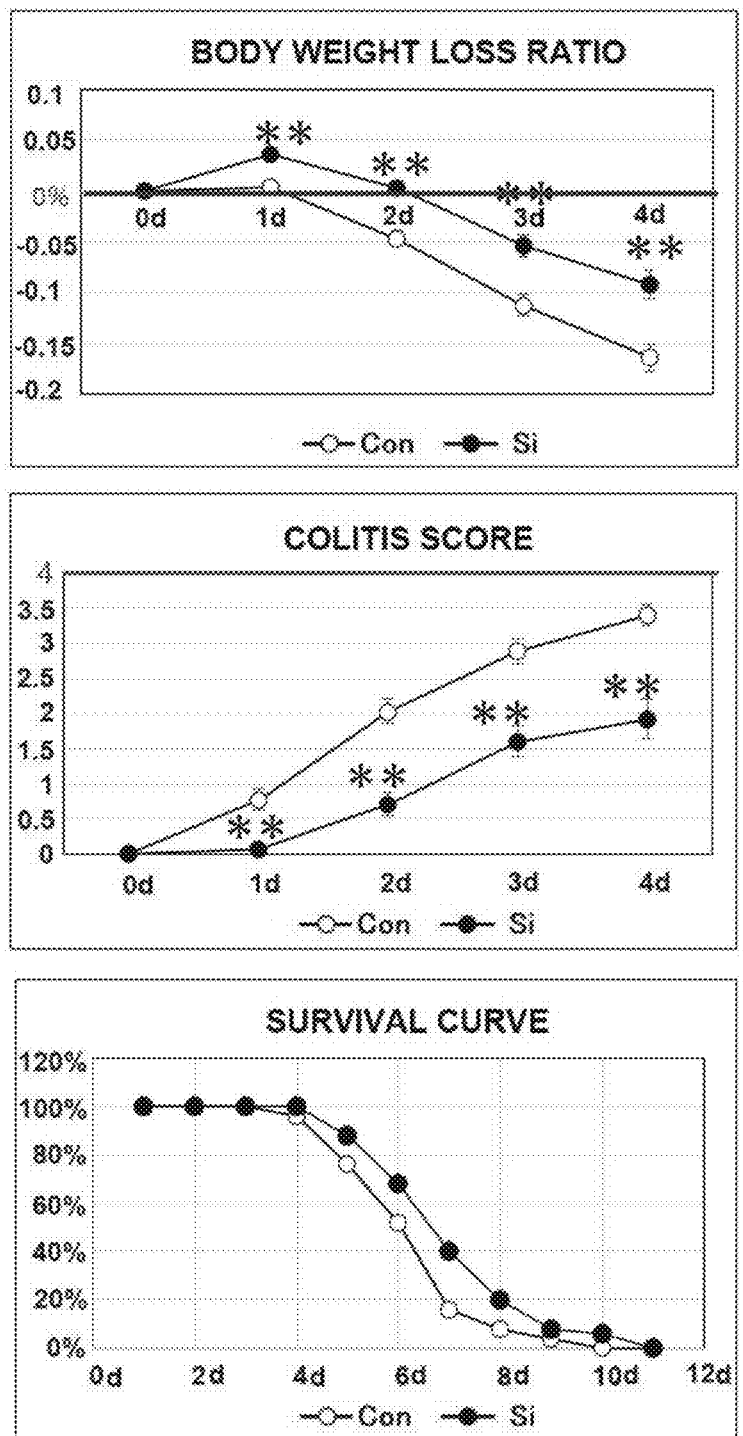
FIG. 6 includes graphs showing the results of administration of the silicon small particles to inflammatory bowel disease model mice (body weight loss ratio, colitis score, and survival rate). Symbol "○" represents a control group, and Symbol "•" represents a silicon small particle administration group.

*The above-mentioned three kinds of values are added and divided by 3. 0: healthy, 4: maximally active state of colitis The results of the body weight loss, the colitis score, and the survival rate are shown in FIG. 6. Among the inflammatory bowel disease model mice, the silicon small particle administration group was significantly suppressed in body weight loss and progression of colitis as compared to the control group. And in the silicon small particle administration group, a tendency having a high survival rate was observed as compared to the control group. While the condition of the inflammatory bowel disease that had developed continued to aggravate in the mice of the control group, the aggravation of the inflammatory bowel disease was significantly suppressed in the mice of the silicon small particle administration group.

C-4. Biopsy Material Examination

The biopsy material examination was performed by cutting the ileum to excise the intestine from the cecum to the anus, and measuring the length of the large intestine (length from the colon to the rectum). The large intestines were excised from 8 mice of the silicon small particle administration group and 8 mice of the control group on the 3rd day (3 d) after the DSS administration, and from 7 mice of the silicon small particle administration group and 8 mice of the control group on the 5th day (5 d) after the DSS administration. In addition, also from 4 mice of a wild-type group, the ileum was similarly cut to excise the intestine from the cecum to the anus.

Figure 7:
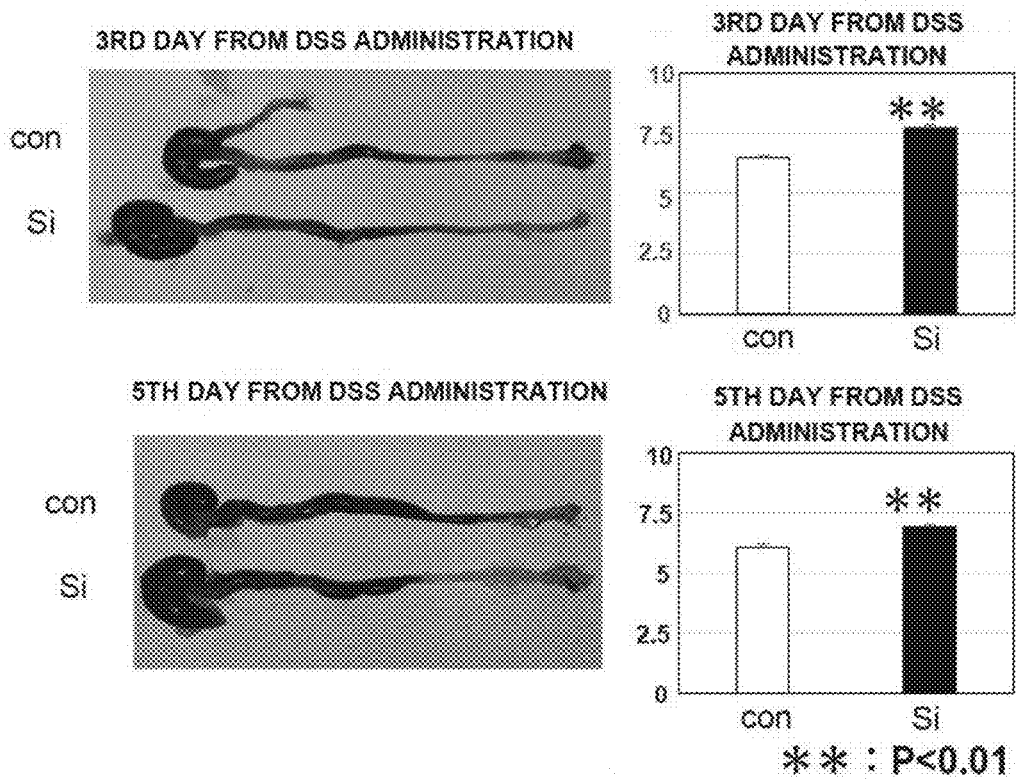
FIG. 7 includes photographs showing the states of large intestines after administration of the silicon small particles to inflammatory bowel disease model mice and graphs showing the lengths (cm) of the large intestines. con represents a control group, and Si represents a silicon small particle administration group.

FIG. 7 shows a comparison of the lengths of the large intestines (lengths from colons to rectums) of the control group and the silicon small particle administration group. It was shown that, on both the 3rd day (3 d) and the 5th day (3 d), the silicon administration group had significantly larger lengths. In addition, in FIG. 7, photographs of the excised intestines from ceca to anuses are shown. On both 3 d and 5 d, bleeding was found in a lower part of the rectum of the control mice, but bleeding was not found in the mice administered the silicon small particles.

Figure 8:
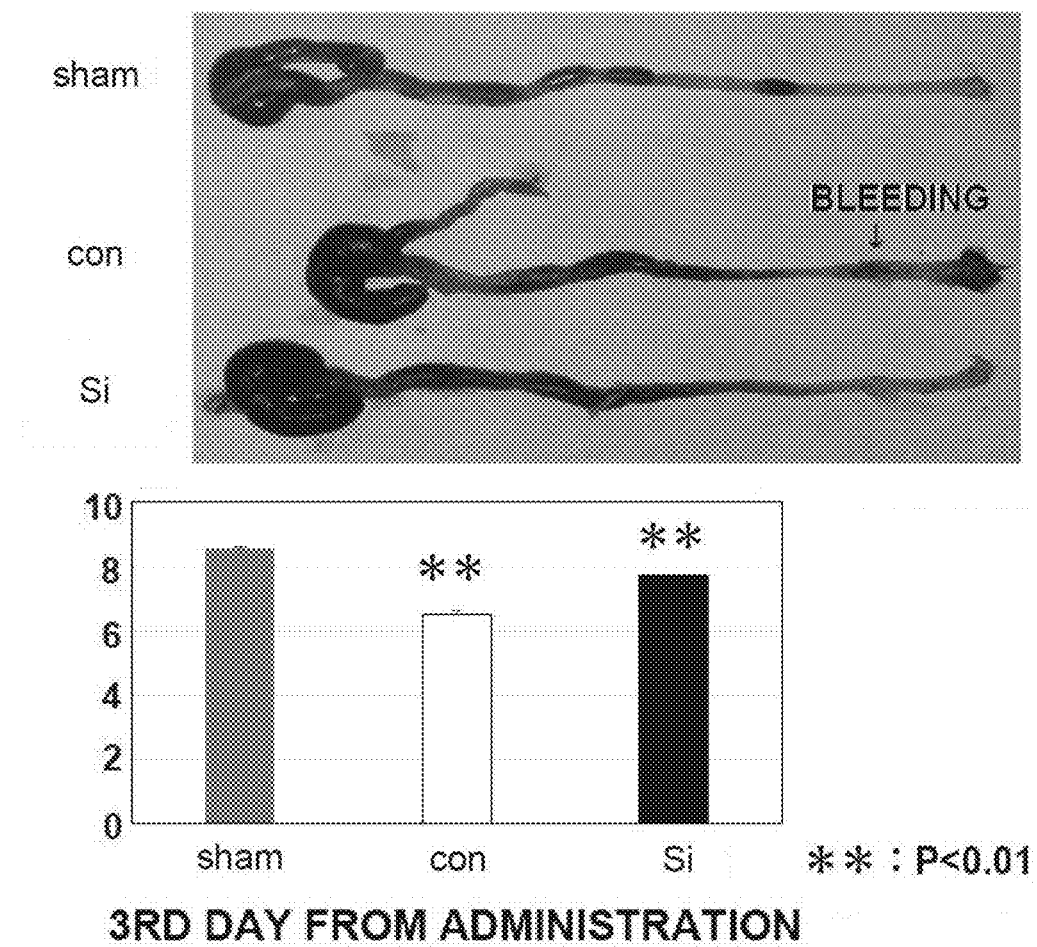
FIG. 8 includes photographs showing the states of large intestines after administration of the silicon small particles to a wild-type mouse (sham) and an inflammatory bowel disease model mouse and a graph showing the lengths (cm) of the large intestines, con represents a control group, and Si represents a silicon small particle administration group.

FIG. 8 shows a comparison of the lengths of the large intestines (lengths from colons to rectums) of the wild-type group, the control group on 3 d, and the silicon small particle administration group on 3 d. As compared to the wild-type group, it was shown that the large intestine was significantly shortened in each of the control group and the silicon administration group, and it was shown that the shortening of the large intestine was suppressed in the silicon administration group. In addition, in FIG. 8, a photograph of the intestine from cecum to anus excised from a mouse of each group is shown.

The above-mentioned biopsy material examination findings showed that the bleeding in the large intestine and shortening of its length due to inflammation were significantly suppressed by the silicon small particle administration.

C-5. Histopathological Analysis

Figure 9:
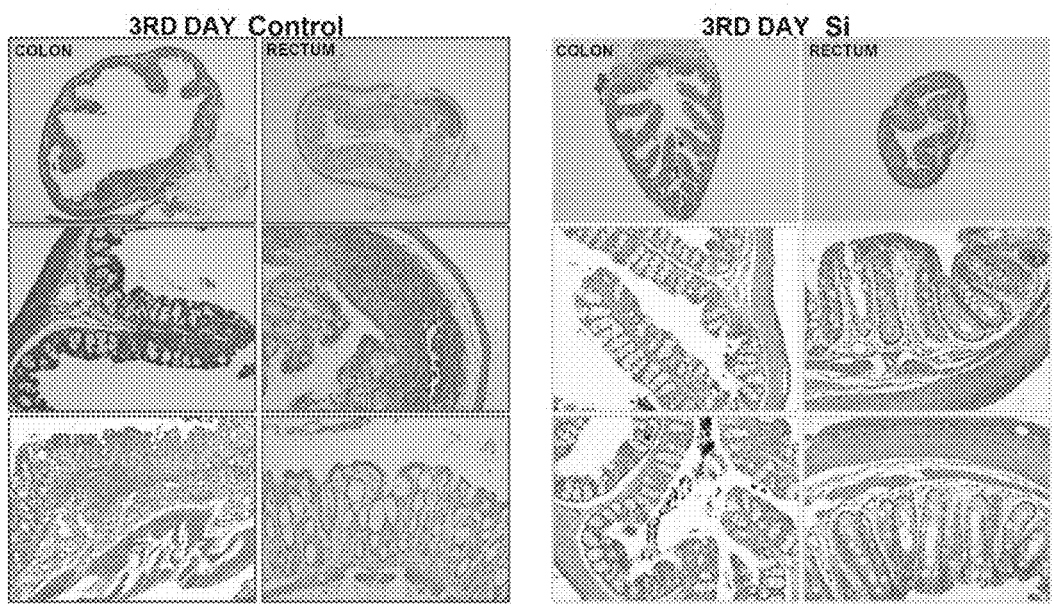
FIG. 9 shows histopathological images of colons and rectums on the 3rd day (3 d) from the initiation of dextran sulfate sodium (DSS) administration. Si represents a silicon small particle administration group.
Figure 10:
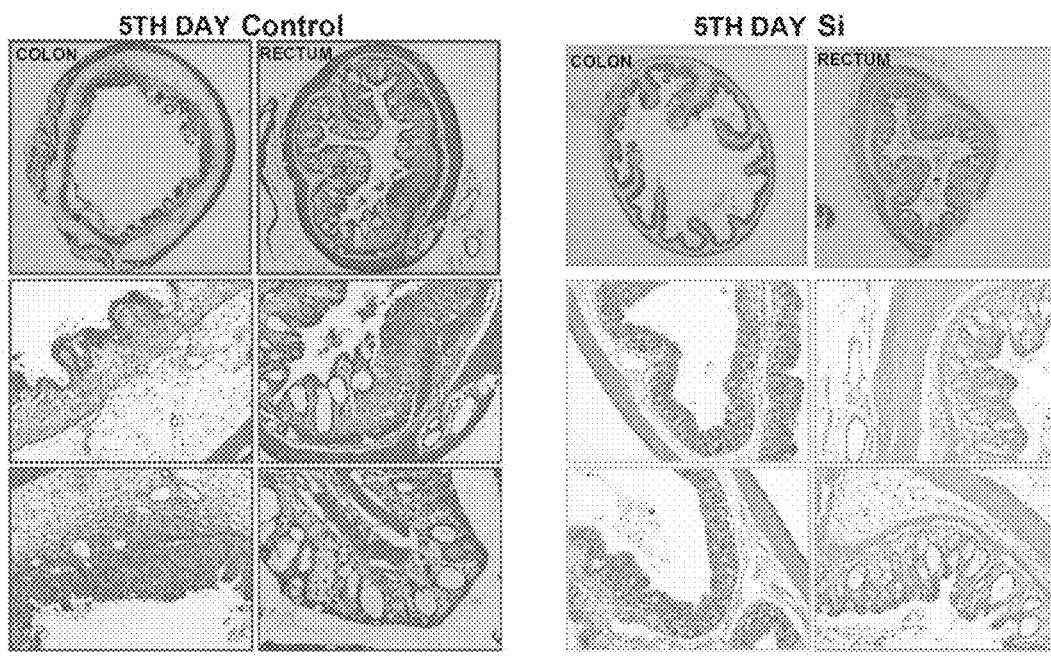
FIG. 10 shows histopathological images of colons and rectums on the 5th day (5 d) from the initiation of DSS administration. Si represents the silicon small particle administration group.
Figure 11:
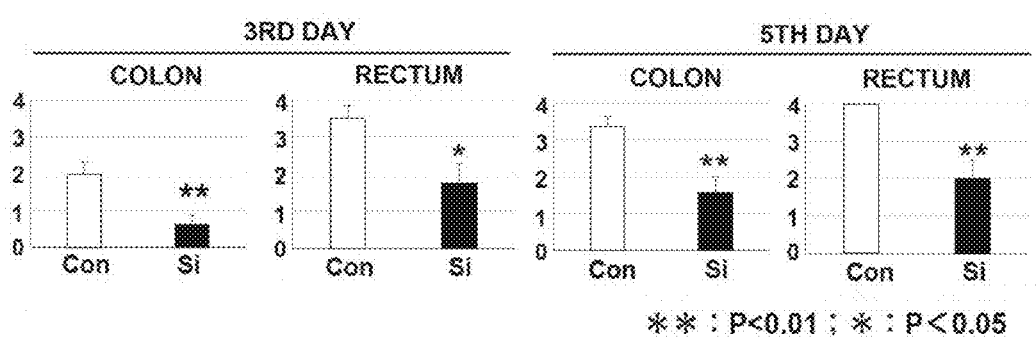
FIG. 11 shows the results of analysis of the degree of crypt collapse. Con represent s a control group, and Si represent s a silicon small particle administration group.

FIG. 9 to FIG. 11 show the results of the histopathological analysis. FIG. 9 shows the colons and the rectums on the 3rd day (3 d). FIG. 10 shows the colons and the rectums on the 5th day (5 d). FIG. 11 shows the results of analysis of the degree of crypt collapse. In the colons and the rectums, findings of colitis, such as the loss/disappearance of folds, vacuolation of a mucosal epithelial tissue, and the disappearance of the crypt were observed, but it was shown that those symptoms of colitis were alleviated by the silicon small particle administration. The degree of crypt collapse was suppressed to a half or less.

C-6. Suppression of Neuronal Activation Involved in Visceral Pain and Visceral Discomfort In order to analyze the activity of neurons involved in visceral pain and visceral discomfort, neuronal activation of each of the dorsal part of the medulla oblongata and the amygdala was evaluated using c-Fos expression as an indicator. On the 5th day (5 d) after the DSS administration, perfusion fixation was performed with 4% paraformaldehyde-containing 0.1 M phosphate buffer. Cryoprotection treatment was performed with 30% sucrose-containing 0.1 M phosphate buffer, followed by freezing in powdery dry ice.

A section having a thickness of 30 µm was prepared with a microtome (cryostat), and subjected to immunofluorescence staining by a free-floating method. Blocking treatment was performed with 0.01 M phosphate buffer containing 3% bovine serum albumin protein (BSA) and 0.3% Triton-X, and then an anti-c-Fos antibody (Rabbit polyclonal antibody) (Abcam) serving as a primary antibody was suspended at 1,000-fold dilution in the blocking solution. The sample was subjected to a reaction in the primary antibody reaction solution overnight. After washing with 0.01 M phosphate buffer, the sample was subjected to a reaction with an Alexa Fluor (trademark) 488-conjugated anti-rabbit IgG antibody (Thermo Fisher Scientific K.K.) serving as a secondary antibody, under a light-shielding condition for 1 hour, in a secondary antibody reaction solution obtained by diluting with 0.01 M phosphate buffer 500-fold. After washing with 0.01 M phosphate buffer, the sample was mounted and observed with a fluorescence microscope.

Figure 12:
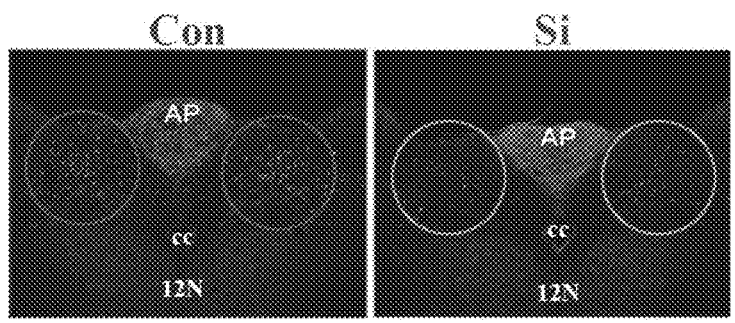
FIG. 12 shows immunofluorescence staining photographs of the dorsal part of the medulla oblongata, which is a vomiting center region. White signals indicate cells positive for c-Fos serving as a neuronal activity marker factor. Con represents the dorsal part of the medulla oblongata of a model mouse serving as a control, and Si represents the dorsal part of the medulla oblongata of a model mouse administered the silicon small particles. AP indicates the area postrema, cc indicates the central canal, and 12N indicates the hypoglossal nucleus. Circles indicate the locations of the vagal dorsal motor nucleus and the solitary nucleus, which respond to visceral discomfort and visceral pain. The photographs in the drawings are in grayscale, and hence green fluorescence signals are shown as white signals.

FIG. 12 shows immunofluorescence staining photographs of the dorsal part of the medulla oblongata. White signals indicate c-Fos-positive cells. In FIG. 12, Con represents the dorsal part of the medulla oblongata of the model mouse serving as a control, and Si represents the dorsal part of the medulla oblongata of the model mouse administered the silicon small particles. In the photographs, 12N indicates the hypoglossal nucleus, AP indicates the area postrema, and CC indicates the central canal. Circles indicate the locations of the vagal dorsal motor nucleus and the solitary nucleus, which respond to visceral discomfort and visceral pain. Many c-Fos-positive cells were observed in the mouse with the normal diet, whereas in the mouse with the silicon small particle-containing diet, fewer positive cells were observed, and hence the activities of the vagal dorsal motor nucleus and the solitary nucleus were significantly suppressed. Thus, the silicon small particles were shown to suppress visceral discomfort and visceral pain (abdominal pain). The drawings are in grayscale, and hence green fluorescence signals are shown as white signals.

Figure 13:
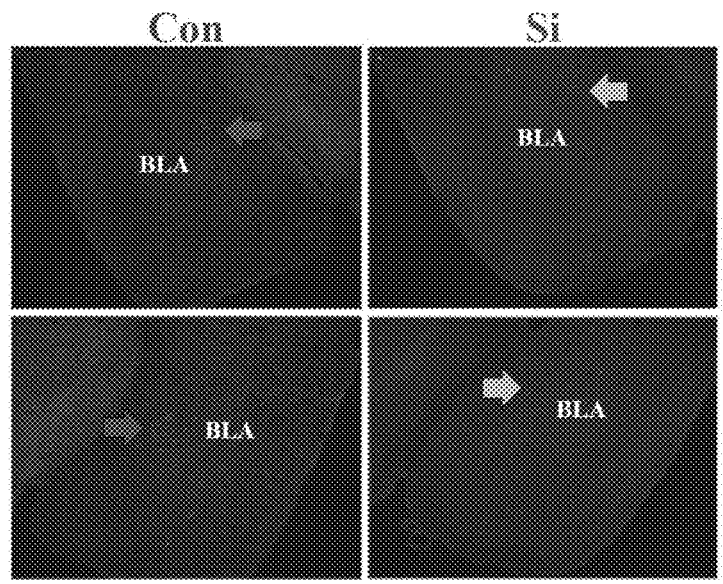
FIG. 13 shows immunofluorescence staining photographs of amygdala. White signals indicate cells positive for c-Fos serving as a neuronal activity marker factor. Con represents the amygdala of a model mouse serving as a control, and Si represents the amygdala of a model mouse administered the silicon small particles. In each pair of upper and lower photographs, the upper photograph and the lower photograph show the left amygdala and the right amygdala, respectively, of the same mouse. BLA indicates the basolateral amygdaloid nucleus. An arrow indicates the central amygdaloid nucleus, which responds to pain, such as visceral pain. The photographs in the drawings are in grayscale, and hence green fluorescence signals are shown as white signals.

FIG. 13 shows immunofluorescence staining photographs of amygdala. White signals indicate c-Fos-positive cells. In FIG. 13, Con represents the amygdala of a model mouse serving as a control, and Si represents the amygdala of a model mouse administered the silicon small particles. In each pair of upper and lower photographs, the upper photograph and the lower photograph show the left amygdala and the right amygdala, respectively, of the same mice. An arrow indicates the central amygdaloid nucleus, which responds to pain, such as visceral pain. In the mouse with the normal diet, c-Fos-positive cells were observed in the central amygdaloid nucleus, and the response of visceral pain was observed. Meanwhile, in the mouse administered the silicon small particle-containing diet, c-Fos-positive cells were not observed, and hence the activity of the central amygdaloid nucleus was suppressed. Thus, it was shown that visceral pain was suppressed by the silicon small particles. In the photographs, BLA indicates the location of the basolateral amygdaloid nucleus. The drawings are in grayscale, and hence green fluorescence signals are shown as white signals.

C-7. Comparison of Effects of Silicon Small Particles and Hydrogen Water

C57B16/J mice (male, 7-week-old, body weight: 24 g to 25 g) were obtained from Japan SLC. Evaluation was performed using a control group of 5 mice, a silicon small particle administration group of 5 mice, and a hydrogen water administration group of 5 mice. The silicon small particle administration group was given the silicon small particle-containing diet, and the hydrogen water administration group and the control group were given normal feed (normal diet) (manufactured by Oriental Yeast Co., Ltd., model number: AIN93M) (d0). Each group was allowed to drink water containing 5% dextran sulfate sodium (DSS) (MP Bio) ad libitum every day from the next day (d1) to prepare inflammatory bowel disease model mice.

Figure 14:
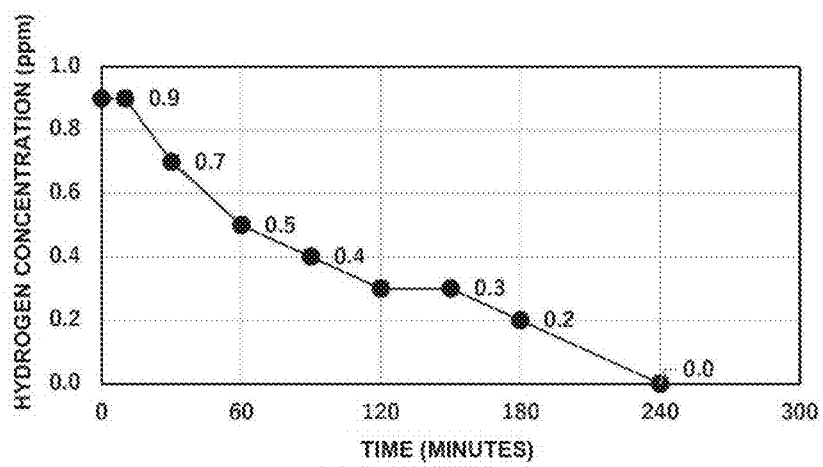
FIG. 14 is a graph showing the dissolved hydrogen concentration of hydrogen water prepared for comparison. The vertical axis represents the dissolved hydrogen concentration (ppm), and the horizontal axis represents time elapsed (minutes) after the purification of hydrogen water.

Hydrogen water was prepared using a high-concentration hydrogen water generator (Lourdes, Victory Japan Co., Ltd.). 1.7 L of tap water was put into the generator, and 30 minutes (0.8 ppm to 1.2 ppm hydrogen water preparation course) was selected. Immediately after the completion of its preparation, the hydrogen water was put into a glass bottle with a screw cap, and the bottle was covered with aluminum foil. The dissolved hydrogen concentration of the prepared hydrogen water was measured (dissolved hydrogen concentration determination reagent (MiZ Company Limited): methylene blue reagent). The result s are shown in FIG. 14. Hydrogen in the produced hydrogen water was slowly diffused, becoming undetectable in 6 hours. As rigorous measurement methods for dissolved hydrogen, there are known two kinds of methods specified by the Japan Analytical Instruments Manufacturers' Association, i.e., a gas chromatographic method and a diaphragm electrode method. The National Consumer Affairs Center of Japan has measured and reported the dissolved hydrogen concentrations of hydrogen water prepared with various hydrogen water generators through use of the two kinds of methods, i.e., the gas chromatographic method and the diaphragm elect rode method. In that report, the dissolved hydrogen concentration of hydrogen water prepared with the high-concentration hydrogen water generator used herein (Lourdes, Victory Japan Co., Ltd.) was from 1.0 ppm to 1.3 ppm. Nearly the same result as this measurement result was shown by a dissolved hydrogen concentration in a simplified measurement method with a methylene blue reagent, and hence, in this experiment, dissolved hydrogen concentration was measured using the methylene blue reagent.

In the hydrogen water administration group, the prepared hydrogen water was mixed with DSS (5%), and the mice were allowed to drink the water ad libitum every day. The hydrogen water was exchanged twice a day (about 9 a.m. and about 6 p.m.). For each exchange, hydrogen water was freshly prepared, and mixed with DSS (5%).

Figure 15:
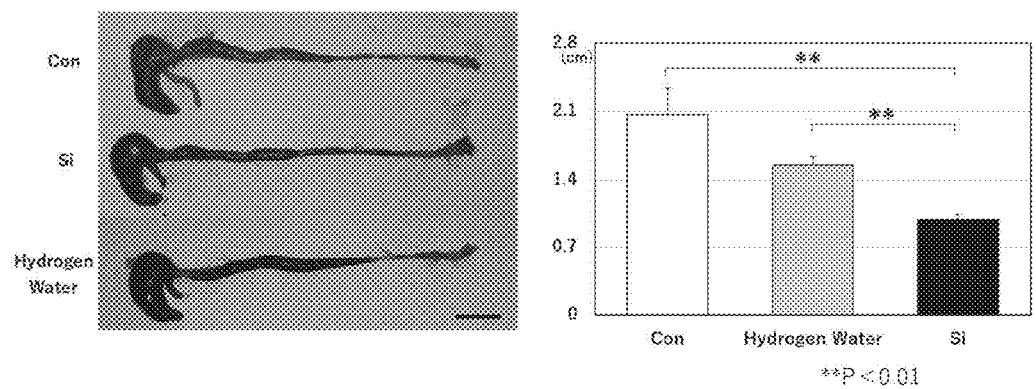
FIG. 15 includes pathological images showing the states of large intestines after administration of the silicon small particles or hydrogen water to inflammatory bowel disease model mice and a graph showing the degrees of shortening the large intestines. Con represents a control group, Si represents a silicon small particle administration group, and Hydrogen Water represents a hydrogen water administration group.

On the 3rd day (d3) after the DSS administration, mice of each administration group were subjected to biopsy material examination. The ileum was cut to excise the intestine from the cecum to the anus from each of the control group (Con: 5 mice), the silicon small particle administration group (Si: 5 mice), the hydrogen administration group (Hydrogen Water: 4 mice), and the wild-type group (WT: 4 mice), and the length of the large intestine (length from the colon to the rectum) was measured. The results are shown in Table 2. The mean of the differences between the mean of the lengths of the large intestines of the wild-type group and the lengths of the large intestines of the individuals of each group was adopted as the degree of shortening of the large intestine of each group, which is shown in FIG. 15.

TABLE 2

| Group name | Measured value of large intestine length (cm) | | | | |
|---|---|---|---|---|---|
| WT | 8.4 | 8.5 | 8.9 | 8.3 | |
| Con | 7.0 | 6.7 | 7.0 | 5.7 | 5.9 |
| Hydrogen Water | 6.9 | 6.9 | 7.1 | 7.0 | |
| Si | 7.2 | 7.7 | 7.6 | 7.6 | 7.6 |

Comparing the silicon small particles and the hydrogen water on the basis of the above-mentioned biopsy material examination findings, it was shown that the silicon small particle administration significantly suppressed the shortening of the length of the large intestine caused by inflammation as compared to the hydrogen water administration. C-8.

The above-mentioned results revealed that the silicon small particles in the present invention exhibited a high preventive effect and a high therapeutic effect on inflammatory bowel disease.

D. Pharmacological Test with Arthritis Model Mice

D-1. Preparation of Arthritis Model Mice

DBA/1 JJmsS1c mice (male, 7-week-old) were obtained from Japan SLC. As an antigen solution to be used for sensitization, 4 mg/ml of an emulsion was prepared by adding, to a 0.01 M acetate-phosphate buffer containing 8 mg/ml of bovine collagen type II, an equal amount of an adjuvant (4 mg/ml *Mycobacterium tuberculosis* H37Ra). Sensitization was performed by intradermally administering the above-mentioned sensitizing antigen solution to the base of a pinna (8-week-old: first sensitization) and the root of the tail (11-week-old: second sensitization) at 0.025 ml/sensitization/mouse (the total collagen amount per mouse was 0.2 mg). After 2 to 4 weeks from the day of the second sensitization, the mice exhibited inflammation in the knee joint.

D-2. Evaluation of Arthritis

The collagen arthritis model mice prepared as described above were continuously given normal diet (manufactured by Oriental Yeast Co., Ltd., model number: AIN93M) or the silicon small particle-containing diet from 1 week prior to the first sensitization to 8 weeks after the second sensitization. In the following test, 7 arthritis model mice were used in each of the normal diet group and the silicon small particle-containing diet group.

The degree of inflammation of each foot of each mouse was scored on the basis of the following arthritis development criteria and adopted as an arthritis index.

Figure 16:
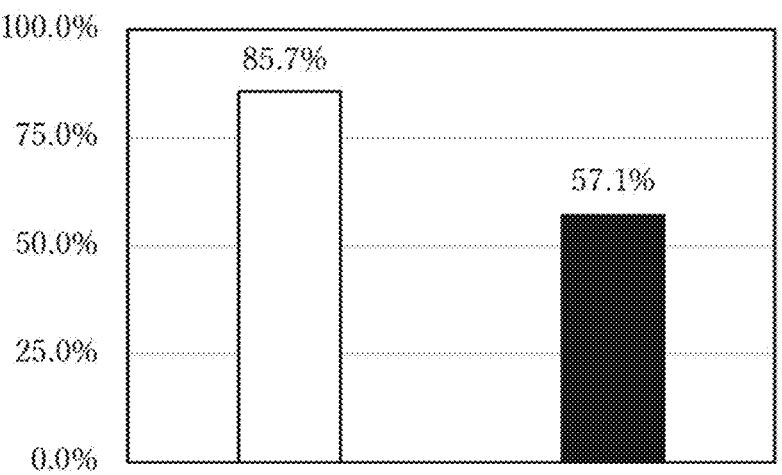
FIG. 16 is a graph showing the arthritis incidence of each of a normal diet group and a silicon small particle-containing diet group of arthritis model mice. The vertical axis represents the arthritis incidence. □: normal diet, ■: silicon small particle-containing diet

Arthritis Development Criteria:
 0: No change (normal)
 1: Swelling of toes
 2: Swelling of toes and sole, and dorsum
 3: Swelling of whole foot
 4: Severe swelling of foot When any one of the four limbs was evaluated as arthritis index 1, that individual was regarded as having developed arthritis. About 90% of the mice of the normal diet group developed arthritis, whereas about 50% of the mice of the silicon small particle-containing diet group developed arthritis, and hence the development of arthritis was significantly suppressed by the silicon small particles (FIG. 16).

Figure 17:
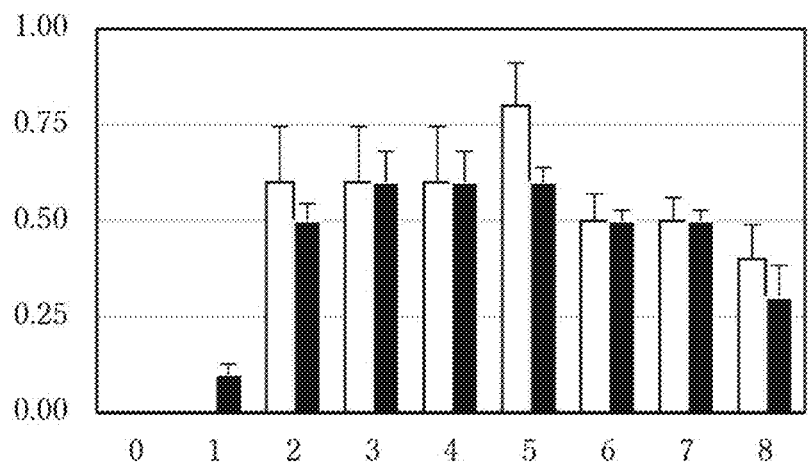
FIG. 17 is a graph showing the "arthritis index (mean for all four limbs)" of each of a normal diet group and a silicon small particle-containing diet group of arthritis model mice. The degree of inflammation of each limb was scored on the basis of arthritis development criteria (4-point scale score; 0: no change; 1: swelling of toes; 2: swelling of toes and sole, and dorsum; 3: swelling of whole foot; 4: severe swelling) and adopted as an arthritis index, and the mean of the arthritis indices of the respective limbs (four limbs) was adopted as the arthritis index (mean for all four limbs) of each individual. The mean of the arthritis indices (means for all four limbs) of the respective individuals in each group is shown in FIG. 17. The vertical axis indicates the arthritis index (mean for all four limbs), and the horizontal axis indicates time (weeks) from second sensitization. □: normal diet, ■: silicon small particle-containing diet
Figure 18:
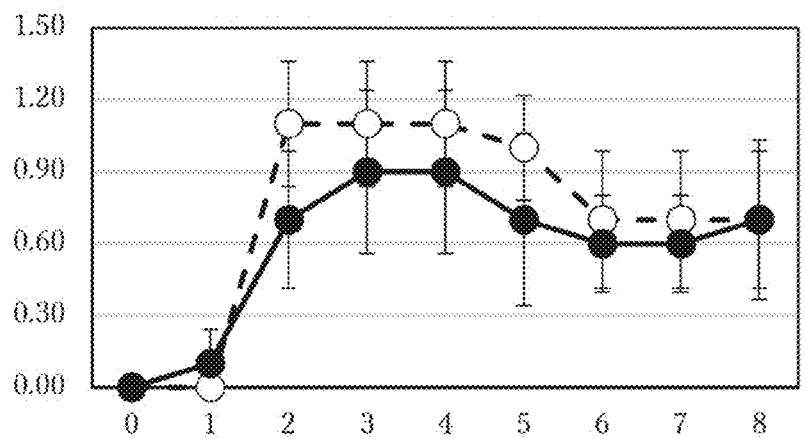
FIG. 18 is a graph showing the "arthritis index (maximally inflamed limb)" of a normal diet group and a silicon small particle-containing diet group of arthritis model mice. The degree of inflammation of a maximally inflamed limb was scored on the basis of arthritis development criteria (4-point scale score; 0: no change; 1: swelling of toes; 2: swelling of toes and sole, and dorsum; 3: swelling of whole foot; 4: severe swelling) and adopted as the arthritis index (maximally inflamed limb) of each individual. The mean of the arthritis indices (maximally inflamed limbs) of the respective individuals in each group is shown in FIG. 18. The vertical axis represents the arthritis index (maximally inflamed limb), and the horizontal axis represents time (weeks) from second sensitization. ○: normal diet, •: silicon small particle-containing diet FIG. 19 includes graphs showing the thicknesses of the pinnae of contact dermatitis model mice. 1ST DAY represents the measured values (mm) of the thicknesses of the pinnae before sensitization, 2ND DAY represents those 1 day after the day of the sensitization, and 3RD DAY represents those 2 days after the day of the sensitization. Si represents a silicon small particle administration group, and Con represents a control group.

The mean of the arthritis indices of the respective feet (four limbs) of each mouse was adopted as the arthritis index (mean for all four limbs) of each individual. The weekly mean of the arthritis indices (means for all four limbs) of the respective individuals in each group is shown in FIG. 17. In addition, the arthritis index of the maximally inflamed limb of each mouse was adopted as the arthritis index (maximally inflamed limb) of each individual. The weekly mean of the arthritis indices (maximally inflamed limbs) of the respective individuals in each group is shown in FIG. 18. In each of FIG. 17 and FIG. 18, the horizontal axis represents time (weeks) from the second sensitization. Inflammation was suppressed in the silicon small particle-containing diet group as compared to the normal diet group.

The above-mentioned results revealed that the silicon small particles in the present invention exhibited a high preventive effect and a high therapeutic effect on arthritis.

E. Pharmacological Test with Contact Dermatitis Model Mice

BALB/c mice (male, 7-week-old) were obtained from Japan SLC. A silicon small particle administration group (9 mice) was given the silicon small particle-containing diet, and a control group (9mice) was given normal feed (normal diet) (manufactured by Oriental Yeast Co., Ltd., model number: AIN93M). First sensitization was performed after 1 week from the initiation of the administration of each diet (Day 1), second sensitization was performed the next day (Day 2), and third sensitization was performed 5 days after that (Day 7). The first sensitization and the second sensitization were performed by directly applying a dinitrofluorobenzene (DNBF) solution (suspended with an equal amount of olive oil) to the precordial skin, and the third sensitization was performed by directly applying the solution to both the left and right pinnae. After the pinna sensitization, inflammation was developed in the pinnae, causing thickening of the pinnae.

Figure 19:
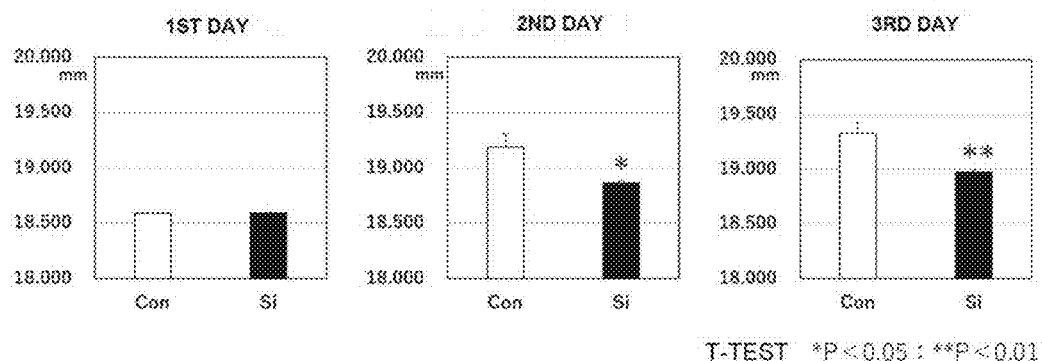
Figure 20:
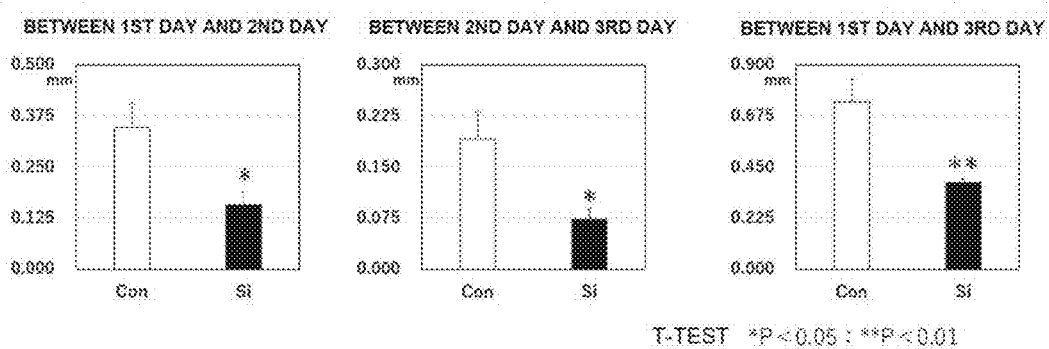
FIG. 20 includes graphs showing the degrees of thickening in contact dermatitis model mice (difference in pinna thickness between the 1st day and the 2nd day, difference in pinna thickness between the 2nd day and the 3rd day, and difference in pinna thickness between the 1st day and the 3rd day). Si represents a silicon small particle administration group, and Con represents a control group.

The thicknesses of the pinnae were measured every day for 3 days from the day of the third sensitization (Day 7) (Day 7 (1st day) to Day 9 (3rd day)). The thicknesses of the left and right pinnae were each measured 3 times with a micrometer (Digimatic Micrometer with Adjustable Measuring Force), and the mean thereof was adopted as the pinna thickness. The thicknesses of the pinnae on the 1st day to the 3rd day are shown in FIG. 19. As compared to the control group that had been given normal diet, the thickening of the pinnae was suppressed in the silicon small particle administration group. Differences between daily pinna thicknesses were adopted as the degrees of thickening. The difference in pinna thickness between the 1st day and the 2nd day, the difference in pinna thickness between the 2nd day and the 3rd day, and the difference in pinna thickness between the 1st day and the 3rd day are shown in FIG. 20. Also in terms of degree of thickening, it was shown that the thickening was suppressed in the silicon small particle administration group as compared to the control group.

The above-mentioned results revealed that the silicon small particles in the present invention exhibited a high preventive effect and a high therapeutic effect on the inflammation of contact dermatitis.

F. Pharmacological Test with Acute Hepatitis Model Mice

Figure 21:
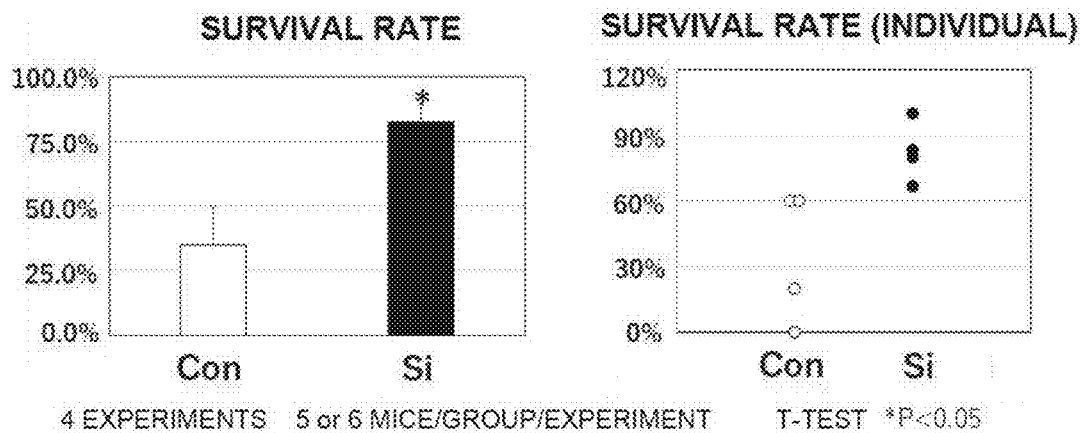
FIG. 21 includes graphs showing the survival rates of acute hepatitis model mice. Si represents a silicon small particle administration group, and Con represents a control group. The left graph compares the mean survival rates of the respective groups, and the right graph compares individual survival rates.

C57BL/6J mice (male, 7-week-old) were obtained from Japan SLC. A silicon small particle administration group was given the silicon small particle-containing diet, and a control group was given normal feed (normal diet) (manufactured by Oriental Yeast Co., Ltd., model number: AIN93M). After 1 week from the initiation of the administration of each diet, carbon tetrachloride was administered to prepare an acute hepatitis model. Carbon tetrachloride was suspended with an equal amount of olive oil, and intraperitoneally administered to the mice at a concentration of 2 µL of carbon tetrachloride/1 g of mouse body weight. The day after the administration, the survival rate of the mice was determined and evaluated. The study was performed by performing the experiment 4 times and using 5 or 6 mice per group per experiment. The result was that the silicon small particle administration group had a significantly higher survival rate (about 80%) as compared to the mice of the control group (35%) (FIG. 21).

The above-mentioned results revealed that the silicon small particles in the present invention exhibited a high preventive effect and a high therapeutic effect on acute hepatitis.

G. Pharmacological Test with Anticancer Agent-Dosed Model Mice

C57BL/6J mice (male, 7-week-old) were obtained from Japan SLC. Cisplatin serving as an anticancer agent was suspended in saline, and intraperitoneally administered at 300 µl (0.9 mg) to mice to prepare anticancer agent-dosed model mice (exhibiting nausea/vomiting symptoms). A control group of the model mice had been given normal diet (manufactured by Oriental Yeast Co., Ltd., model number: AIN93M) from 7 days prior to the cisplatin administration (N=8). A silicon small particle administration group of the model mice had been given the silicon small particle-containing diet from 7 days prior to the cisplatin administration (N=8).

Figure 22A:
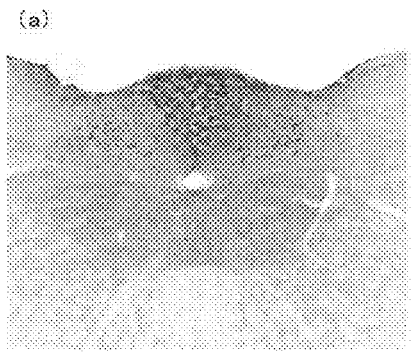
FIG. 22(a) shows an anticancer agent-dosed model mouse that has been given normal diet.
Figure 22B:
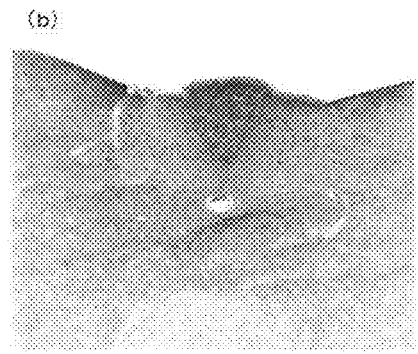
FIG. 22(b) shows an anticancer agent-dosed model mouse that has been given silicon small particle-containing diet.

Neuronal activation of the vomiting center in the dorsal part of the medulla oblongata was evaluated as described below using c-Fos expression as an indicator. The next day (16 hours or more) after the cisplatin administration, the model mice were subjected to perfusion fixation with a 4% paraformaldehyde fixative to prepare frozen specimens. Frozen sections each having a thickness of 30 µm were prepared, and c-Fos-positive cells (active neurons) in the brain tissue were identified by an immunofluorescence staining method using an anti-c-Fos antibody (1,000-fold diluted: Abcam). FIG. 22 show immunofluorescence staining results of the dorsal part of the medulla oblongata. Red fluorescence signals indicate c-Fos-positive cells. In a mouse with the normal diet (FIG. 22(*a*)), many c-Fos-positive cells were observed, and as a result of the influence of cisplatin, activation of the vomiting center in the dorsal part of the medulla oblongata was observed. Meanwhile, in a mouse with the silicon small particle-containing diet (FIG. 22(*b*)), fewer positive cells were observed, and hence the activity of the vomiting center was significantly suppressed.

Figure 23A:
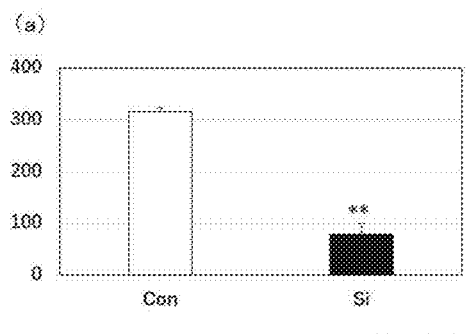
FIG. 23 are graphs showing the results of measurement of the numbers of positive cells in the c-Fos immunostaining result photographs of the vomiting center in the dorsal part of the medulla oblongata of anticancer agent-dosed model mice. The vertical axis represents the number of c-Fos-positive cells.
Figure 23B:
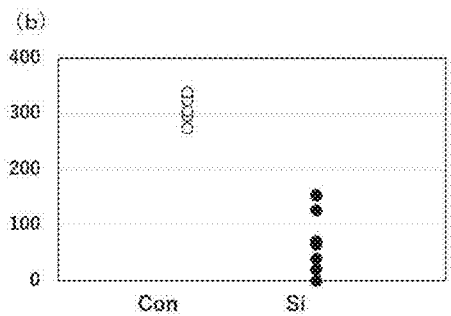

In the c-Fos immunostaining result photographs, the numbers of c-Fos-positive cells were measured. The numbers of positive cells in three sections were measured for each individual, and the mean thereof was adopted as the number of positive cells of that individual. The mean of eight individual mice was adopted as the number of positive cells of their group. The results are shown in FIG. 23. The activation of the vomiting center was greatly suppressed by the silicon small particles.

The above-mentioned results revealed that the silicon small particles in the present invention exhibited a high preventive effect and a high therapeutic effect on nausea or vomiting, a side effect of an anticancer agent.

H. Pharmacological Tests with Depression Model Mice

ICR mice (male, 7-week-old, body weight: 30 g to 35 g) were obtained from Japan SLC (Day 1). A silicon small particle administration group was given the silicon small particle-containing diet for 7 days (Day 1 to Day 7), and a control group was given normal diet (manufactured by Oriental Yeast Co., Ltd., model number: AIN93M) (Day 1 to Day 7). On the 6th day (Day 6), 1 mg/kg of lipopolysaccharide (LPS) was intraperitoneally administered to prepare a depression model. A control (normal group) was intraperitoneally administered saline (Sal).

After 24 hours from the LPS or saline administration, behavioral tests (tail suspension test, forced swimming test, and spontaneous motor activity measurement) were performed (Day 7). The tail suspension test and the forced swimming test are depression-related behavioral tests. In each of the tests, 8 mice per group were used.

H-1 Depression-Related Behavioral Tests

H-1-1 Tail Suspension Test

Figure 24:
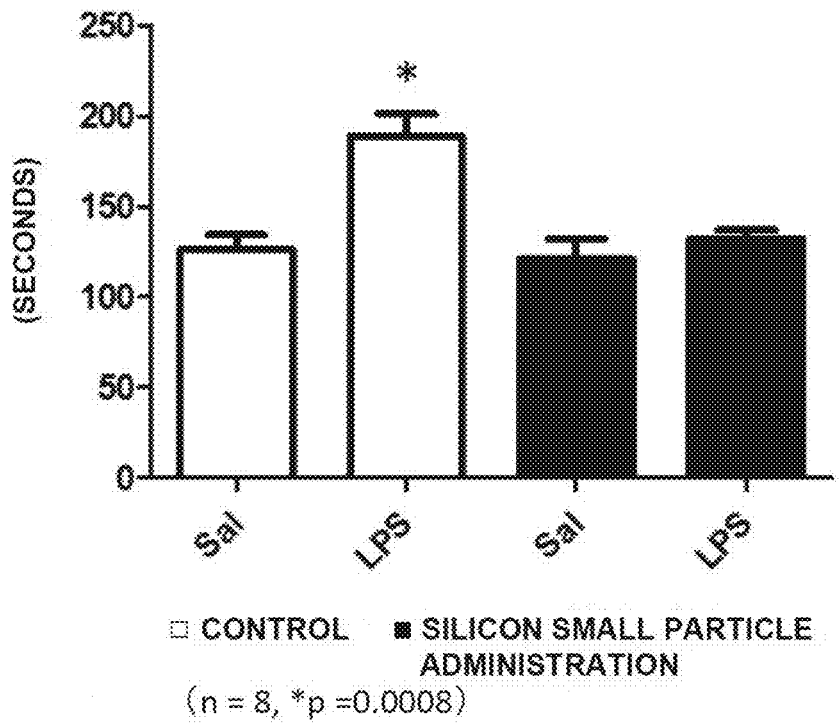
FIG. 24 is a graph showing the immobility times (seconds) of depression model mice (LPS) and normal mice (Sal) in a tail suspension test. Symbol "■" represents a silicon small particle administration group, and Symbol "□" represents a control group.

A mouse was suspended upside down from the tail for 6 minutes, and a period of time for which the mouse was in an immobile state was measured. The results are shown in FIG. 24. A suspended mouse wriggles in an attempt to escape. A longer immobility time indicates an increase in depressive behavior, and a shorter immobility time indicates a reduction in depressive behavior.

H-1-2 Forced Swimming Test

Figure 25:
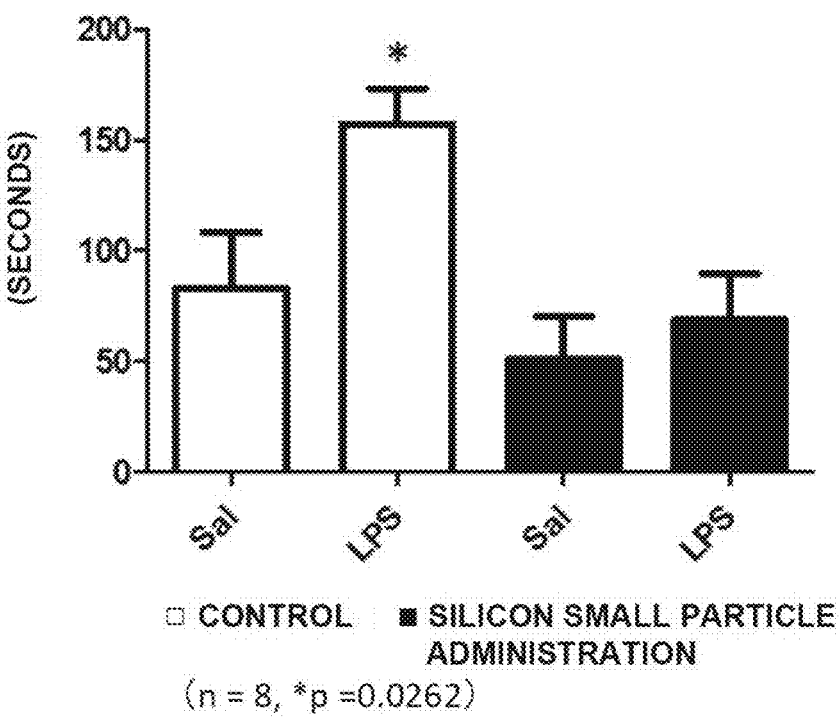
FIG. 25 is a graph showing the immobility times (seconds) of the depression model mice (LPS) and the normal mice (Sal) in a forced swimming test. Symbol "■" represents a silicon small particle administration group, and Symbol "□" represents a control group.

A mouse was placed in a cylindrical container loaded with water for 4 minutes, and a period of time in which the mouse was in an immobile state was measured. The result s are shown in FIG. 25. The forced swimming test is a test which makes use of the fact that a mouse forced to swim in an inescapable environment stops swimming. A longer immobility time indicates an increase in depressive behavior, and a shorter immobility time indicates a reduction in depressive behavior.

H-1-3 Results

As shown in FIG. 24 and FIG. 25, among the depression model mice (LPS), the control group (□) showed a depressive state, but the depressive state was suppressed in the silicon small particle administration group (■). In addition, even when the normal group (Sal) was given the silicon small particle-containing diet, no change occurred in depression-related behavior. The results show that hydrogen generated by the silicon small particles suppresses a depressive state, but does not act on a normal state. This conceivably results from the hydrogen acting on an upstream part of the onset route of depression (near the cause of the onset). It is conceived that the preventive or therapeutic agent of the present invention is a pharmaceutical agent that removes the cause of the onset of depression or a depressive state, and that is safe with less side effects.

H-2 Spontaneous Motor Activity Measurement

Figure 26:
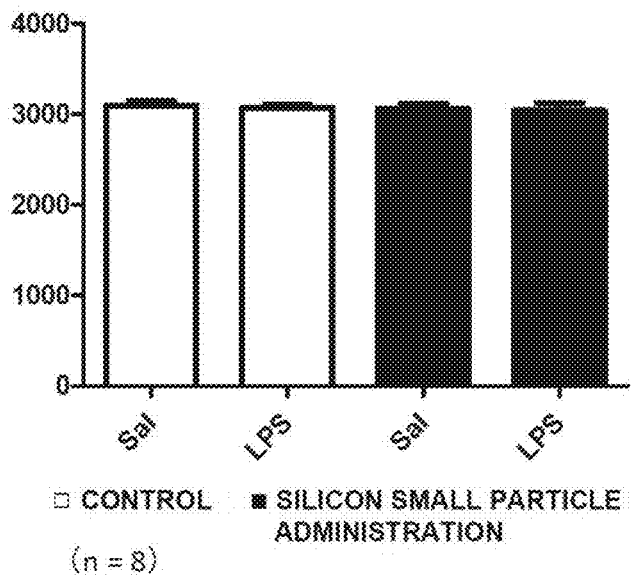
FIG. 26 is a graph showing the spontaneous motor activity of the depression model mice (LPS) and the normal mice (Sal). Symbol "■" represents a silicon small particle administration group, and Symbol "□" represents a control group. It is shown that the depression model mice (LPS) and the normal mice (Sal) subjected to the tail suspension test and the forced swimming test have no difference in spontaneous motor activity irrespective of whether the silicon small particles were administered.

Around the same time that the depression-related behavioral tests were performed, spontaneous motor activity was measured for 10 minutes using a Supermex (manufactured by Muromachi Kikai Co., Ltd.) apparatus. FIG. 26 shows the results. No difference was found in spontaneous motor activity between the groups. Thus, it was recognized that the depression model mice (LPS) and the normal mice (Sal) subjected to the tail suspension test and the forced swimming test had no difference in spontaneous motor activity. In addition, it was also recognized that the silicon small particle administration did not influence spontaneous motor activity.

The above-mentioned results revealed that the silicon small particles in the present invention exhibited a high preventive effect and a high therapeutic effect on depression or a depressive state.

I. Pharmacological Tests with Parkinson's Disease Model Mice

I-1 Preparation of Parkinson's Disease Model Mice

C57Bl6/J mice (male, 9- to 10-week-old, body weight: 26 g to 30 g) were obtained from Japan SLC, and were reared for 1 week by giving normal diet (manufactured by Oriental Yeast Co., Ltd., model number: AIN93M).

Figure 27:
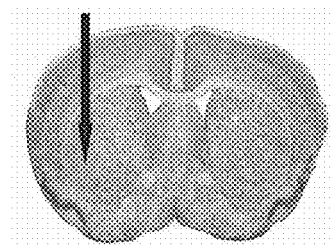
FIG. 27 is an image of a coronal section of the forebrain, including the striatum, of a mouse, showing a site where 6-hydroxydopamine hydrochloride (6-OHDA) is injected to prepare a Parkinson's disease model mouse.

A neurotoxin 6-hydroxydopamine hydrochloride (Sigma-Aldrich) (hereinafter 6-OHDA) was suspended in saline (Otsuka Pharmaceutical Co., Ltd.) containing 0.2% L (+)-ascorbic acid (FUJIFILM Wako Pure Chemical Corporation) to give a 0.2% 6-OHDA suspension. The head of a mouse under anesthesia was fixed with Just for Mouse Stereotaxic Instrument (Muromachi Kikai Co., Ltd.), and 3 μl of the 6-OHDA suspension (6 μg of 6-OHDA) was injected into the left striatum (substantia nigra-striatum pathway: part indicated by the arrow in FIG. 27) with a microsyringe (manufactured by Hamilton) to injure dopamine-producing cells in the substantia nigra, to prepare a hemi-Parkinson's disease model (Mandel R J, Randall P K. Brain Res Bull. 1990 February; 24 (2): 175-80).

After the surgery described above, hemi-Parkinson's disease model mice were divided into two groups, i.e., a silicon small particle-containing diet group (6-OHDA+Si) and a normal diet group (6-OHDA). In addition, normal mice that had not been subjected to the surgery were divided into two groups, i.e., a silicon small particle-containing diet group (Control+Si) and a normal diet group (Control). In the following tests, there were used 7 mice in the silicon small particle-containing diet group of Parkinson's disease model mice (6-OHDA+Si), 8 mice in the normal diet group of Parkinson's disease model mice (6-OHDA), 6 mice in the silicon small particle-containing diet group of normal mice (Control+Si), and 6 mice in the normal diet group of normal mice (Control).

The degree of loss of substantia nigra dopamine-producing cells was analyzed by an apomorphine-induced rotation test and an immunofluorescence staining method using an antibody against a dopamine-synthesizing enzyme (tyrosine hydroxylase) serving as a dopamine-producing cell marker.

I-2 Apomorphine (Dopamine Receptor D1/D2 Agonist)-Induced Rotation Test

Figure 28:
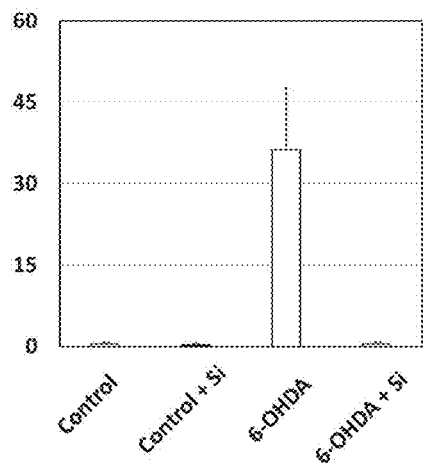
FIG. 28 is a graph showing the results of an apomorphine-induced rotation test of Parkinson's disease model mice and normal mice. The vertical axis represents the number of rotations. Control represents a normal diet group of normal mice, Control+Si represents a silicon small particle-containing diet group of normal mice, 6-OHDA represents a normal diet group of Parkinson's disease model mice, and 6-OHDA+Si represents a silicon small particle-containing diet group of Parkinson's disease model mice.

At 5 weeks from the surgery, the mice of each group were intraperitoneally injected with 1 mg/kg of apomorphine (SIGMA) diluted with saline. Measurement was started at 5 minutes after the administration, and the total number of rotations in 10 minutes was measured. The results are shown in FIG. 28. When substantia nigra dopamine-producing cells are lost owing to 6-OHDA injection, dopamine in the striatum is depleted, and neurons having dopamine receptors in the striatum cause denervation hypersensitivity. After the apomorphine administration, denervation hypersensitivity results in excitation of the neurons having dopamine receptors in the striatum on the injection side, resulting in a turn in the direction of the side opposite to the injection side (hereinafter healthy side) (Costall B, Kelly M E, Naylor R J. Neuropharmacology. 1983 March; 22(3): 295-302). The mice of the normal diet group (6-OHDA) of Parkinson's disease model mice made a turn owing to the loss of substantia nigra dopamine-producing cells, but the mice of the silicon small particle-containing diet group (6-OHDA+Si) did not make a turn. The results revealed that the loss of substantia nigra dopamine cells was significantly suppressed by the silicon small particles.

I-3 Histological Analysis

At 5 weeks after the surgery, the mice were subjected to perfusion fixation with a 4% paraformaldehyde fixative. After that, excised brains were frozen to prepare frozen sections each having a thickness of 40 μm. At the time of the preparation of the sections, the site of 6-OHDA injection (left striatum) was recognized by macroscopic observation. The state of dopamine-producing neurons in the substantia nigra was analyzed by an immunofluorescence staining method using an antibody against tyrosine hydroxylase (dopamine-producing cell marker). The degrees of degenerative loss of cell bodies and dendrites of dopamine-producing neurons in the substantia nigra and axons of dopamine-producing cells in the striatum were observed.

Figure 29:
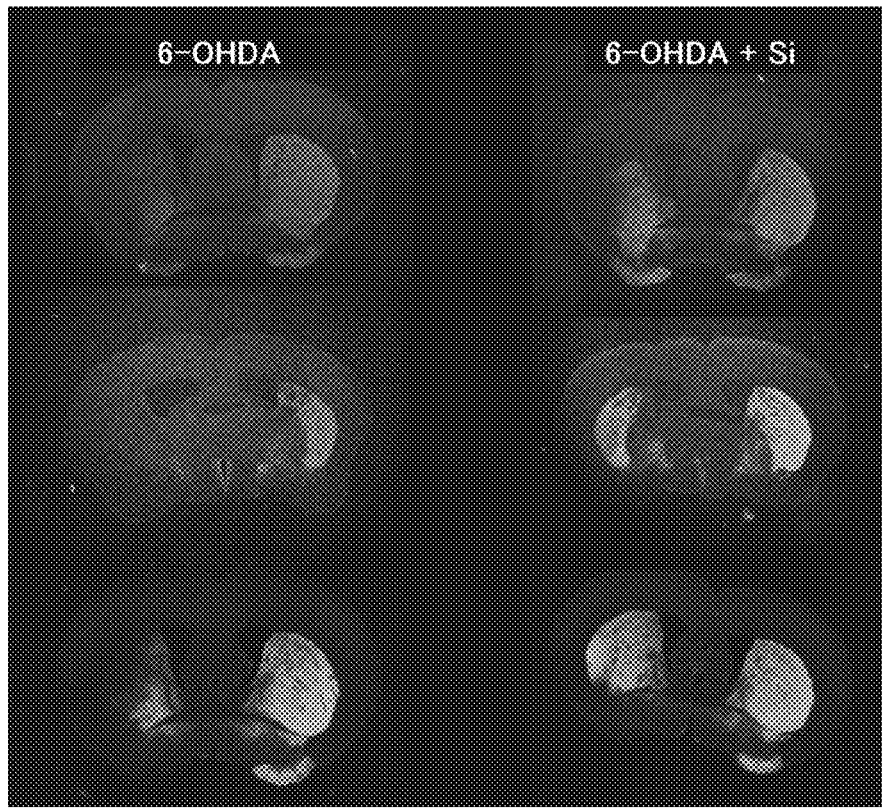
FIG. 29 includes immunohistochemical staining images of coronal slices of the forebrains of Parkinson's disease model mice, in which a dopamine-synthesizing enzyme (tyrosine hydroxylase) is stained. The stained enzyme presents at the axon terminal of dopamine-producing cells in the substantia nigra in the midbrain projecting into the striatum. 6-OHDA represents Parkinson's disease model mice with normal diet, and 6-OHDA+Si represents Parkinson's disease model mice with silicon small particle-containing diet. Each image is an image of a different individual.

FIG. 29 shows the results of immunostaining of the dopamine-synthesizing enzyme (tyrosine hydroxylase) in the striatum. After the injection of 6-OHDA, in the normal diet group (6-OHDA), the fluorescence on the injection side was decreased as compared to the healthy side, and thus it was recognized that axons of dopamine-producing cells were lost. Meanwhile, in the silicon-containing diet group (6-OHDA+Si), the decrease in fluorescence on the injection side as compared to the healthy side was suppressed, and hence the loss of axons of dopamine-producing cells was suppressed.

Figure 30:
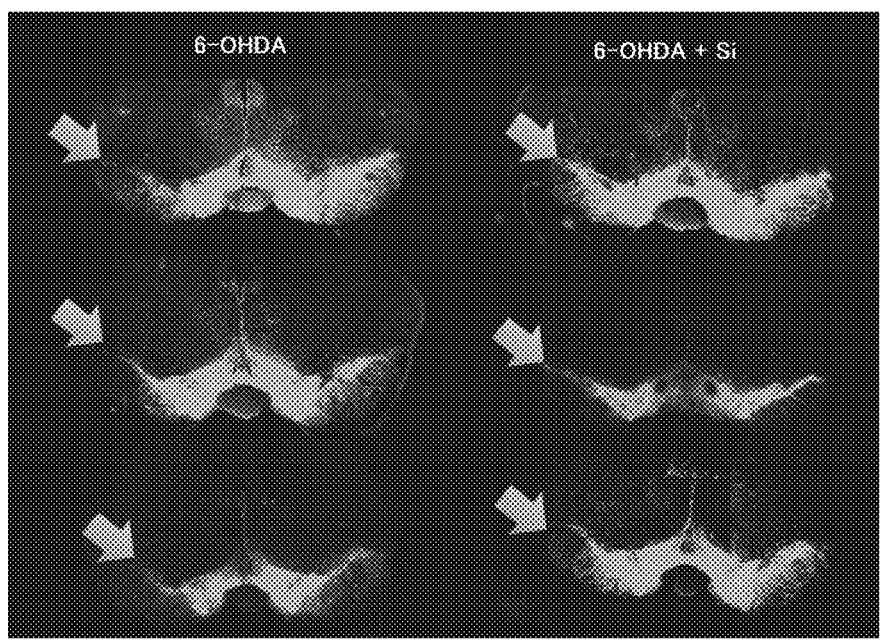
FIG. 30 includes immunohistochemical staining images of coronal slices of the midbrains of Parkinson's disease model mice, in which the dopamine-synthesizing enzyme (tyrosine hydroxylase) present in cell bodies of dopamine-producing cells present in the substantia nigra is stained. 6-OHDA represents Parkinson's disease model mice with normal diet, and 6-OHDA+Si represents Parkinson's disease model mice with silicon small particle-containing diet. Each image is an image of a different individual. Arrows indicate dopaminergic neurons lost by 6-OHDA administration.

FIG. 30 shows the results of immunostaining of the dopamine-synthesizing enzyme (tyrosine hydroxylase) in the substantia nigra. After the injection of 6-OHDA, in the normal diet group (6-OHDA), the fluorescence on the injection side (indicated by an arrow) was decreased as compared to the healthy side, and thus it was recognized that dopamine-producing cells were lost. Meanwhile, in the silicon-containing diet group (6-OHDA+Si), the decrease in fluorescence on the injection side (indicated by an arrow) as compared to the healthy side was suppressed, and hence the loss of dopamine-producing cells was suppressed.

I-4 Rotarod Test

Figure 31:
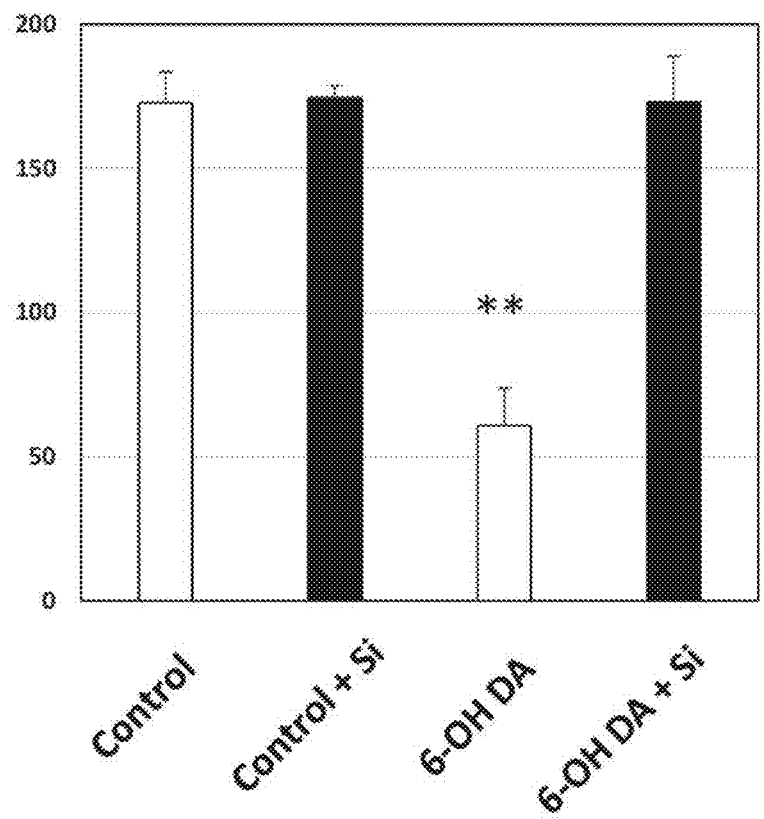
FIG. 31 is a graph showing the rotarod staying times of Parkinson's disease model mice and normal mice. The vertical axis represents staying time (seconds). Control represents a normal diet group of normal mice, Control+Si represents a silicon small particle-containing diet group of normal mice, 6-OHDA represents a normal diet group of Parkinson's disease model mice, and 6-OHDA+Si represents a silicon small particle-containing diet group of the Parkinson's disease mouse model.

A rotarod test is a test for evaluating motor coordination by placing a mouse on a slowly rotating rod and observing how much time the mouse can stay on the rod, which is gradually accelerated. At 4 weeks from the surgery, the motor coordination of each group was measured through accelerated rotation with a rotarod for mice, MK-610A MODE C manufactured by Muromachi Kikai Co., Ltd. As shown in FIG. 31, the motor coordination is clearly lowered in the normal diet group of Parkinson's disease model mice (6-OHDA), whereas the motor coordination of the silicon small particle-containing diet group of Parkinson's disease model mice (6-OHDA+Si) was comparable to those of the normal mouse groups (Control+Si and Control). In the Parkinson's disease model mice, the lowering of the motor coordination was significantly suppressed by the silicon small particles.

I-5 Spontaneous Motor Activity Measurement and Open Field Test

At 4 weeks after the surgery, spontaneous motor activity measurement and an open field test were performed. Spontaneous motor activity was measured for 10 minutes using Supermex (manufactured by Muromachi Kikai Co., Ltd.). In the open field test, spontaneous activity parameters under a novel environment (travel distance, moving speed, and active time/inactive time) were measured for 10 minutes using a square open field for mice manufactured by Muromachi Kikai Co., Ltd. (500 mm×500 mm×400 mm). FIG. 32 show the results. The graph of FIG. 32(a) shows the spontaneous motor activity, the graph of FIG. 32(b) shows the travel distance in the open field test, the graph of FIG. 32(c) shows the moving speed in the open field test, and the graph of FIG. 32(d) shows the active time/inactive time in the open field test (for each group, the active time and the inactive time are shown on the left and on the right, respectively). Among the groups, no differences were found in spontaneous motor activity and spontaneous activity parameters under a novel environment. Thus, it was recognized that there were no differences in spontaneous motor activity and spontaneous activity parameters under a novel environment among the mice of each group subjected to the apomorphine-induced rotation test and the rotarod test.

The above-mentioned results revealed that the silicon small particles in the present invention exhibited a high preventive effect and a high therapeutic effect on Parkinson's disease.

J. Pharmacological Test with Autism Spectrum Disorder Model Mice

I-1 Preparation of Autism Spectrum Disorder Model Mice

Mice on the 7th day of pregnancy (C57BL/6 JJmsSlc) were obtained from Japan SLC, Inc. On the 12th day of pregnancy, double-stranded RNA poly(I:C) or saline was intraperitoneally administered. The intraperitoneal administration of poly(I:C) was performed by the following method: a poly(I:C) (manufactured by Sigma-Aldrich) was dissolved with saline, then 20 mg/kg of poly(I:C) was intraperitoneally administered (Chow K H, et al., J Vis Exp. 2016 Mar. 25; (109):e53643. doi: 10.3791/53643) using a syringe for insulin (Myjector). The mice were allowed to give birth naturally. Offsprings showing autism spectrum disorder-like behaviors were utilized as an autism spectrum disorder model mice.

J-2 Behavioral Analysis

From the 8th day of pregnancy until offspring mice became 7 days old after birth, the mother mice were given normal diet (manufactured by Oriental Yeast Co., Ltd., model number: AIN93M) or the silicon small particle-containing diet. Behavioral analysis was performed by the measurement of ultrasonic vocal communication between mother and offsprings. One 7-day-old neonatal mouse was removed from a cage in which the mouse had been with its mother and breast-fed, and was placed in a 500 ml beaker, which was placed in a soundproof box. Ultrasonic calls emitted by the neonatal mouse were collected from above through a microphone and were analyzed (UltraSoundGate 116H (manufactured by AviSoft Bioacoustics)). A measurement time was 3 minutes, and the number of calls during the 3 minutes was recorded. After the measurement, the neonatal mouse was immediately returned to the cage in which its mother was present. The numbers of mice used in the test are as follows.

Figure 33:
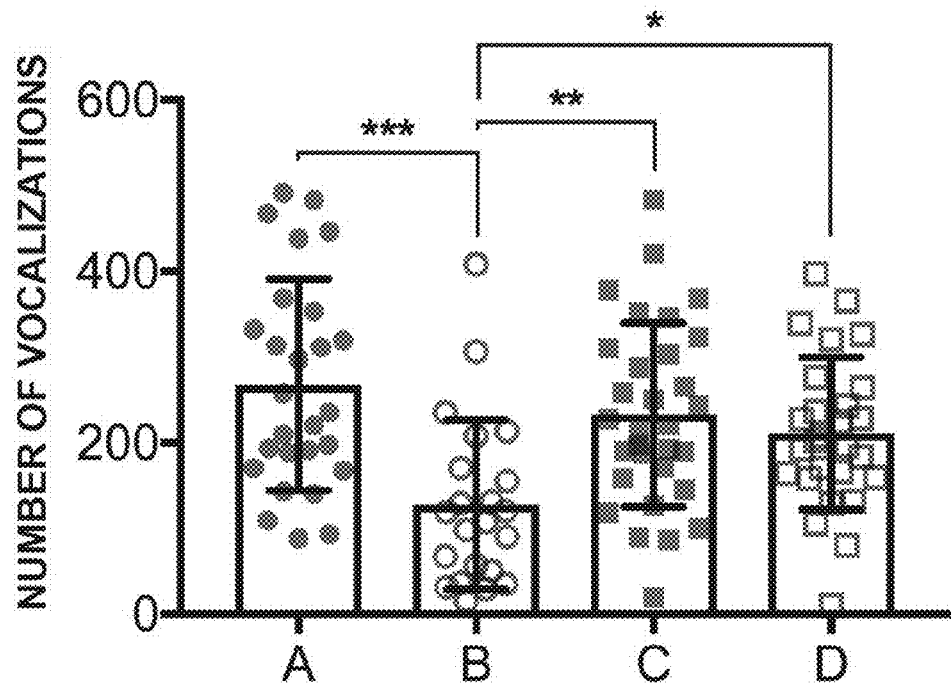
FIG. 33 is a graph showing the results of an ultrasonic vocal communication test between mother and offspring mice. The vertical axis represents the total number of calls in offspring mouse for its mother. A (•): control group fed with normal diet, B (○): poly(I:C) administrated group fed with normal diet, C (■): control group fed with silicon small particle-containing diet, D (□): poly(I:C) administrated group fed with silicon small particle-containing diet. *$p<0.001$, $p<0.01$, *$p<0.05$, one-way ANOVA.

Normal diet+control group: 27 mice
Normal diet+poly(I:C) administrated group: 22 mice
Silicon small particle-containing diet+control group: 31 mice
Silicon small particle-containing diet+poly(I:C) administrated group: 27 mice The results of the measurement of ultrasonic vocal communication between mother and offsprings are shown in FIG. 33. In FIG. 33, the vertical axis represents the number of vocalizations emitted by the off spring mice for the mother. Compared to the control with the normal diet (A), the number of vocalizations was significantly reduced in the poly(I:C) administrated group with the normal diet (B). In contrast, the number of vocalizations was significantly rescued in the poly(I:C) administrated group with the silicon small particle-containing diet (D). The results revealed that social communication was rescued by the administration of the silicon small particle-containing diet, proving the efficacy of the silicon small particle-containing diet against the onset and symptoms of an autism spectrum disorder.

The above-mentioned results demonstrated that the silicon small particles in the present invention exhibited a high preventive effect and a high therapeutic effect on an autism spectrum disorder.

K. Pharmacological Tests with Memory Impairment Model Mice

C57BL/6J mice (male, 7-week-old) were obtained from Japan SLC (Day 1). A silicon small particle administration group was given the silicon small particle-containing diet for 7 days (Day 1 to Day 7), and a normal diet group was given normal diet (manufactured by Oriental Yeast Co., Ltd., model number: AIN93M) (Day 1 to Day 7).

On the 6th day (Day 6), conditioning involving electric shocks was performed, and immediately after that, 1 mg/kg of lipopolysaccharide (LPS) was intraperitoneally administered to prepare a memory impairment model. A control (normal group) was intraperitoneally administered saline (Sal).

Figure 34:
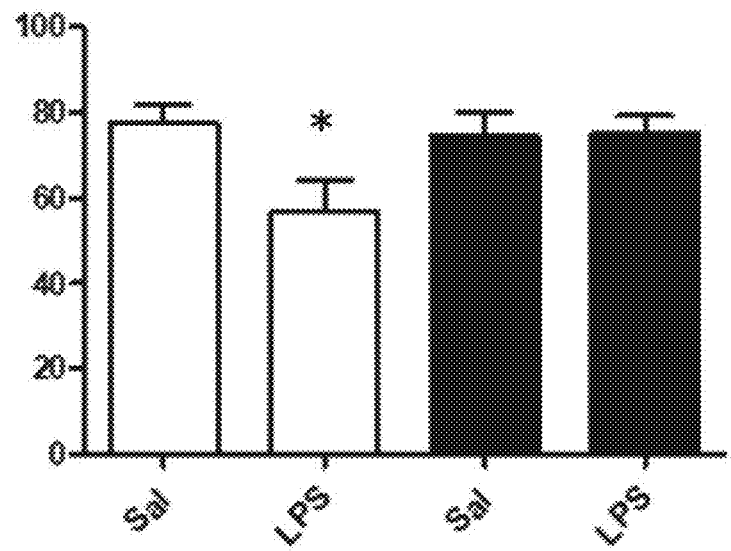
FIG. 34 is a graph showing freezing times (%) in a contextually conditioned fear memory test. □: normal diet group, ■: silicon small particle-containing diet group, Sal: normal group, LPS: memory impairment model group *$p<0.05$

On the 7th day (Day 7), a contextually conditioned fear memory test was performed. The conditioning involving electric shocks was performed by placing a mouse in a chamber (Box) with electric wires laid on the floor, and applying three electric shocks (0.6 mA, for 2 seconds) (one electric shock was applied through the soles of the feet after 150 seconds from the placement in the chamber, one electric shock was applied after an additional 120 seconds, and the other electric shock was applied after another 120 seconds). The day after (24 hours after) the conditioning, the mouse was placed in the chamber (Box), where the conditioning had been performed, for 5 minutes, and the freezing time (seconds) of the mouse was measured under a state in which no electric shock was applied. An apparatus used was Fear Conditioning Box MK-450 (Muromachi Kikai Co., Ltd.). The results are shown in FIG. 34. In FIG. 34, the vertical axis represents the ratio (%) of the freezing time in 5 minutes (300 seconds).

Figure 35:
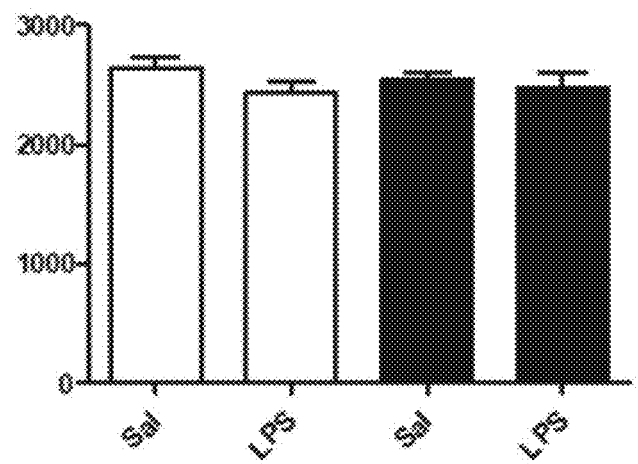
FIG. 35 is a graph showing spontaneous motor activity. It is shown that there is no difference in spontaneous motor activity between mice of respective groups subjected to the contextually conditioned fear memory test. □: normal diet group, ■: silicon small particle-containing diet group, Sal: normal group, LPS: memory impairment model group

As shown in FIG. 34, in the memory test, the mice with the normal diet that were administered LPS showed memory impairment with a reduction in freezing time, whereas the memory impairment was significantly suppressed in the mice that had been given the silicon small particle-containing diet. The test was performed using 9 mice per group. At this time, 6 mice per group were each measured for its spontaneous motor activity with Supermex (Muromachi Kikai Co., Ltd.) for 10 minutes, and as a result, no difference was found in spontaneous motor activity (FIG. 35).

The above-mentioned results revealed that the silicon small particles in the present invention exhibited a high preventive effect and a high therapeutic effect on memory impairment.

L. Pharmacological Test with Spinal Cord Injury Model Mice

C57BL/6J mice (male, 7-week-old) were obtained from Japan SLC. The dorsal corticospinal tract of the tenth and eleventh thoracic spinal cord of the mice was cut with a medical scalpel (injuring surgery) to prepare spinal cord injury model mice.

Figure 36:
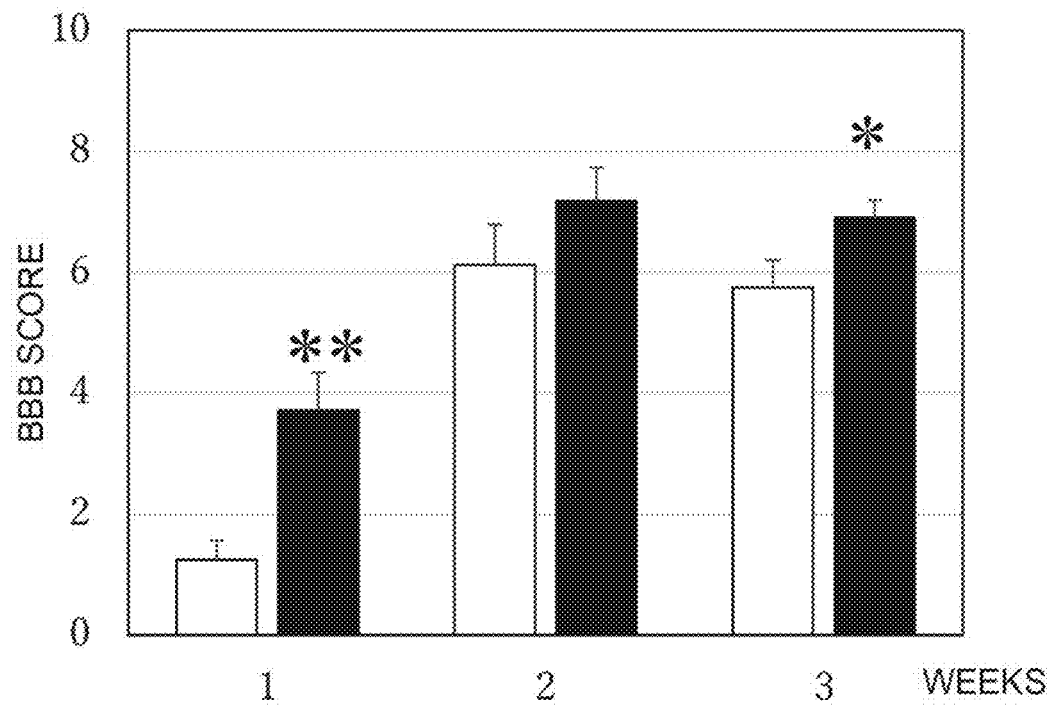
FIG. 36 is a graph showing the motor functions of a normal diet group and a silicon small particle-containing diet group of spinal cord injury model mice in terms of mean BBB score. The horizontal axis represents weeks aftersurgery. □: normal diet group, ■: silicon small particle-containing diet group; **$p<0.05$, *$p<0.01$ (t-test)
Figure 37:
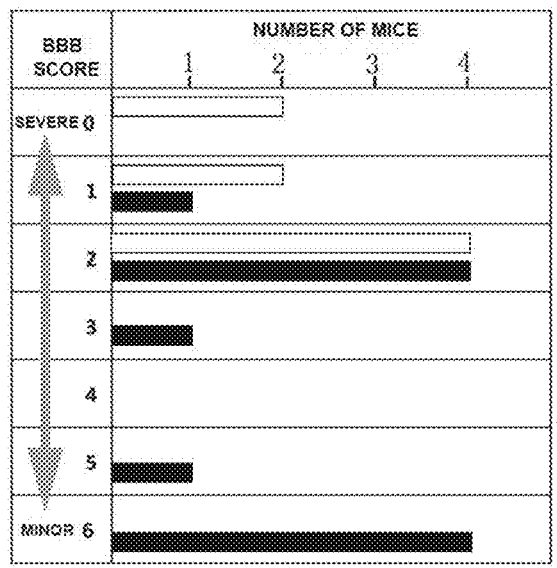
FIG. 37 is a graph showing the BBB scores of individual spinal cord injury model mice after 1 week from surgery. □.

The spinal cord injury model mice had been given normal diet (manufactured by Oriental Yeast Co., Ltd., model number: AIN93M) and the silicon small particle-containing diet from 1 week prior to the injuring surgery. Motor function at each week until 3 weeks after the surgery was evaluated on the basis of the following Basso, Beattie, and Bresnahan (BBB) score. A lower BBB score indicates higher severity. The score is classified into a total of 22 levels from 0 (complete hindlimb paralysis) to the highest value of 21 (healthy) in increments of 1. Evaluation criteria for values calculated as scores in FIG. 36 and FIG. 37 are described.

BBB Score
- 0: No hindlimb movement
- 1: Slight movement of one or two hindlimb joints
- 2: Extensive movement of one hindlimb joint and slight movement of one other joint
- 3: Extensive movement of two hindlimb joints
- 4: Slight movement of three hindlimb joints
- 5: Slight movement of two hindlimb joints and extensive movement of the remaining one joint
- 6: Extensive movement of two hindlimb joints and slight movement of the remaining one joint FIG. 36 shows the mean of the BBB scores of each of the normal diet group and the silicon small particle-containing diet group at each week after the surgery. FIG. 37 shows the BBB scores of individual spinal cord injury model mice at 1 week after the surgery with the number of mice for each score. As the test results show, at 1 week of the spinal cord injury (acute phase), the BBB scores of the normal diet group were quite low owing to the influence of the spinal cord injury, whereas the scores of the silicon small particle-containing diet group were significantly higher. In addition, at each week until 3 weeks after the surgery, the following tendency was shown: the BBB score of the normal diet group was low, whereas the score of the silicon small particle-containing diet group was high. The lowering of the motor function due to the influence of the spinal cord injury was suppressed by the silicon small particles.

The above-mentioned results revealed that the silicon small particles in the present invention exhibited a high preventive effect and a high therapeutic effect on spinal cord injury.

M. Pharmacological Test with Hearing Loss Model Mice

Figure 38:
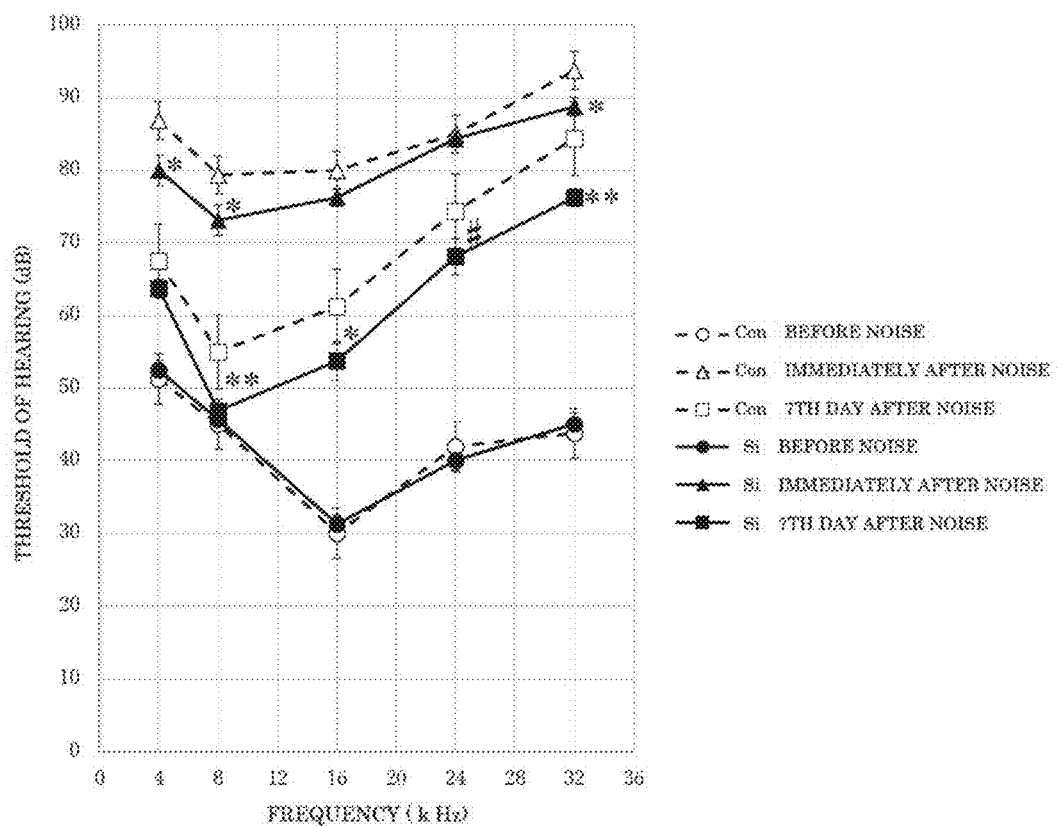
FIG. 38 is a graph showing the hearing abilities of a normal diet group and a silicon small particle-containing diet group of hearing loss model mice. The vertical axis represents the threshold of hearing (db), and the horizontal axis represents frequency (kHz). Dashed line: normal diet group, solid line: silicon small particle-containing diet group; before noise exposure: ○ normal diet group, • silicon small particle-containing diet group; immediately after noise exposure: △ normal diet group, ▲ silicon small particle-containing diet group; 7 days after noise exposure: □: normal diet group, ■: silicon small particle-containing diet group; **: P<0.01; *: P<0.05; #: P<0.06

C57BL/6J mice (male, 7-week-old) were obtained from Japan SLC. The mice were exposed to noise to prepare noise-induced hearing loss disease model mice. The mice were given normal diet (manufactured by Oriental Yeast Co., Ltd., model number: AIN93M) and the silicon small particle-containing diet from 6 days prior to noise exposure to the 7th day after the exposure. The exposure was performed under the noise conditions of 116 dB white noise for 4 hours. Hearing was measured before the noise exposure, immediately after the noise exposure, and after 7 days from the noise exposure, by an examination involving measuring a hearing ability on the basis of brain waves (Auditory Brain-stem Response method: ABR method), and the hearing ability of the mice that had been given the silicon small particle-containing diet and the hearing ability of the mice with the normal diet were compared. 8 mice per group were used. The results are shown in FIG. 38. The vertical axis represents the threshold of hearing (dB), and the horizontal axis represents frequency (kHz). A higher threshold of hearing indicates a lower hearing ability. In the comparison in hearing ability immediately after the noise exposure and in hearing ability after 7 days after the noise exposure, the hearing ability of the mice that had been given the silicon small particle-containing diet was significantly higher at most frequencies. Thus, it was revealed that the lowering of the hearing ability due to noise exposure was significantly suppressed in the silicon small particle-containing diet group as compared to the normal diet group. In addition, in the silicon small particle-containing diet group, the hearing ability after 1 week from the noise exposure was significantly high as compared to the normal diet group, revealing that the silicon small particles were effective for recovering the hearing ability. In addition, no significant difference was observed between the two groups in normal hearing ability before the noise exposure.

The above-mentioned results revealed that the silicon small particles in the present invention exhibited a high preventive effect and a high therapeutic effect on hearing loss.

N. Pharmacological Test with Cerebral ischemia-Reperfusion Injury Model Rats

Cerebral ischemia-reperfusion injury model rats were prepared by Japan SLC on contract. Ischemia-reperfusion injury model rats (Koizumi model) were prepared by performing the following surgery: the right middle cerebral artery of SD rats (male, 9-week-old, Japan SLC) was occluded with an embolus with a yarn, and the embolus was removed 90 minutes thereafter to cause reperfusion. The cerebral ischemia-reperfusion injury model rats had been given normal diet (manufactured by Oriental Yeast Co., Ltd., model number: AIN93M) (control group, N=10) or the silicon small particle-containing diet (silicon small particle administration group, N=10) from 2 days prior to the surgery. Progress monitoring (neurological symptoms and survival rate) and behavioral evaluation (elevated body swing test (modified)) were performed.

N-1. Neurological Symptoms

Figure 39:
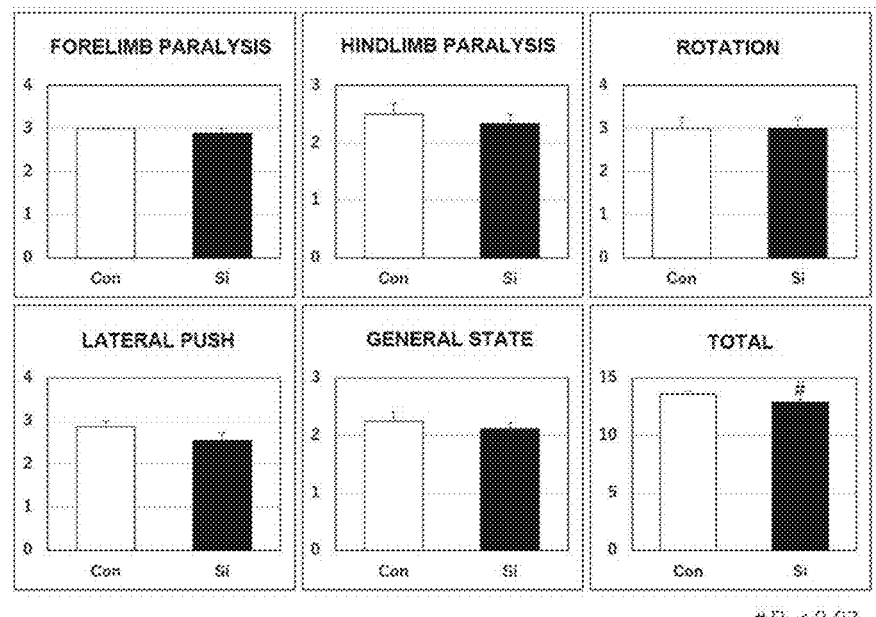
FIG. 39 includes graphs showing the results of observation of neurological symptoms during 90 minutes of ischemia in cerebral ischemia-reperfusion injury model rats. For each rat, each item was evaluated on a 4-point scale of from 0 to 3. Higher scores for the neurological symptoms indicate higher severity. Symbol "■" represents a silicon small particle administration group, and Symbol "□" represents a control group.

Neurological symptoms of the model rats during 90 minutes of ischemia were observed, and for each rat, each of the items described below was evaluated on a 4-point scale of from 0 to 3. Higher scores for the neurological symptoms indicate higher severity (modified method of Bederson method (Stroke Vol 17, No 3, 1986) ). The results are shown in FIG. 39 (control group, N=8; silicon small particle administration group, N=9). In FIG. 39, the vertical axis of each of the graph represents the mean of the scores of each group. The following tendency was shown: the neurological symptoms due to ischemia were alleviated by the silicon small particle administration.

Figure 40:
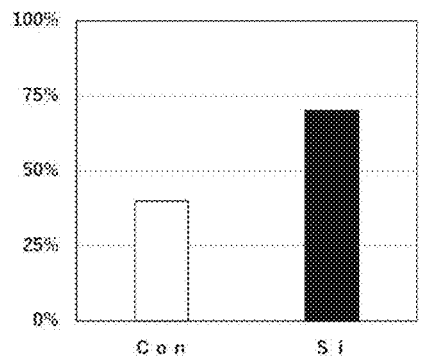
FIG. 40 is a graph showing the survival rates of cerebral ischemia-reperfusion injury model rats 3 days after cerebral ischemia-reperfusion surgery. Symbol "■" represents a silicon small particle administration group, and Symbol "□" represents a control group.

Forelimb paralysis: While the tail of a rat is held and lifted from the floor by about 10 cm, bending of the left forelimb is observed.
  0: No difference between left and right forelimbs
  1: Difference found
  2: Bending of about 90°
  3: The left forelimb cannot be moved Hindlimb paralysis: When the hindlimbs of a rat at rest are pulled, a difference in resulting restoring force is observed.
  0: No difference between left and right hindlimbs
  1: Difference found in muscle strength
  2: An unnatural state is shown, but restored upon a stimulus
  3: An unnatural state is shown, and no response is shown to a stimulus Rotation: A rat is allowed to move in a state in which its tail is held and its forelimbs are in contact with the floor surface.
  0: The rat moves forward
  1: The rat moves mainly forward, but rotates leftward as well
  2: The rat mainly rotates leftward, and moves forward as well
  3: The rat only rotates leftward Lateral push: When one side of a rat at rest is pushed, its resistance is observed.
  0: No difference between left and right sides
  1: The rat maintains its posture, but is weak against a stimulus on the right side
  2: The rat has difficulty in maintaining the hindlimbs against a stimulus on the right side
  3: The rat cannot maintain its posture against a stimulus on the right side General state: The posture of a rat at rest is observed.
  0: No difference from normal animal
  1: The right limbs stick out from the body
  2: The rat is inclined leftward
  3: The rat is severely inclined leftward N-2. Survival Rate Survival rates at 3 days after the surgery are shown in FIG. 40 (N=10). The survival rate was greatly improved by the silicon small particle administration.

N-3. Behavioral Evaluation

Figure 41:
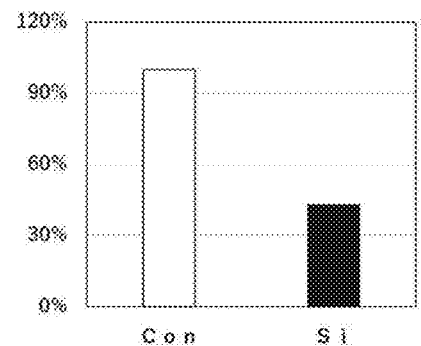
FIG. 41 is a graph showing the results of behavioral evaluation (elevated body swing test (modified)) performed 3 days after the cerebral ischemia-reperfusion surgery of cerebral ischemia-reperfusion injury model rats. The presence or absence of a body twist (swing) of a mouse suspended upside down by holding the tail was observed, and the ratios of individuals that swung among all individuals evaluated are shown in the graph. Symbol "■" represents a silicon small particle administration group, and Symbol "□" represents a control group.

An elevated body swing test (The Journal of Neuroscience, July 1995, 15(7): 5372-5378) (modified) was performed (control group N=4; silicon small particle administration group N=7). When a rat is suspended upside down by holding its tail, a healthy rat keeps its vertical posture by stretching its forelimb to the ground, but a rat with brain dysfunction swings its body (swings). In this test, evaluation was performed in terms of only the presence or absence of a swing. In the control group, four out of the four rats swung. In the silicon small particle administration group, three out of the seven rats swung. The ratios of individuals that swung among all individuals evaluated are shown in FIG. 41. The damage to the brain caused by cerebral ischemia or reperfusion was greatly alleviated by the silicon small particle administration.

Figure 42:
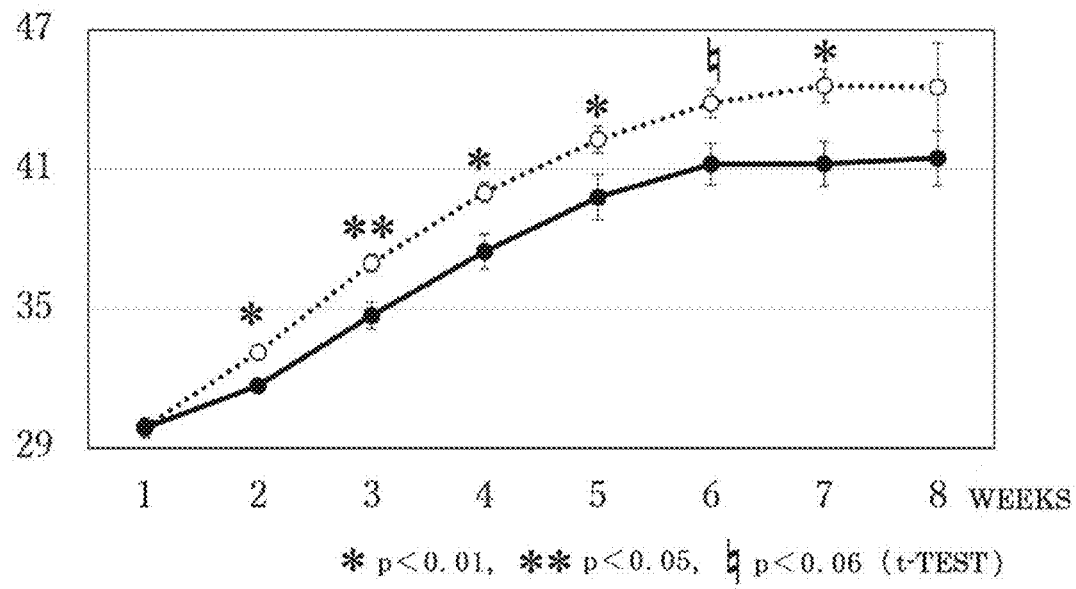
FIG. 42 is a graph showing the measured values of the body weights (g) of a normal diet group and a silicon small particle-containing diet group of diabetes model mice. The vertical axis represents the body weight (g), and the horizontal axis represents time (weeks). The starting point of the time on the horizontal axis is the initiation of administration of normal diet or silicon small particle-containing diet. ○: normal diet group, •: silicon small particle-containing diet group FIG. 43 includes graphs showing blood examination results and urine examination results of diabetes model mice that have been given normal diet and diabetes model mice that have been given silicon small particle-containing diet. In order from the left side, blood sugar levels (mg/dL), neutral fat levels (mg/dL), total ketone body levels (μmol/L), and urine sugar levels (mg/dL) are shown. ○: normal diet diabetes model mice, •: silicon small particle-containing diet diabetes model mice
Figure 43:
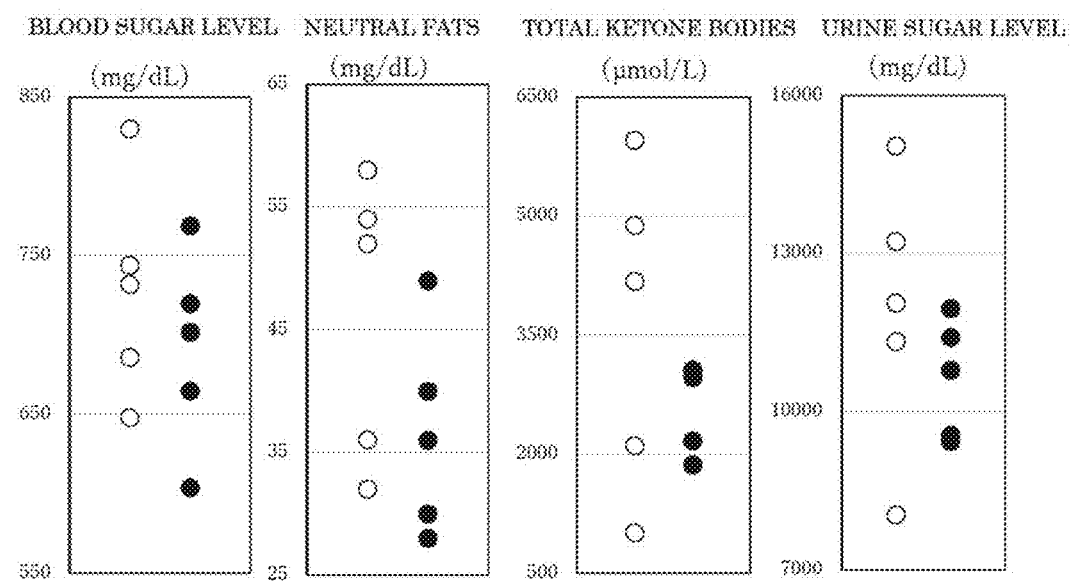

O. Pharmacological Tests with Diabetes Model Mice db/db mice (male, 5-week-old) were obtained from Charles River Laboratories Japan, Inc. The db/db mice are a type 2 diabetes model showing an overeating tendency owing to a deficiency of a leptin receptor involved in appetite control. The mice were given normal diet (manufactured by Oriental Yeast Co., Ltd., model number: AIN93M) and the silicon small particle-containing diet from 5 weeks old for 3 months (17-week-old). Body weight measurement results are shown in FIG. 42. As shown in FIG. 42, the mice with the normal diet showed a marked increase in body weight owing to the influence of overeating, whereas the increase was significantly suppressed in the mice that had been given the silicon small particle-containing feed. In addition, in blood examination results and urine examination results (blood sugar level: left end of FIG. 43, neutral fats: left-center of FIG. 43, total ketone body level: right-center of FIG. 43, urine sugar level: right end of FIG. 43), the following tendency was observed in the mice that had ingested the silicon small particle-containing diet as compared to the mice with the normal diet: increases in blood sugar level, neutral fat level, total ketone body level, and urine sugar level, which are observed in diabetes patients, were suppressed. In the above-mentioned tests, 5 diabetes model mice were used in each of the normal diet group and the silicon small particle-containing diet group.

The above-mentioned results revealed that the silicon small particles in the present invention exhibited a high preventive effect and a high therapeutic effect on diabetes.

P. Pharmacological Tests with Hangover Model Mice

C57B16/J mice (male, 8 to 9-week-old, body weight: 24 g to 27 g) were obtained from Japan SLC (Day 1). A silicon small particle administration group was given the silicon small particle-containing diet, and a control group was given normal diet (manufactured by Oriental Yeast Co., Ltd., model number: AIN93M) for 4 days (Day 1 to Day 4). On the 4th day (Day 4), 3.8 mg of ethanol per g body weight of the mice of each group was administered by intraperitoneal injection of a 30% ethanol solution (30% EtOH in DW). A conversion was performed on the assumption that the specific gravity of ethanol was 0.8.

After 20 hours from the ethanol solution administration, behavioral tests (spontaneous motor activity measurement, rotarod test, and open field test) were performed. 10 mice per group were used in each of the spontaneous motor activity measurement and the open field test, and 12 mice per group were used in the rotarod test.

P-1 Spontaneous Motor Activity Measurement

Figure 44:
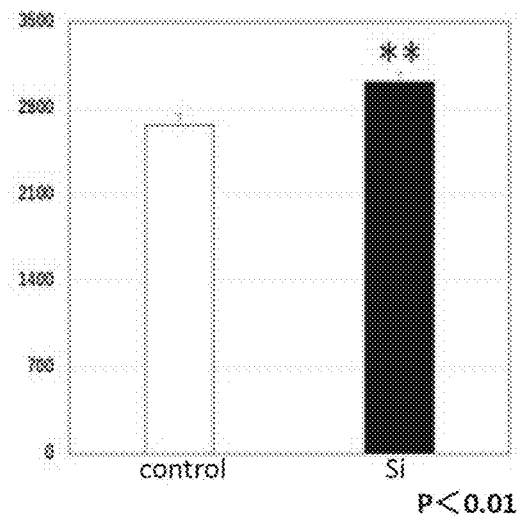
FIG. 44 is a graph showing the spontaneous motor activities of hangover mouse model. Symbol "■" represents a silicon small particle administration group, and Symbol "□" represents a control group.

Spontaneous motor activity was measured for 10 minutes through use of Supermex (manufactured by Muromachi Kikai Co., Ltd.). As shown in FIG. 44, the spontaneous motor activity was lowered in the control group (□), whereas the lowering of the spontaneous motor activity was significantly suppressed in the silicon small particle administration group (■).

P-2 Rotarod Test

Figure 45:
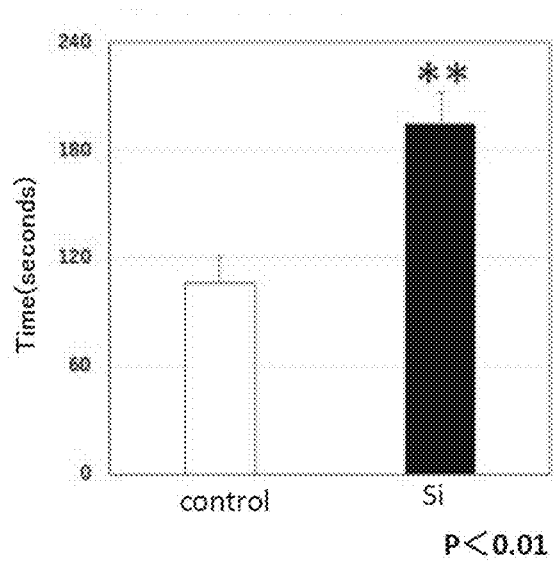
FIG. 45 is a graph showing the rotarod staying times of the hangover mouse model. Symbol "■" represents a silicon small particle administration group, and Symbol "□" represents a control group.

A rotarod test is a test for evaluating motor coordination by placing a mouse on a slowly rotating rod and observing how much time the mouse can stay on the rod, which is gradually accelerated. Measurement was performed through accelerated rotation with a rotarod for mice, MK-610A MODE C manufactured by Muromachi Kikai Co., Ltd. As shown in FIG. 45, the motor coordination was lowered in the control group (□), whereas the lowering of the motor coordination was significantly suppressed in the silicon small particle administration group (■).

P-3 Open Field Test

The open field test was performed for 10 minutes through use of a square open field for mice manufactured by Muromachi Kikai Co., Ltd. (500 mm×500 mm×400 mm). FIG. 46(a) shows travel distance, FIG. 46(b) shows moving speed, and FIG. 46(c) shows active time/inactive time. As shown in FIG. 46, the travel distance and the moving speed were lowered in the control group (□), whereas the lowering of each of the travel distance and the moving speed was significantly suppressed in the silicon small particle administration group (■).

The above-mentioned results revealed that the silicon small particles in the present invention exhibited a high preventive effect and a high therapeutic effect on a hangover.

INDUSTRIAL APPLICABILITY

The present invention can provide a causal therapy for the oxidative stress-induced disease, thereby being greatly conducive to future medicine and health promotion.

The invention claimed is:

1. A method of remedying or ameliorating symptoms of an oxidative stress-induced disease or condition, excluding a kidney disease, comprising administering a therapeutically effective amount of a dry composition comprising silicon small particles covered with an oxide film as sole active ingredient to a subject in need thereof, wherein the silicon small particles are crystalline silicon fine particles and/or aggregates of crystalline silicon fine particles, wherein the oxide film is formed on the surface of the silicon small particles, wherein the oxide film is hydrophilic and comprises hydroxyl groups, wherein the amount of the hydroxyl groups is an amount that enables generation of 200 ml or more of hydrogen per gram of the silicon small particles in 24 hours when the particles are brought into contact with water at 36° C. and a pH of 8.2, wherein the thickness of the oxide film is from 0.5 nm to 2.5 nm, wherein the composition is a formulation for oral administration selected from the group consisting of a powder, a capsule, a tablet, a granule, a dry syrup and a solid diet, wherein the content of the silicon small particles in the composition is from 2.5 wt % to 99 wt %.

2. The method according to claim 1, wherein the oxidative stress-induced disease or condition is an inflammatory disease.

3. The method according to claim 2, wherein the inflammatory disease is an inflammatory disease of a gastrointestinal tract.

4. The method according to claim 3, wherein the inflammatory disease of a gastrointestinal tract is inflammatory bowel disease.

5. The method according to claim 2, wherein the inflammatory disease is arthritis.

6. The method according to claim 5, wherein the arthritis is chronic rheumatoid arthritis.

7. The method according to claim 2, wherein the inflammatory disease is hepatitis.

8. The method according to claim 2, wherein the inflammatory disease is dermatitis.

9. The method according to claim 1, wherein the oxidative stress-induced disease or condition is visceral discomfort.

10. The method according to claim 9, wherein the visceral discomfort is at least one selected from the group consisting of visceral pain, vomiting, nausea, borborygmus, and diarrhea.

11. The method according to claim 1, wherein the oxidative stress-induced disease or condition is depression or a depressive state.

12. The method according to claim 1, wherein the oxidative stress-induced disease or condition is Parkinson's disease.

13. The method according to claim 1, wherein the oxidative stress-induced disease or condition is autism spectrum disorder.

14. The method according to claim 1, wherein the oxidative stress-induced disease or condition is memory impairment.

15. The method according to claim 1, wherein the oxidative stress-induced disease or condition is spinal cord injury.

16. The method according to claim 1, wherein the oxidative stress-induced disease or condition is hearing loss.

17. The method according to claim 1, wherein the oxidative stress-induced disease or condition is damage due to cerebral ischemia or reperfusion injury after cerebral ischemia.

18. The method according to claim 1, wherein the oxidative stress-induced disease or condition is diabetes.

19. The method according to claim 1, wherein the oxidative stress-induced disease or condition is a hangover.

20. The method according to claim 1, wherein the silicon small particles are porous silicon particles.

21. The method of claim 1, wherein the composition consists essentially of silicon small particles as sole active ingredient.

22. The method according to claim 4, wherein visceral pain accompanying the inflammatory bowel disease is alleviated.

23. The method according to claim 1, wherein the content of the silicon small particles in the composition is from 5 wt % to 95 wt %.

* * * * *